US012657451B2

(12) United States Patent
Turcot et al.

(10) Patent No.: US 12,657,451 B2
(45) Date of Patent: Jun. 16, 2026

(54) DEEP LEARNING IN SITU RETRAINING

(71) Applicant: Affectiva, Inc., Boston, MA (US)

(72) Inventors: Panu James Turcot, Pacifica, CA (US);
Seyedmohammad Mavadati,
Watertown, MA (US)

(73) Assignee: Affectiva, Inc., Boston, MA (US)

( * ) Notice: Subject to any disclaimer, the term of this
patent is extended or adjusted under 35
U.S.C. 154(b) by 464 days.

(21) Appl. No.: 17/078,133

(22) Filed: Oct. 23, 2020

(65) Prior Publication Data

US 2021/0125065 A1     Apr. 29, 2021

Related U.S. Application Data

(60) Provisional application No. 63/071,401, filed on Aug.
28, 2020, provisional application No. 62/955,493,
filed on Dec. 31, 2019, provisional application No.
62/954,833, filed on Dec. 30, 2019, provisional
application No. 62/954,819, filed on Dec. 30, 2019,
provisional application No. 62/925,990, filed on Oct.
25, 2019, provisional application No. 62/926,009,
filed on Oct. 25, 2019.

(51) Int. Cl.
G06N 3/08     (2023.01)

(52) U.S. Cl.
CPC ..................................... G06N 3/08 (2013.01)

(58) Field of Classification Search
CPC ..................................................... G06N 3/08
See application file for complete search history.

(56) References Cited

U.S. PATENT DOCUMENTS 3,034,500 A     5/1962 Backster, Jr.
3,548,806 A     12/1970 Fisher
                (Continued)

FOREIGN PATENT DOCUMENTS

JP                 08115367        7/1996
KR     10-2005-0021759 A     3/2005
                (Continued)

OTHER PUBLICATIONS

Shan et al.( Deep Facial Expression Recognition: A Survey, Oct. 22,
2018) (Year: 2018).*
                (Continued)

*Primary Examiner* — Jason B Dunham
*Assistant Examiner* — Huma Waseem
(74) *Attorney, Agent, or Firm* — Adams Intellex, PLC

(57)     ABSTRACT

Deep learning in situ retraining uses deep learning nodes to
provide a human perception state on a user device. A
plurality of images including facial data is obtained for
human perception state analysis. A server device trains a set
of weights on a set of layers for deep learning that imple-
ments the analysis, where the training is performed with a
first set of training data. A subset of weights is deployed on
deep learning nodes on a user device, where the deploying
enables at least part of the human perception state analysis.
An additional set of weights is retrained on the user device,
where the additional set of weights is trained using a second
set of training data. A human perception state based on the
subset of the set of weights, the additional set of weights,
and input images obtained by the user device is provided on
the user device.

30 Claims, 20 Drawing Sheets

(56) References Cited

U.S. PATENT DOCUMENTS

| | | |
|---|---|---|
| 3,870,034 A | 3/1975 | James |
| 4,353,375 A | 10/1982 | Colburn et al. |
| 4,448,203 A | 5/1984 | Williamson et al. |
| 4,794,533 A | 12/1988 | Cohen |
| 4,807,642 A | 2/1989 | Brown |
| 4,817,628 A | 4/1989 | Zealear et al. |
| 4,950,069 A | 8/1990 | Hutchinson |
| 4,964,411 A | 10/1990 | Johnson et al. |
| 5,016,282 A | 5/1991 | Tomono et al. |
| 5,031,228 A | 7/1991 | Lu |
| 5,219,322 A | 6/1993 | Weathers |
| 5,247,938 A | 9/1993 | Silverstein et al. |
| 5,259,390 A | 11/1993 | Maclean |
| 5,507,291 A | 4/1996 | Stirbl et al. |
| 5,572,596 A | 11/1996 | Wildes et al. |
| 5,619,571 A | 4/1997 | Sandstorm et al. |
| 5,647,834 A | 7/1997 | Ron |
| 5,649,061 A | 7/1997 | Smyth |
| 5,663,900 A | 9/1997 | Bhandari et al. |
| 5,666,215 A | 9/1997 | Fredlund et al. |
| 5,725,472 A | 3/1998 | Weathers |
| 5,741,217 A | 4/1998 | Gero |
| 5,760,917 A | 6/1998 | Sheridan |
| 5,762,611 A | 6/1998 | Lewis et al. |
| 5,772,508 A | 6/1998 | Sugita et al. |
| 5,772,591 A | 6/1998 | Cram |
| 5,774,591 A | 6/1998 | Black et al. |
| 5,802,220 A | 9/1998 | Black et al. |
| 5,825,355 A | 10/1998 | Palmer et al. |
| 5,886,683 A | 3/1999 | Tognazzini et al. |
| 5,898,423 A | 4/1999 | Tognazzini et al. |
| 5,920,477 A | 7/1999 | Hoffberg et al. |
| 5,945,988 A | 8/1999 | Williams et al. |
| 5,959,621 A | 9/1999 | Nawaz et al. |
| 5,969,755 A | 10/1999 | Courtney |
| 5,983,129 A | 11/1999 | Cowan et al. |
| 5,987,415 A | 11/1999 | Breese et al. |
| 6,004,061 A | 12/1999 | Manico et al. |
| 6,004,312 A | 12/1999 | Finneran et al. |
| 6,008,817 A | 12/1999 | Gilmore. , Jr. |
| 6,026,321 A | 2/2000 | Miyata et al. |
| 6,026,322 A | 2/2000 | Korenman et al. |
| 6,056,781 A | 5/2000 | Wassick et al. |
| 6,067,565 A | 5/2000 | Horvitz |
| 6,088,040 A | 7/2000 | Oda et al. |
| 6,091,334 A | 7/2000 | Galiana et al. |
| 6,099,319 A | 8/2000 | Zaltman et al. |
| 6,119,083 A * | 9/2000 | Hollier .................. G10L 19/018 |
| | | 348/742 |
| 6,134,644 A | 10/2000 | Mayuzumi et al. |
| 6,182,098 B1 | 1/2001 | Selker |
| 6,185,534 B1 | 2/2001 | Breese et al. |
| 6,195,651 B1 | 2/2001 | Handel et al. |
| 6,212,502 B1 | 4/2001 | Ball et al. |
| 6,222,607 B1 | 4/2001 | Szajewski et al. |
| 6,309,342 B1 | 10/2001 | Blazey et al. |
| 6,327,580 B1 | 12/2001 | Pierce et al. |
| 6,349,290 B1 | 2/2002 | Horowitz et al. |
| 6,351,273 B1 | 2/2002 | Lemelson et al. |
| 6,437,758 B1 | 8/2002 | Nielsen et al. |
| 6,443,840 B2 | 9/2002 | Von Kohorn |
| 6,530,082 B1 | 3/2003 | Del Sesto et al. |
| 6,577,329 B1 | 6/2003 | Flickner et al. |
| 6,606,102 B1 | 8/2003 | Odom |
| 6,629,104 B1 | 9/2003 | Parulski et al. |
| 6,792,458 B1 | 9/2004 | Muret et al. |
| 6,847,376 B2 | 1/2005 | Engeldrum et al. |
| 7,003,135 B2 | 2/2006 | Hsieh et al. |
| 7,013,478 B1 | 3/2006 | Hendricks et al. |
| 7,113,916 B1 | 9/2006 | Hill |
| 7,120,880 B1 | 10/2006 | Dryer et al. |
| 7,197,459 B1 | 3/2007 | Harinarayan et al. |
| 7,233,684 B2 | 6/2007 | Fedorovskaya et al. |
| 7,246,081 B2 | 7/2007 | Hill |
| 7,263,474 B2 | 8/2007 | Fables et al. |
| 7,266,582 B2 | 9/2007 | Stelting |
| 7,307,636 B2 | 12/2007 | Matraszek et al. |
| 7,319,779 B1 | 1/2008 | Mummareddy et al. |
| 7,327,505 B2 | 2/2008 | Fedorovskaya et al. |
| 7,350,138 B1 | 3/2008 | Swaminathan et al. |
| 7,353,399 B2 | 4/2008 | Ooi et al. |
| 7,355,627 B2 | 4/2008 | Yamazaki et al. |
| 7,428,318 B1 | 9/2008 | Madsen et al. |
| 7,474,801 B2 | 1/2009 | Teo et al. |
| 7,496,622 B2 | 2/2009 | Brown et al. |
| 7,549,161 B2 | 6/2009 | Poo et al. |
| 7,551,755 B1 | 6/2009 | Steinberg et al. |
| 7,555,148 B1 | 6/2009 | Steinberg et al. |
| 7,558,408 B1 | 7/2009 | Steinberg et al. |
| 7,564,994 B1 | 7/2009 | Steinberg et al. |
| 7,573,439 B2 | 8/2009 | Lau et al. |
| 7,580,512 B2 | 8/2009 | Batni et al. |
| 7,584,435 B2 | 9/2009 | Bailey et al. |
| 7,587,068 B1 | 9/2009 | Steinberg et al. |
| 7,610,289 B2 | 10/2009 | Muret et al. |
| 7,620,934 B2 | 11/2009 | Falter et al. |
| 7,644,375 B1 | 1/2010 | Anderson et al. |
| 7,676,574 B2 | 3/2010 | Glommen et al. |
| 7,757,171 B1 | 7/2010 | Wong et al. |
| 7,826,657 B2 | 11/2010 | Zhang et al. |
| 7,830,570 B2 | 11/2010 | Morita et al. |
| 7,881,493 B1 | 2/2011 | Edwards et al. |
| 7,921,036 B1 | 4/2011 | Sharma |
| 8,010,458 B2 | 8/2011 | Galbreath et al. |
| 8,022,831 B1 | 9/2011 | Wood-Eyre |
| 8,219,438 B1 | 7/2012 | Moon et al. |
| 8,401,248 B1 | 3/2013 | Moon et al. |
| 8,442,638 B2 | 5/2013 | Libbus et al. |
| 8,522,779 B2 | 9/2013 | Lee et al. |
| 8,600,120 B2 | 12/2013 | Gonion et al. |
| 8,640,021 B2 | 1/2014 | Perez et al. |
| 8,775,332 B1 | 7/2014 | Morris et al. |
| 8,861,842 B2 | 10/2014 | Jung et al. |
| 8,898,093 B1 | 11/2014 | Helmsen |
| 8,935,167 B2 * | 1/2015 | Bellegarda ............ G10L 15/063 |
| | | 704/231 |
| 8,949,170 B2 | 2/2015 | Zadeh |
| 9,008,391 B1 | 4/2015 | Solanki et al. |
| 9,246,688 B1 | 1/2016 | Stickle |
| 9,275,269 B1 | 3/2016 | Li et al. |
| 9,275,347 B1 | 3/2016 | Haranda et al. |
| 9,286,524 B1 | 3/2016 | Mei et al. |
| 10,322,728 B1 | 6/2019 | Porikli et al. |
| 2001/0033286 A1 | 10/2001 | Stokes et al. |
| 2001/0041021 A1 | 11/2001 | Boyle et al. |
| 2002/0007249 A1 | 1/2002 | Cranley |
| 2002/0030665 A1 | 3/2002 | Ano |
| 2002/0042557 A1 | 4/2002 | Bensen et al. |
| 2002/0054174 A1 | 5/2002 | Abbott et al. |
| 2002/0084902 A1 | 7/2002 | Zadrozny et al. |
| 2002/0171551 A1 | 11/2002 | Eshelman |
| 2002/0182574 A1 | 12/2002 | Freer |
| 2003/0035567 A1 | 2/2003 | Chang et al. |
| 2003/0037041 A1 | 2/2003 | Hertz |
| 2003/0060728 A1 | 3/2003 | Mandigo |
| 2003/0093784 A1 | 5/2003 | Dimitrova et al. |
| 2003/0182123 A1 | 9/2003 | Mitsuyoshi |
| 2003/0191682 A1 | 10/2003 | Shepard et al. |
| 2003/0191816 A1 | 10/2003 | Landress et al. |
| 2004/0181457 A1 | 9/2004 | Biebesheimer |
| 2005/0187437 A1 | 8/2005 | Matsugu |
| 2005/0283055 A1 | 12/2005 | Shirai et al. |
| 2005/0289582 A1 | 12/2005 | Tavares et al. |
| 2006/0019224 A1 | 1/2006 | Behar et al. |
| 2006/0143647 A1 | 6/2006 | Bill |
| 2006/0170945 A1 | 8/2006 | Bill |
| 2006/0235753 A1 | 10/2006 | Kameyama |
| 2007/0167689 A1 | 7/2007 | Ramadas et al. |
| 2007/0173733 A1 | 7/2007 | Le et al. |
| 2007/0239787 A1 | 10/2007 | Cunningham et al. |
| 2007/0255831 A1 | 11/2007 | Hayashi et al. |
| 2007/0265507 A1 | 11/2007 | de Lemos |
| 2007/0299964 A1 | 12/2007 | Wong et al. |
| 2008/0059570 A1 | 3/2008 | Bill |

(56)                References Cited

U.S. PATENT DOCUMENTS

| | | |
|---|---|---|
| 2008/0091512 A1 | 4/2008 | Marci et al. |
| 2008/0091515 A1 | 4/2008 | Thieberger et al. |
| 2008/0101660 A1 | 5/2008 | Seo |
| 2008/0103784 A1 | 5/2008 | Wong et al. |
| 2008/0167757 A1 | 7/2008 | Kanevsky et al. |
| 2008/0184170 A1 | 7/2008 | Periyalwar |
| 2008/0201144 A1 | 8/2008 | Song et al. |
| 2008/0208015 A1 | 8/2008 | Morris et al. |
| 2008/0221472 A1 | 9/2008 | Lee et al. |
| 2008/0287821 A1 | 11/2008 | Jung et al. |
| 2008/0292151 A1 | 11/2008 | Kurtz et al. |
| 2009/0002178 A1 | 1/2009 | Guday et al. |
| 2009/0006206 A1 | 1/2009 | Groe |
| 2009/0083421 A1 | 3/2009 | Glommen et al. |
| 2009/0094286 A1 | 4/2009 | Lee et al. |
| 2009/0112694 A1 | 4/2009 | Jung et al. |
| 2009/0112810 A1 | 4/2009 | Jung et al. |
| 2009/0133048 A1 | 5/2009 | Gibbs et al. |
| 2009/0150919 A1 | 6/2009 | Lee et al. |
| 2009/0156907 A1 | 6/2009 | Jung et al. |
| 2009/0164132 A1 | 6/2009 | Jung et al. |
| 2009/0193344 A1 | 7/2009 | Smyers |
| 2009/0210290 A1 | 8/2009 | Elliott et al. |
| 2009/0217315 A1 | 8/2009 | Malik et al. |
| 2009/0259518 A1 | 10/2009 | Harvey |
| 2009/0270170 A1 | 10/2009 | Patton |
| 2009/0271417 A1 | 10/2009 | Toebes et al. |
| 2009/0285456 A1 | 11/2009 | Moon et al. |
| 2009/0299840 A1 | 12/2009 | Smith |
| 2010/0070523 A1 | 3/2010 | Delgo et al. |
| 2010/0086215 A1 | 4/2010 | Bartlett et al. |
| 2010/0099955 A1 | 4/2010 | Thomas et al. |
| 2010/0266213 A1 | 10/2010 | Hill |
| 2010/0274847 A1 | 10/2010 | Anderson et al. |
| 2010/0324437 A1 | 12/2010 | Freeman |
| 2011/0007174 A1 | 1/2011 | Bacivarov et al. |
| 2011/0126226 A1 | 5/2011 | Makhlouf |
| 2011/0134026 A1 | 6/2011 | Kang et al. |
| 2011/0143728 A1 | 6/2011 | Holopainen et al. |
| 2011/0144971 A1 | 6/2011 | Danielson |
| 2011/0196855 A1 | 8/2011 | Wable et al. |
| 2011/0231240 A1 | 9/2011 | Schoen et al. |
| 2011/0251493 A1 | 10/2011 | Poh et al. |
| 2011/0255741 A1 | 10/2011 | Jung et al. |
| 2011/0263946 A1 | 10/2011 | el Kaliouby et al. |
| 2012/0271484 A1 | 10/2012 | Feit et al. |
| 2012/0324491 A1 | 12/2012 | Bathiche et al. |
| 2013/0023337 A1 | 1/2013 | Bowers et al. |
| 2013/0116587 A1 | 5/2013 | Sommo et al. |
| 2013/0197409 A1 | 8/2013 | Baxter et al. |
| 2014/0172910 A1 | 6/2014 | Jung et al. |
| 2014/0188462 A1 | 7/2014 | Zadeh |
| 2014/0201126 A1 | 7/2014 | Zadeh et al. |
| 2014/0222425 A1 | 8/2014 | Park et al. |
| 2014/0223462 A1* | 8/2014 | Aimone .................. G16Z 99/00 |
| | | 725/10 |
| 2014/0276090 A1 | 9/2014 | Breed |
| 2014/0372159 A1 | 12/2014 | Bain |
| 2014/0372344 A1 | 12/2014 | Morris et al. |
| 2015/0006443 A1 | 1/2015 | Rose et al. |
| 2015/0094544 A1* | 4/2015 | Spolin .................. A61B 5/0008 |
| | | 600/300 |
| 2015/0139485 A1 | 5/2015 | Bourdev |
| 2015/0149155 A1 | 5/2015 | Zadeh |
| 2015/0254555 A1 | 9/2015 | Williams, Jr. et al. |
| 2015/0293976 A1 | 10/2015 | Guo et al. |
| 2015/0310862 A1 | 10/2015 | Dauphin et al. |
| 2015/0313530 A1* | 11/2015 | Kodra .................... G06V 20/41 |
| | | 382/203 |
| 2015/0324690 A1 | 11/2015 | Chilimbi et al. |
| 2015/0347820 A1 | 12/2015 | Yin et al. |
| 2016/0078863 A1 | 3/2016 | Chung et al. |
| 2016/0104486 A1 | 4/2016 | Penilla et al. |
| 2017/0003784 A1 | 1/2017 | Garg et al. |
| 2017/0017838 A1* | 1/2017 | Biswas ............... G06F 16/7837 |
| 2017/0032279 A1* | 2/2017 | Miserendino .......... G06N 20/00 |
| 2017/0109571 A1* | 4/2017 | McDuff ................. G06V 10/50 |
| 2017/0277841 A1* | 9/2017 | Shankar ................. G16Z 99/00 |
| 2017/0297587 A1 | 10/2017 | Mimura et al. |
| 2018/0050696 A1 | 2/2018 | Misu et al. |
| 2018/0251122 A1 | 9/2018 | Golston et al. |
| 2019/0049965 A1 | 2/2019 | Tanriover |
| 2019/0108311 A1* | 4/2019 | Blocker ................. G16B 40/00 |
| 2019/0135325 A1 | 5/2019 | Lisseman et al. |
| 2019/0197406 A1* | 6/2019 | Darvish Rouhani .. G06N 20/00 |
| 2019/0225232 A1 | 7/2019 | Blau |
| 2019/0251578 A1* | 8/2019 | Blanchet ................ G06Q 30/02 |
| 2019/0286989 A1* | 9/2019 | Wang ........................ G06F 8/20 |
| 2019/0347478 A1* | 11/2019 | Sorci ........................ G06N 3/08 |
| 2020/0021886 A1* | 1/2020 | Kawk ............. H04N 21/44224 |
| 2020/0103980 A1 | 4/2020 | Katz et al. |
| 2020/0130528 A1 | 4/2020 | You et al. |
| 2020/0160870 A1* | 5/2020 | Baughman .............. G10L 15/30 |
| 2020/0171977 A1 | 6/2020 | Jales Costa et al. |
| 2020/0184327 A1* | 6/2020 | Dey ........................ G06N 3/086 |
| 2020/0223362 A1 | 7/2020 | Witte |
| 2020/0285871 A1 | 9/2020 | Tokizaki et al. |
| 2020/0311417 A1* | 10/2020 | Lin ......................... G06V 40/67 |
| 2020/0312301 A1* | 10/2020 | Polovets ............... G06N 3/084 |
| 2020/0327378 A1* | 10/2020 | Smith .................... G06N 5/048 |
| 2020/0327884 A1* | 10/2020 | Bui .......................... G06N 3/08 |
| 2021/0042575 A1* | 2/2021 | Firner ..................... G06N 3/04 |
| 2021/0133509 A1* | 5/2021 | Wall ..................... G06F 18/285 |
| 2021/0326585 A1* | 10/2021 | Tu ......................... G06V 40/172 |

FOREIGN PATENT DOCUMENTS

| | | |
|---|---|---|
| KR | 10-2008-0016303 A | 2/2008 |
| KR | 1020100048688 A | 5/2010 |
| WO | WO 2011/045422 A1 | 4/2011 |

OTHER PUBLICATIONS

Ryu et al.( Node pruning based on Entropy of Weights and Node Activity for Small-footprint Acoustic Model based on Deep Neural Networks , Aug. 2017) (Year: 2017).*

Ruder ("An Overview of Multi-Task Learning in Deep Neural Networks", May 29, 2017) (Year: 2017).*

Yan et al. ("Compressing Big Graph Data: A Relative Node Importance Approach", 2017) (Year: 2017).*

Rana Ayman El Kaliouby, Mind-reading machines: automated inference of complex mental states, Jul. 2005, University of Cambridge, Cambridge, United Kingdom.

International Search Report dated Nov. 14, 2011 for PCT/US2011/39282.

International Search Report dated Apr. 16, 2012 for PCT/US2011/054125.

International Search Report dated May 24, 2012 for PCT/US2011/060900.

Xiaoyu Wang, An HOG-LBP human detector with partial occlusion handling, Sep. 29, 2009, IEEE 12th International Conference on Computer Vision, Kyoto, Japan.

Zhihong Zeng, A Survey of Affect Recognition Methods: Audio, Visual, and Spontaneous Expressions, Jan. 2009, IEEE Transactions on Pattern Analysis and Machine Intelligence, vol. 31, No. 1.

Nicholas R. Howe and Amanda Ricketson, Improving the Boosted Correlogram, 2004, Lecture Notes in Computer Science, ISSN 0302-9743, Springer-Verlag, Germany.

Kuming He, et al., Learning and Incorporating Top-Down Cues in Image Segmentation, 2006, Lecture Notes in Computer Science, ISBN 978-3-540-33832-1, Springer-Verlag, Germany.

Ross Eaton, et al., Rapid Training of Image Classifiers through Adaptive, Multi-frame Sampling Methods, Oct. 2008, IEEE 37th Applied Imagery Pattern Recognition Workshop, Washington DC.

Verkruysse, Wim, Lars O. Svaasand, and J. Stuart Nelson. "Remote plethysmographic imaging using ambient light." Optics express 16.26 (2008): 21434-21445.

Albiol, Alberto, et al. "Face recognition using HOG-EBGM." Pattern Recognition Letters 29.10 (2008): 1537-1543.

(56) References Cited

OTHER PUBLICATIONS

Fasel, B. (Aug. 2002). Robust face analysis using convolutional neural networks. In Object recognition supported by user interaction for service robots (vol. 2, pp. 40-43). IEEE.

Matsugu, M., Mori, K., Mitari, Y., & Kaneda, Y. (2003). Subject independent facial expression recognition with robust face detection using a convolutional neural network. Neural Networks, 16(5-6), 555-559.

Lawrence, S., Giles, C. L., Tsoi, A. C., & Back, A. D. (1997). Face recognition: A convolutional neural-network approach. IEEE transactions on neural networks, 8(1), 98-113.

Nebauer, C. (1998). Evaluation of convolutional neural networks for visual recognition. IEEE transactions on neural networks, 9(4), 685-696.

Ahmed, A., Yu, K., Xu, W., Gong, Y., & Xing, E. (Oct. 2008). Training hierarchical feed-forward visual recognition models using transfer learning from pseudo-tasks. In European Conference on Computer Vision (pp. 69-82). Springer, Berlin, Heidelberg.

* cited by examiner

1400

OBTAIN TRAINING IMAGE SAMPLES
1410

RECEIVE IMAGE
1420

GENERATE HISTOGRAMS
1430

APPLY CLASSIFIERS
1440

COMPUTE FRAME SCORE
1450

PLOT RESULTS
1460

MATCH TEMPLATE
1462

APPLY LABEL
1470

1500

OBTAIN VIDEOS CONTAINING FACES
1510

EXTRACT FEATURES FROM INDIVIDUAL RESPONSES
1520

PERFORM UNSUPERVISED CLUSTERING OF FEATURES
1530

CHARACTERIZE CLUSTER PROFILES
1540

DETERMINE PERCEPTION STATE EVENT TEMPORAL SIGNATURES
1550

1700

DEEP LEARNING IN SITU RETRAINING

RELATED APPLICATIONS

This application claims the benefit of U.S. provisional patent applications "Deep Learning In Situ Retraining" Ser. No. 62/925,990, filed Oct. 25, 2019, "Data Versioning for Neural Network Training" Ser. No. 62/926,009, filed Oct. 25, 2019, "Synthetic Data Augmentation for Neural Network Training" Ser. No. 62/954,819, filed Dec. 30, 2019, "Synthetic Data for Neural Network Training Using Vectors" Ser. No. 62/954,833, filed Dec. 30, 2019, "Autonomous Vehicle Control Using Longitudinal Profile Generation" Ser. No. 62/955,493, filed Dec. 31, 2019, and "Neural Network Synthesis Architecture Using Encoder-Decoder Models" Ser. No. 63/071,401, filed Aug. 28, 2020.

FIELD OF INVENTION

This application relates generally to neural networks and more particularly to deep learning in situ retraining.

BACKGROUND

The question of whether or not computers can imitate humans and "think" as a human would has long been asked by computer scientists, computer engineers, and others, but not without controversy. Computer science pioneer Edsger Dijkstra famously quipped, "The question of whether a computer can think is no more interesting than the question of whether submarines swim." The similarities between processing by a human and processing by a computer cannot be denied, yet a clear understanding of the workings of the human brain remains elusive. Many people, including physicians and philosophers, have long sought to understand the workings of the human brain. A remarkable organ, the brain processes sensory information gathered from the environment surrounding an individual in support of basic survival tasks. Sight is used to determine whether an approaching human or animal is a friend or a foe, and smell can determine whether food is safe or if there is smoke in the air from a nearby fire. Hearing can detect the sounds of dangerous animals or the onrush of flood waters, while touch can determine texture or pain. The brain is further capable of higher-level cognitive skills such as understanding and producing speech, reading or writing text, and solving complex problems. The brain is also capable of creating art.

People continue to wonder how the brain works. They strive to understand how the brain is used to learn and to store information, and further, how this organ makes an individual who she or he is. Computer scientists and computer engineers persist in asking whether an artificial brain can be created, one that can learn, "think", or behave much in the way that a human does. These questions have long been the bases of science fiction thrillers or often heated philosophical debates. More recently, scientists, engineers, and mathematicians have joined together to design and implement systems that are loosely modeled on the neurons and synapses of the human brain. These "neural networks" are constructed from networks of interconnected processing nodes called artificial neurons. These neural networks execute sets of mathematical algorithms that mimic the processing of the human brain to solve problems ranging from the mundane to the complex.

Similar to the manner in which a child is taught to speak, read, and write, or to identify a wide variety of animals or objects, a neural network can be trained to solve a particular problem. The neural network is trained by providing it training data related to the problem to be solved. The data includes an input such as an image and the expected processing result. The neural network reads the data such as an image of an adorable puppy or a cuddly kitten, analyzes the data, and makes an inference about the data. If the neural network infers that the image of a puppy contains a puppy, the neural network registers a success and moves on to the next data set or image. If the neural network draws the wrong inference such as thinking a kitten is a puppy, then the network adjusts values, called weights, and tries again. The more training data that can be provided for training the neural network, the more effective the training can be. The better training results in successful inference rate increases. Subsequent to training, the neural network is then given raw data and tries to make inferences about the data based on the training. This seemingly simple approach to training belies that the process is actually quite difficult. The training data is usually generated by humans, so that large training datasets are difficult to obtain or are simply unavailable. In addition, an object or animal in an image can be difficult to identify. Dogs that look like cats, partially obscured objects such as keys which are somewhat concealed by other pocket contents, and other challenges, make the tasks of the neural network nearly impossible.

Deep learning techniques as applied to a wide range of application and research areas are rapidly gaining popularity. A branch of the more general field of artificial intelligence, deep learning seeks to train machines to perform tasks traditionally performed by trained humans. The machines that are used for deep learning are based on "neural networks" that are inspired by the human brain. The deep learning neural networks are trained to "learn by experience", as a person does, by studying large amounts of data. The deep learning network is trained by processing data for which a correct answer or interpretation is known. The network then adjusts internal values called weights to tweak its understanding of the data and to improve its processing abilities. As the deep learning network progresses through the large amounts of data, the network improves its ability to arrive at or infer the proper conclusion about the data. Once the deep neural network has been trained, it can be used to process data that it has not previously encountered. That is, the deep neural network "thinks" about the problem presented by the new data in order to solve it. Since solving the problems would require a person to think, the trained neural network is said to have attained intelligence for solving that particular type of problem. The data that can be used for training the network can include the tremendous amounts of data that are collected daily from people as they surf the web, consume media, and make online purchases, among other online activities, but the great challenge of providing good training nonetheless remains.

SUMMARY

In disclosed techniques, deep learning in situ retraining uses neural network training for human perception state analysis. An individual can experience one or more human perception states while she or he is interacting with an electronic device, consuming a media presentation, traveling within a vehicle, interacting with an object within the vehicle, and so on. The electronic device can include a personal electronic device such as a cell phone or a computing device. The analysis that can determine a human perception state can be based on neural network training. A neural network, such as a convolutional neural network, a recurrent neural network, and so on, can be used to perform deep learning. A neural network for deep learning, or a "deep learning" neural network can be trained. The deep learning network can be trained by providing one or more sets of training data. The training data comprises "known good" data, where the known good data includes human perception states associated with the training data. The known good data is applied to the deep learning network to adjust weights associated with various layers within the network. Further adjustments to the training of the network can be accomplished by applying further known good data and adjusting additional weights. Once trained, the deep learning neural network can be used to determine one or more human perception states within new data, where the new data can include facial data within images. The human perception state analysis can include evaluating images. The evaluating the images can include analyzing pixels within further images to identify a facial portion. The evaluating can further include identifying a facial expression based on the facial portion. The human perception state can include drowsiness, fatigue, distraction, impairment, sadness, stress, happiness, anger, frustration, confusion, disappointment, hesitation, human perception overload, focusing, engagement, attention, boredom, exploration, confidence, trust, delight, disgust, skepticism, doubt, satisfaction, excitement, laughter, calmness, curiosity, humor, depression, envy, sympathy, embarrassment, poignancy, mirth, and so on.

Images that include facial data are obtained. The images can be obtained using one or more imaging devices, where the imaging devices can include still cameras, video cameras, and so on. The images can include video, intermittent video, still images, and the like. The images can include facial data, upper torso data, etc. The images can be collected for an individual while the individual is interacting with an electronic device such as a smartphone or computing device, viewing media content, traveling in a vehicle, and so on. The images can include images based on various spectra of light such as visible light images or near-infrared (NIR) images. Other sensors can be used for data collection, such as a microphone for collecting audio data or voice data, and additional sensors for collecting physiological data. Layers of a network for deep learning can be trained on a server device. The training of the layers can include using training data to adjust weights on a set of the layers for deep learning. A subset of the set of weights can be deployed on one or more deep learning nodes. The deep learning nodes can include nodes of a user device, where the user device can include a personal electronic device such as a smartphone, tablet, or computing device. An additional set of weights can be retrained using a further set of training data. The trained deep learning network can be used to perform human perception state analysis of the obtained images. A human perception state can be provided on the user device.

In embodiments, a computer-implemented method for image analysis comprises: obtaining a plurality of images that include facial data for human perception state analysis; training, on a server device, a set of weights on a set of layers for deep learning that implement the human perception state analysis, wherein the training is performed with a first set of training data; deploying, on deep learning nodes of a user device, a subset of the set of weights, wherein the deploying enables at least part of the human perception state analysis; retraining, on the user device, an additional set of weights, wherein the additional set of weights is trained using a second set of training data; and providing, on the user device, a human perception state, based on the subset of the set of weights, the additional set of weights, and input images obtained by the user device. In embodiments, the retraining includes additional deep learning layers of the user device. Some embodiments comprise selecting results from subset of weights and the additional set of weights. In embodiments, the retraining includes additional nodes on one or more deep learning layers of the user device. In some embodiments, the method further includes obtaining audio information and augmenting the analyzing based on the audio information. The audio information can include speech, non-speech vocalizations, and so on. The non-speech vocalizations can include grunts, yelps, squeals, snoring, sighs, laughter, filled pauses, unfilled pauses, or yawns. Further embodiments include obtaining physiological information and augmenting the estimating based on the physiological information. The physiological information can include heart rate, heart rate variability, respiration rate, skin conductivity, and so on.

Various features, aspects, and advantages of numerous embodiments will become more apparent from the following description.

BRIEF DESCRIPTION OF THE DRAWINGS

The following detailed description of certain embodiments may be understood by reference to the following figures wherein.

DETAILED DESCRIPTION

Figure 1:
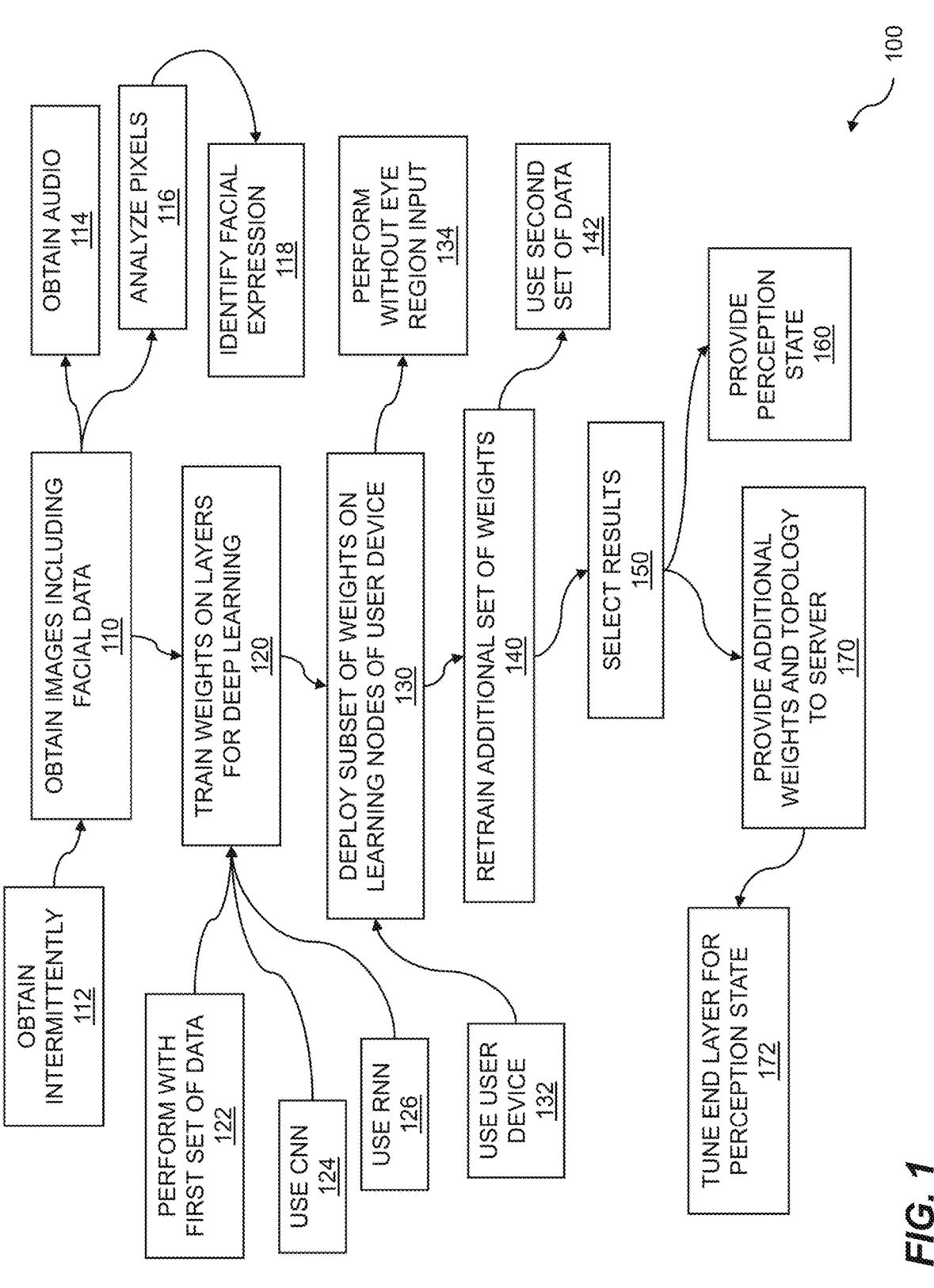
FIG. 1 is a flow diagram for deep learning in situ retraining.

As an individual consumes media, interacts with an electronic or computing device, even while traveling, that person can experience a wide range of human perception states. The human perception states can include drowsiness, sadness, engagement, boredom, and so on. The types and ranges of human perception states can be determined by analyzing data, including images which include facial data, obtained from the individual. The obtained data that is analyzed can include data from multiple images, angles, or light wavelengths; facial data or torso data; audio data, voice data, speech data, or non-speech vocalizations; physiological data; and the like. The analysis can be performed using a neural network, where the neural network can be configured for deep learning. The deep learning neural network can be trained to analyze the obtained data and to identify human perception states. The deep learning neural network can be adapted or "retrained", as more data is analyzed by the network, to speed operation, to improve convergence, and so on. The deep learning network can be retrained using in situ retraining.

In the disclosed materials, neural network training is used for human perception state analysis. The human perception state analysis enables deep learning in situ training. The neural network training can be based on techniques such applying "known good" data to the neural network in order to adjust one or more weights within the neural network. The adjusting weights can be performed to enable applications such as machine vision, machine hearing, and so on. The adjusting weights can be performed for human perception state analysis. An individual can be observed as she or he interacts with an electronic device or a computing device, consumes media, travels in or on a vehicle, and so on. The human perception state analysis is based on obtaining images that include facial data from the individual. The images can include video images, still images, intermittently obtained images, and so on. The images can include visible light images, near-infrared light images, etc. Weights can be trained on a series of layers for deep learning by applying a known good data set, which is also called "training data". The weights can be deployed onto deep learning nodes. The training can include further training or retraining weights. The training can include an additional set of weights, the retraining can include adjusting weights within the first set or weights or the additional set of weights, and so on. Human perception state analysis can proceed on the trained deep learning network. The analysis can identify one or more human perception states. A human perception state that is identified can be provided on a device such as a user device.

A plurality of images is obtained, where the images include facial data. Data in addition to the facial data can be obtained, where the additional data can include audio data, physiological data, and so on. Various devices can be used for collecting the images. The imaging devices can include cameras, where the cameras can include a video camera, a still camera, a camera array, a plenoptic camera, a web-enabled camera, a visible light camera, a near-infrared (NIR) camera, a heat camera, and so on. The images and/or other data are analyzed for human perception state analysis. The analysis can be performed on a neural network, where the neural network has been trained for deep learning. A deep learning neural network comprises layers, where each layer within the neural network includes nodes. The operation of the deep learning neural network can be modified or adapted by changing the values of weights associated with the nodes within each layer of the neural network. The changing of the weights associated with the nodes and layers within the neural network comprises retaining of the neural network. The retraining can be performed to improve the efficacy of the analysis for human perception states. The weights that are trained are deployed onto deep learning nodes of a user device, and the weights can be retrained over time or as necessary. The retraining can result from analyzing further images. When the analysis determines a human perception state, the human perception state can be provided on the user device.

FIG. 1 is a flow diagram for deep learning in situ retraining. One or more human perception states for an individual can be determined. The individual can be interacting with a personal electronic device such as a handheld device or computer device, consuming media such as video or audio, traveling in a vehicle, and so on. The human perception states can include drowsiness, distraction, sadness, happiness, anger, engagement, and so on. The one or more human perception states that can be evaluated can be provided to the individual or to a content provider, used to control various elements of a vehicle, and so on. Images that include facial data are obtained, where the images can include video, still images, or near-infrared (NIR) images. A server device is used to train a set of weights on layers for deep learning. The layers for deep learning can implement the human perception state analysis. The training can be based on using a first set of "known good" or training data. A subset of the weights can be deployed to the deep learning node of a user device. The weights can be used to enable the human perception state analysis. An additional set of weights can be retrained by using a second set of training data. The human perception state analysis can produce one or more human perception states. A human perception state can be provided on a user device.

The flow 100 includes obtaining a plurality of images that include facial data 110 for human perception state analysis. The plurality of images can include video, video frames, still images, near-infrared (NIR) images, and so on. In embodiments, the collecting images can be accomplished using one or more imaging devices. An imaging device can include a camera or other imaging device. A camera can include a webcam, a video camera, a still camera, a thermal imager, a CCD device, a phone camera, a three-dimensional camera, a depth camera, a light field camera, multiple webcams used to show different views of a person, or any other type of image capture apparatus that can allow captured data to be used in an electronic system. In other embodiments, an imaging device within the plurality of imaging devices can include an infrared imaging device. The imaging can be collected continuously. In further embodiments, the human perception state data to be analyzed can be based on intermittent obtaining 112 of images that include facial data. The intermittent collecting can be based on availability of an imaging device, a clear line of sight to a person, etc. Additional imaging can be collected, where the additional imaging can include images such as video images, still images, etc. Collecting images can occur at various points in time.

The flow 100 further includes obtaining audio information 114. The audio information can include audio collected while an individual is interacting with an electronic device or computing device, viewing or consuming a media presentation, situated within or around a vehicle, and so on. The audio information can include speech, where the speech can include a conversation between or among individuals, a conversation on a smartphone, etc. The audio information can include non-speech vocalizations. In embodiments, the non-speech vocalizations can include grunts, yelps, squeals, snoring, sighs, laughter, filled pauses, unfilled pauses, or yawns. Further embodiments include augmenting the analyzing based on the audio information. The augmenting can include synchronizing audio information such as a laugh with video information that shows the individual laughing. The human perception state analysis includes evaluating. In the flow 100, the evaluating includes analyzing pixels 116 within the further images to identify a facial portion. A facial portion can include a facial landmark, a facial region, and so on. The identifying of the facial portion can be based on edge detection. The identifying a facial portion can include operations such as rotation, translation, scaling (zoom in, zoom out), etc. In the flow 100, the evaluating includes identifying a facial expression 118 based on the facial portion. A facial expression can include a smile, a frown, a neutral expression, a smirk, and so on.

The flow 100 includes training, on a server device, a set of weights on a set of layers for deep learning 120. The weights and the layers for deep learning implement the human perception state analysis. Various techniques can be used for deep learning. Deep learning techniques can be based on clustering, reduction of dimensions, regression, classification, reinforcement learning, and the like. The learning can be accomplished using layers within a neural network. The deep learning can be accomplished using a deep neural network, where a deep neural network can include hidden layers within the neural network. The weights that can be trained can be used to adjust the neural network for deep learning. The weights can improve computational efficiency, convergence of neural network computations, and so on. In the flow 100, the training is performed with a first set of training data 122. The first set of training data can include images that include facial data. The training data comprises "known good" data that has been analyzed to determine an accurate or correct human perception state. The deep learning neural network that is being trained can analyze the training data. If the expected result of the analysis is obtained, that is the expected human perception state, then the deep learning neural network training has been successful. Various neural network techniques can be used for deep learning. In the flow 100, the deep learning can be performed using a convolutional neural network 124 (CNN). A CNN can include multiple layers, such as hidden layers, where the layers comprise nodes. The nodes within the layers are fully connected, where each node, element, or "neuron" of a given layer is connected to each node of a previous layer. Further, each node of the given layer is connected to each node of a subsequent layer. Other neural network techniques can be used. In the flow 100, the deep learning can be performed using a recurrent neural network 126 (RNN). An RNN can include multiple layers, such as hidden layers, in which connections between or among nodes can form a directed graph. The directed graph can be based on a temporal or other sequence.

The flow 100 includes deploying, on deep learning nodes 130, a subset of the set of weights. The subset of the weights can include weights associated with one or more nodes, weights associated with one or more layers, and so on. In embodiments, the deploying enables at least part of the human perception state analysis. The subset of the set of weights can be deployed by uploading by a user, downloading from a library, and so on. The deploying the subset of the set of weights can be accomplished using distribution techniques enabled within the deep learning neural network. The deploying can include backward propagation or backpropagation, forward propagation, and the like. The flow 100 further includes using a user device 132. The user device can include a personal electronic device such as a smartphone or a personal digital assistant (PDA), a computing device such as a laptop computer or a tablet computer, and so on. The deploying a subset of the set of weights can include providing the subset of weights to the user device. In the flow 100, the providing is performed without eye region input 134 from one or more of the input images obtained by the user device. The providing can be provided with torso input, audio input, physiological input, etc.

The flow 100 includes retraining, on the user device, an additional set of weights 140. The retraining can include manipulating one or more of the weights that were previously trained, manipulating additional weights within layers of the deep learning neural network, manipulating weights within additional layers of the deep learning neural network, and so on. In the flow 100, the additional set of weights is trained using a second set of training data 142. The second set of training data can comprise additional images that include facial data of the individual from whom a first set of images was obtained. The second set of training data can comprise images including facial data of a second individual, where the second individual is experiencing a substantially similar human perception state to the first individual. The second set of training data can further comprise images including facial data of a second individual, where the second individual is experiencing a substantially dissimilar human perception state to the first individual. The second set of training data can be used to train the deep learning neural network to determine more than one human perception state. In embodiments, the retraining can include additional nodes on one or more deep learning layers of the user device. The training of additional nodes can be used to improve classification or convergence of the deep learning neural network. In further embodiments, the second set of training data comprises less data than the first set of training data. Discussed below, the selecting can be based on backward propagation from additional nodes, pruning of nodes, and so on. In other embodiments, the retraining comprises deep learning in situ retraining.

In embodiments, the retraining can include additional deep learning layers of the user device. The additional deep learning layers can include deep learning layers added to the previously trained deep learning layers, deep learning layers for which weights were not previously determined, etc. The flow 100 further includes selecting results 150 from the subset of weights and the additional set of weights. The selecting results can be based on one or more functions, algorithms, heuristics, techniques, and so on. In embodiments, the selecting can be based on a softmax function. A softmax function can be used to produce a probability distribution. The probability distribution can be determined by normalizing elements of an input vector. The probability distribution can include probability values, where the probability values can be proportional to exponentials of the elements or input values within the input vector. Values within the input vector can include negative values, values greater than one, and so on. After applying the softmax function, each element of the input vector can map to a value between zero and one. The sum of the elements resulting from the softmax function equals one, so the values of the elements can be treated as probabilities. Discussed below, the selecting can be based on backward propagation from additional nodes, pruning of nodes, and so on.

The flow 100 further includes providing, on the user device, a human perception state 160. The providing the human perception state is based on the subset of the set of weights, the additional set of weights, and input images obtained by the user device. Discussed throughout, the user device can include a smartphone, PDA, tablet, laptop computer, and so on. In embodiments, the human perception state can include drowsiness, fatigue, distraction, impairment, sadness, stress, happiness, anger, frustration, confusion, disappointment, hesitation, human perception overload, focusing, engagement, attention, boredom, exploration, confidence, trust, delight, disgust, skepticism, doubt, satisfaction, excitement, laughter, calmness, curiosity, humor, depression, envy, sympathy, embarrassment, poignancy, or mirth. The human perception state can include one or more emotional states, mental states, cognitive states, and so on. In embodiments, the human perception state includes a mood. The human perception state can include more than one mood. In embodiments, the mood can be one or more of sadness, stress, happiness, anger, frustration, confusion, disappointment, hesitation, cognitive overload, focusing, engagement, attention, boredom, exploration, confidence, trust, delight, disgust, skepticism, doubt, satisfaction, excitement, laughter, calmness, curiosity, humor, depression, envy, sympathy, embarrassment, poignancy, or mirth.

The flow 100 further includes providing the additional set of weights and a topology 170 of the additional nodes back to the server device. The additional set of weights can include expanded subsets of the set of weights, different subsets of the set of weights, and so on. The server device can include the user device, a local server, a remote server, a cloud server, a mesh server, etc. An additional topology can include adding to the deep learning neural network one or more nodes, layers, arcs, and so on. The added layers can include hidden layers, bottleneck layers, activation layers, etc. The weights associated with the layers of the deep learning neural network can be modified. In embodiments, the modifying includes modifying the set of weights that were trained based on the additional set of weights and the topology. The modifying the set of weights can be based on nodes which are selected based on the softmax function, nodes which are pruned based on node importance, node activity, or an entropy of weights, etc. An "end" layer within the set of layers can provide output indicative of human perception state. Neural networks can have many "last layers", but in practice, the end last layer will be at the end of a set of nodes, either representing a branch from an existing network via the addition of extra nodes, or an extension. In embodiments, an end layer within the set of layers provides output indicative of human perception state. The output indicative of human perception state can include a label, an intensity, a duration, a percentage, and so on. The output indicative of human perception can include an emoji, a GIF, an animation, and the like. The flow 100 further includes tuning the end layer within the set of layers for a particular human perception state 172. The tuning can be performed "by hand" or automatically, where automatic adjustment can be based on training data or other data. The tuning can be performed to improve convergence or computational efficiency for identifying a particular human perception state. In embodiments, the training, the deploying, the retraining, and the modifying comprise distributed machine learning. Distributed machine learning can be accomplished using one or more of a user device, a local server, a remote server, and so on. Various steps in the flow 100 may be changed in order, repeated, omitted, or the like without departing from the disclosed concepts. Various embodiments of the flow 100 can be included in a computer program product embodied in a non-transitory computer readable medium that includes code executable by one or more processors.

Figure 2:
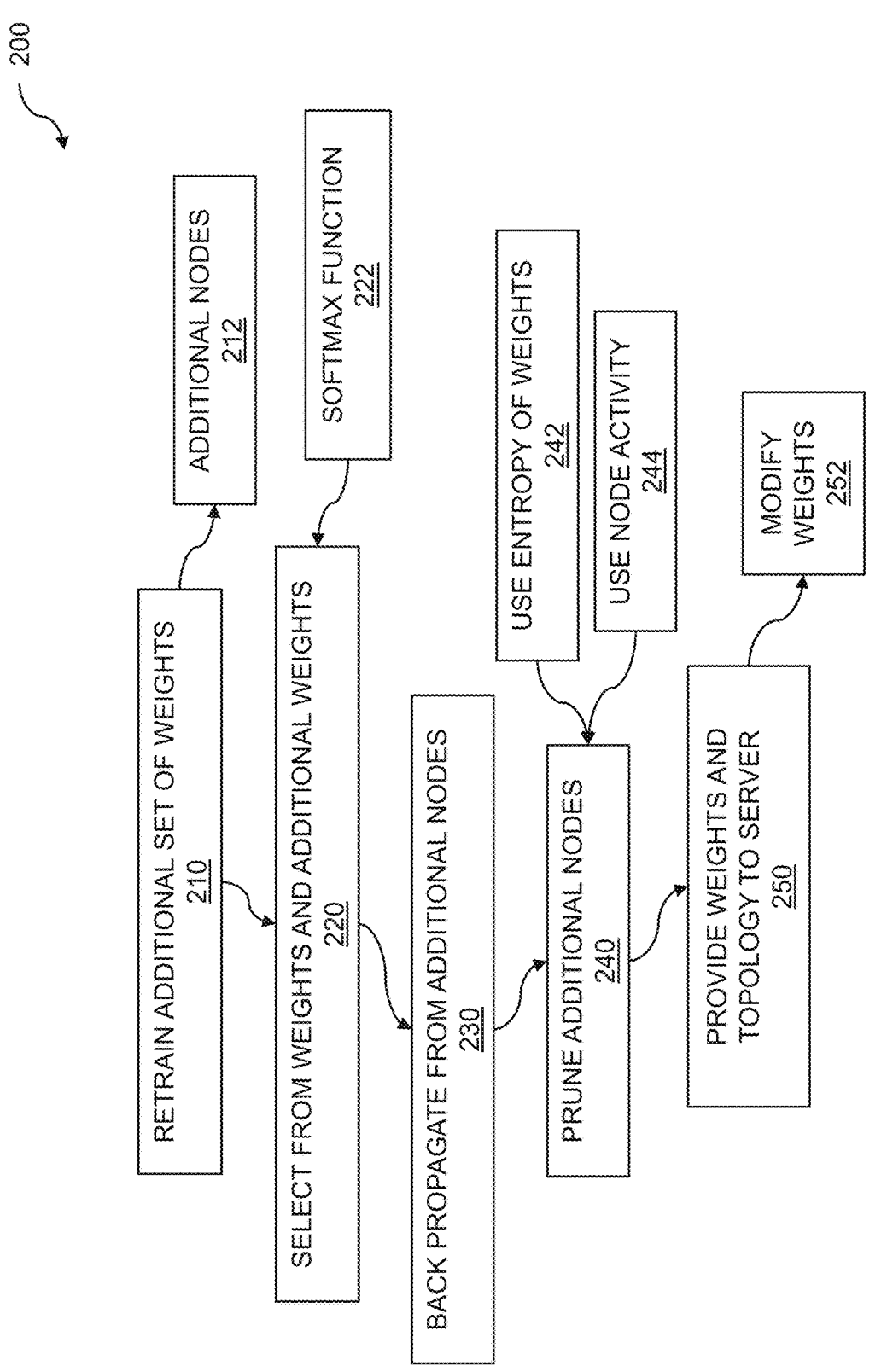
FIG. 2 is a flow diagram for retraining additional weights.

FIG. 2 is a flow diagram for retraining additional weights. Described throughout, a neural network trained for deep learning can be used for human perception state analysis. A given human perception state can result from an individual interacting with a personal electronic device or a computing device, consuming a media presentation, traveling in a vehicle, and so on. The human perception state can include attentive or distracted, alert or impaired, happy or sad, and so on. A human perception state determined by using human perception state analysis can be used to make content or media recommendations, to adjust operation of a vehicle, and the like. The human perception state can be provided to the individual, to a content provider, to an operator of a vehicle, etc. Images that include facial data are obtained. A first set of training data is used on a server device to train a set of weights on a set of layers for deep learning. A subset of the weights is deployed on deep learning nodes of a user device. An additional set of weights is retrained using a second set of training data. A human perception state is provided on the user device.

The flow 200 includes retraining, on the user device, an additional set of weights 210. The additional set of weights can include additional weights associated with nodes within layers of a neural network such as a deep learning neural network. The additional set of weights can be trained using a second set of training data. The training data can include images that include facial data. The training data can further include one or more expected human perception states. The training includes analyzing the training data and comparing the analysis results to the known good or expected results. When the analysis results differ from the known good results, weights can be readjusted or retrained until the analysis of the second set of training data yields the expected results. In the flow 200, the retraining can include additional nodes 212 on one or more deep learning layers of the user device. That is, the retraining can adjust nodes trained using a first set of test data, can adjust a different set of nodes, and so on.

The flow 200 includes selecting results from subset of weights and the additional set of weights 220. The selecting can be accomplished using a variety of algorithms, heuristics, techniques, and so on. The selecting can be based on calculating a result, choosing a result from a set of likely candidate results, etc. In the flow 200, the selecting can be based on a softmax function 222. A softmax function can produce a probability distribution by normalizing an input vector. The probability distribution can include probabilities, where the probabilities can be proportional to exponentials of the input values within the input vector. Values within the input vector can include values greater than one, negative values, and so on. After applying the software function, each element of the input vector will map to a value between zero and one. Further, the sum of the elements equals one. The mapped values also sum to one, so these values can be treated as probabilities.

The flow 200 further includes backward propagation from the additional nodes 230. Backward propagation or "backpropagation" can be used to update weights, biases, or other values associated with nodes within layers of a neural network such as a deep learning neural network. In backpropagation, weight values can be iteratively and recursively updated based on a function, an algorithm, a heuristic, and so on. In embodiments, the backpropagation can be based on an algorithm such as a gradient-based algorithm for optimization. The flow 200 includes pruning one or more of the additional nodes 240. Nodes, such as nodes within a neural network for deep learning, can be pruned. The pruning or removing of the nodes can be used to simplify a neural network by reducing its size. The pruning can also be used to reduce computational complexity by reducing a number of computations, by shrinking a search space, etc. Various techniques such as techniques based on functions, algorithms, or heuristics, can be used for determining which nodes to prune. In embodiments, the pruning can be based on node importance. The importance of a node can be based on a number of connections or arcs to or from the node, a likelihood of accomplishing convergence such as converging on weight values, and so on. In a usage example, a node which has little likelihood of determining a human perception state based on analysis can be pruned. In the flow 200, the node importance can be evaluated using entropy of weights 242. The entropy of weights can be used to determine a maximum number of bits required to represent a weight associated with a node within the deep learning neural network. The entropy of weights can include a generalized compression technique, where the generalized compression technique can be used for reducing the size of the deep learning neural network. In the flow 200, the node importance can be evaluated using node activity 244. Nodes within the deep learning neural network that perform few operations or exhibit low levels of activity can be characterized as low importance nodes. Low importance nodes can be pruned.

The flow 200 includes providing the additional set of weights and a topology of the additional nodes 250 back to the server device. Discussed throughout, the training, retraining, or pruning of weights, etc., can take place on a server device. A server device can include a local server, a remote server, a cloud server, a mesh server, and so on. The providing the additional set of weights and the topology to the server can enable the server to train further weights associated with nodes within the deep learning network, to update or retrain weights, to prune weights, and so on. The flow 200 further includes modifying the set of weights 252 that were trained based on the additional set of weights and the topology. The modifying the weights can include updating the weight values, retraining the weight values, and so on. Various steps in the flow 200 may be changed in order, repeated, omitted, or the like without departing from the disclosed concepts. Various embodiments of the flow 200 can be included in a computer program product embodied in a non-transitory computer readable medium that includes code executable by one or more processors.

Figure 3:
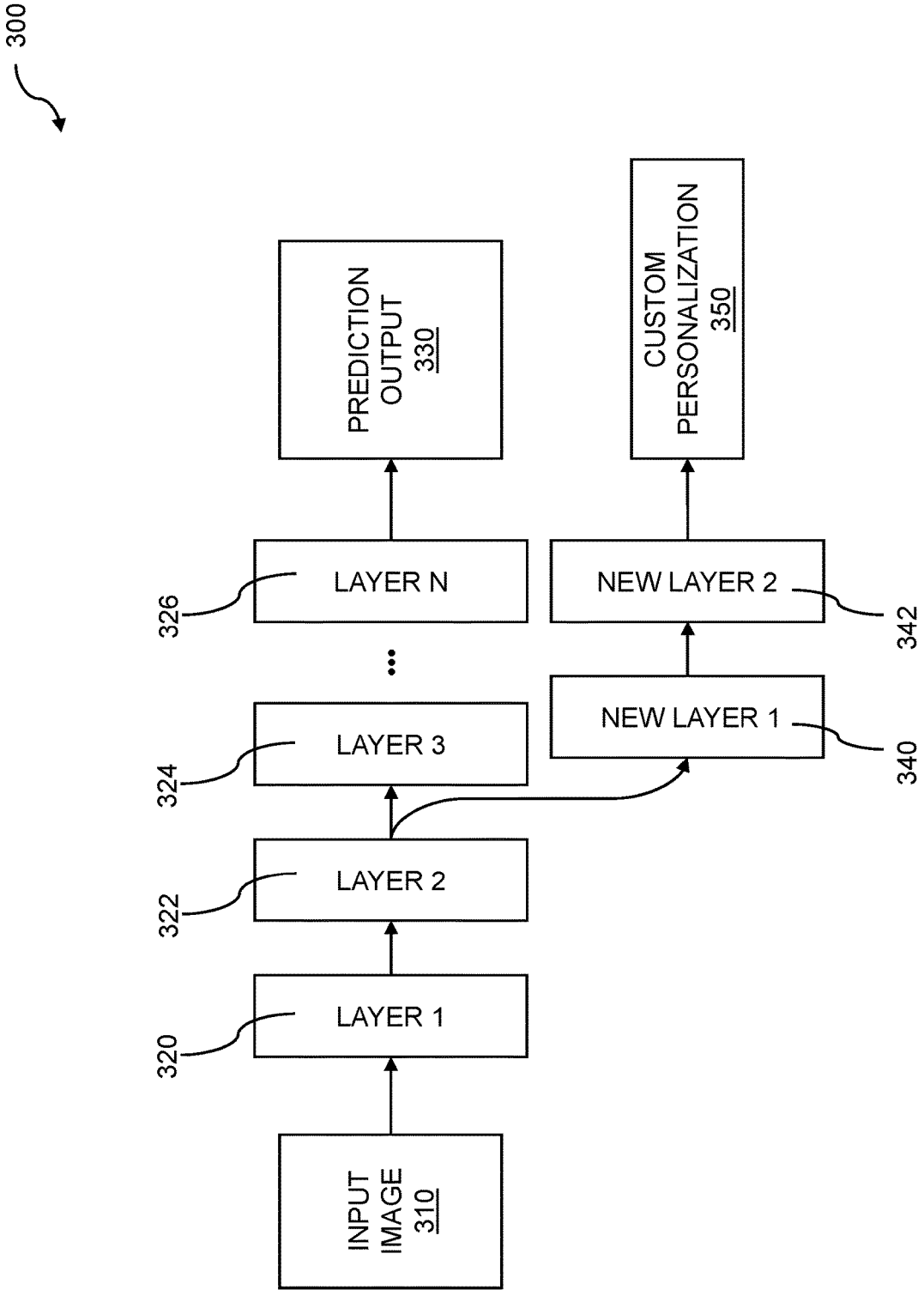
FIG. 3 shows device training by creating a new branch.

FIG. 3 shows device training by creating a new branch. Machine learning, such as deep learning, can be accomplished by training a variety of computational devices. The computational devices can include computing devices such as laptop or desktop computers, servers, cloud servers, mesh servers, and so on. The computational devices can also include devices with more modest computational capabilities such as personal electronic devices including smartphones, PDAs or tablets, digital cameras such as webcams, and the like. This latter variety of computational devices can be used for edge-based learning. Edge-based learning supports deep learning in situ retraining. A plurality of images that include facial data is obtained for human perception state analysis. A set of weights on a set of layers for deep learning is trained on a server device. The layers for deep learning implement the human perception state analysis. The training is performed with a first set of training data. A subset of the set of weights is deployed on deep learning nodes of a user device, where the deploying enables at least part of the human perception state analysis. An additional set of weights is retrained on the user device, where the additional set of weights is trained using a second set of training data. A human perception state is provided on the user device. The providing is based on the subset of the set of weights, the additional set of weights, and input images obtained by the user device.

Device training by creating a new branch is shown 300. A device can be trained by proposing a model. The model can include one or more layers within a neural network, or other network, such as layer 1 320, layer 2 322, layer 3 324, layer N 326, and so on. While four layers are shown, other numbers of layers can be included. The layers can include one or more of an input layer, an output layer, a hidden layer, an activation layer, a bottleneck layer, etc. The training can be based on an input image 310. The input image can include data such as facial data, torso data, and the like. Other input data such as audio data or physiological data can also be used. The training can further include a prediction output 330. The prediction output can include one or more of an emotion, a mood, a cognitive state, a mental state, and so on. In embodiments, the prediction output includes one or more human perception states. The model can be retrained by reapplying the prediction output and one or more new emotions, moods, cognitive or mental states, human perception states, and so on.

Training on a device such as a user device includes learning one or more new weights, where the new weights can be used to accomplish custom training. The custom training can be performed for an individual using that person's user device. The training can be used to determine one or more human perception states for the individual. The training can be accomplished by leaving the model previously discussed unchanged, while adding a new branch. The new branch can include an arc to one or more new layers on the user device. In the figure, the new arc can couple layer 2 322 to a new layer 1 340, a new layer 2 342, and so on. While two additional layers are shown, other numbers of layers can be introduced in the new branch. The layers of the new branch can be trained in order to obtain a custom personalization 350. The custom personalization can be used to efficiently identify one or more human perception states experienced by the individual. The prediction output of the original model can also be determined.

Figure 4:
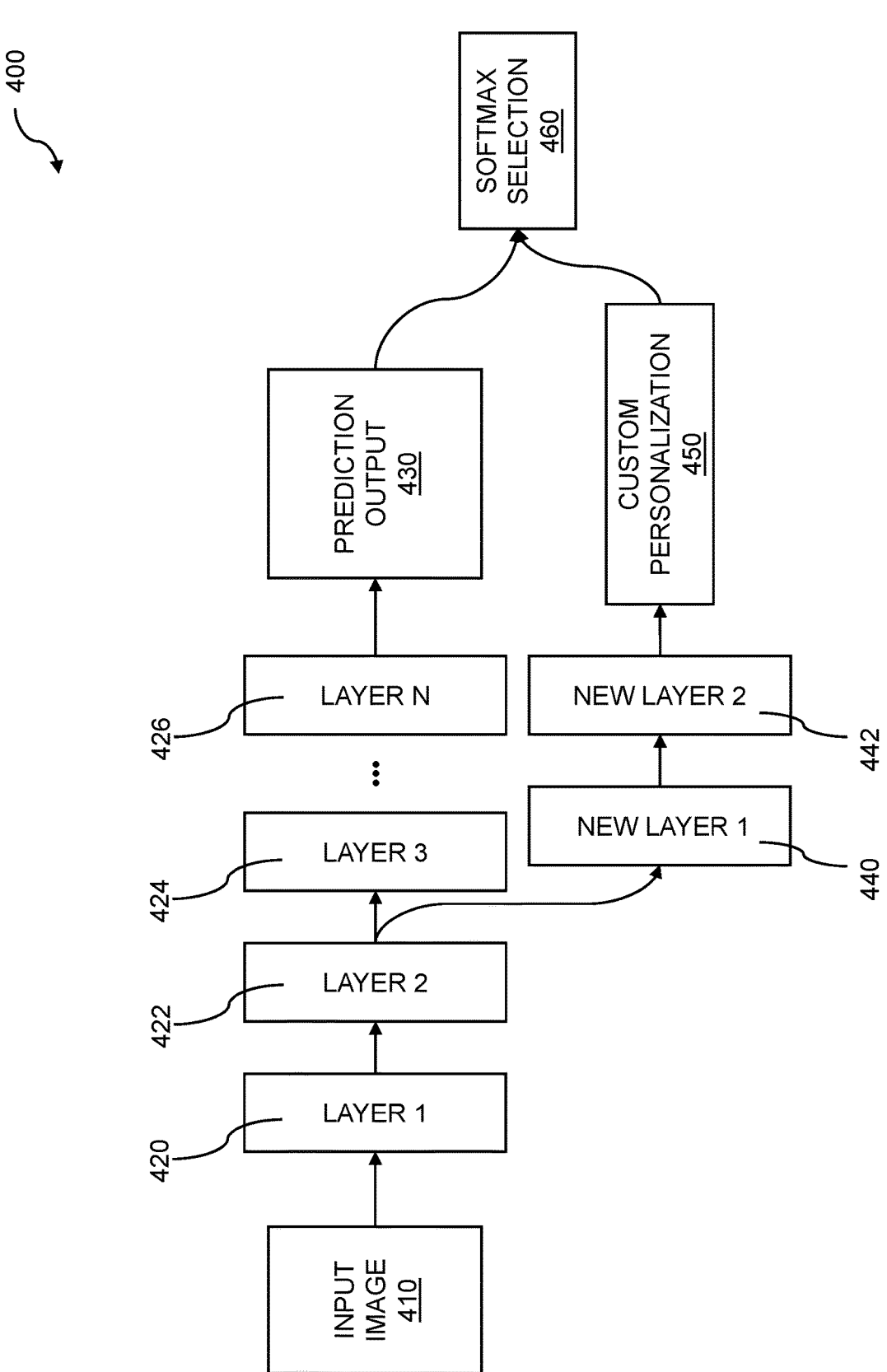
FIG. 4 illustrates device training by choosing a best prediction solution.

FIG. 4 illustrates device training by choosing a best prediction solution 400, in this case, a softmax function. Edge-based device learning or training, such as edge-based deep learning, can be accomplished using a model and a new branch of the model. The new branch of the model can be associated with a user device and can be customized to improve accuracy of predicting a human perception state, an emotional state or mood, a cognitive or mental state, and so on. Training by choosing the best prediction solution enables deep learning in situ retraining. Choosing the best prediction solution can be based on a function, algorithm, heuristic, procedure, and so on. In embodiments, the choosing of the best prediction solution is based on a software function. Discussed previously, an image 410 can be processed using a model that comprises a plurality of layers. The layers can include one or more model layers such as layer 1 420, layer 2 422, layer 3 424, layer N 426, and so on. The results of using the model to process the input image can include a prediction output 430. In addition to the model, a new branch can be associated with the model, where the new branch can include new layers such as new layer 1 440, new layer 2 442, and so on. The new layers can be associated with a user device. The results of using the new layers can include a custom personalization 450. In a usage example, an input image which contains facial data is processed using the model, and is further processed using the model comprising the new branch. The model can produce a prediction output, and the new branch can produce a custom personalization. One of the prediction output or the custom personalization can be selected by a function, algorithm, heuristic, procedure, and so on. In embodiments, the selection of the prediction output or the custom personalization is performed based on softmax selection 460.

Figure 5:
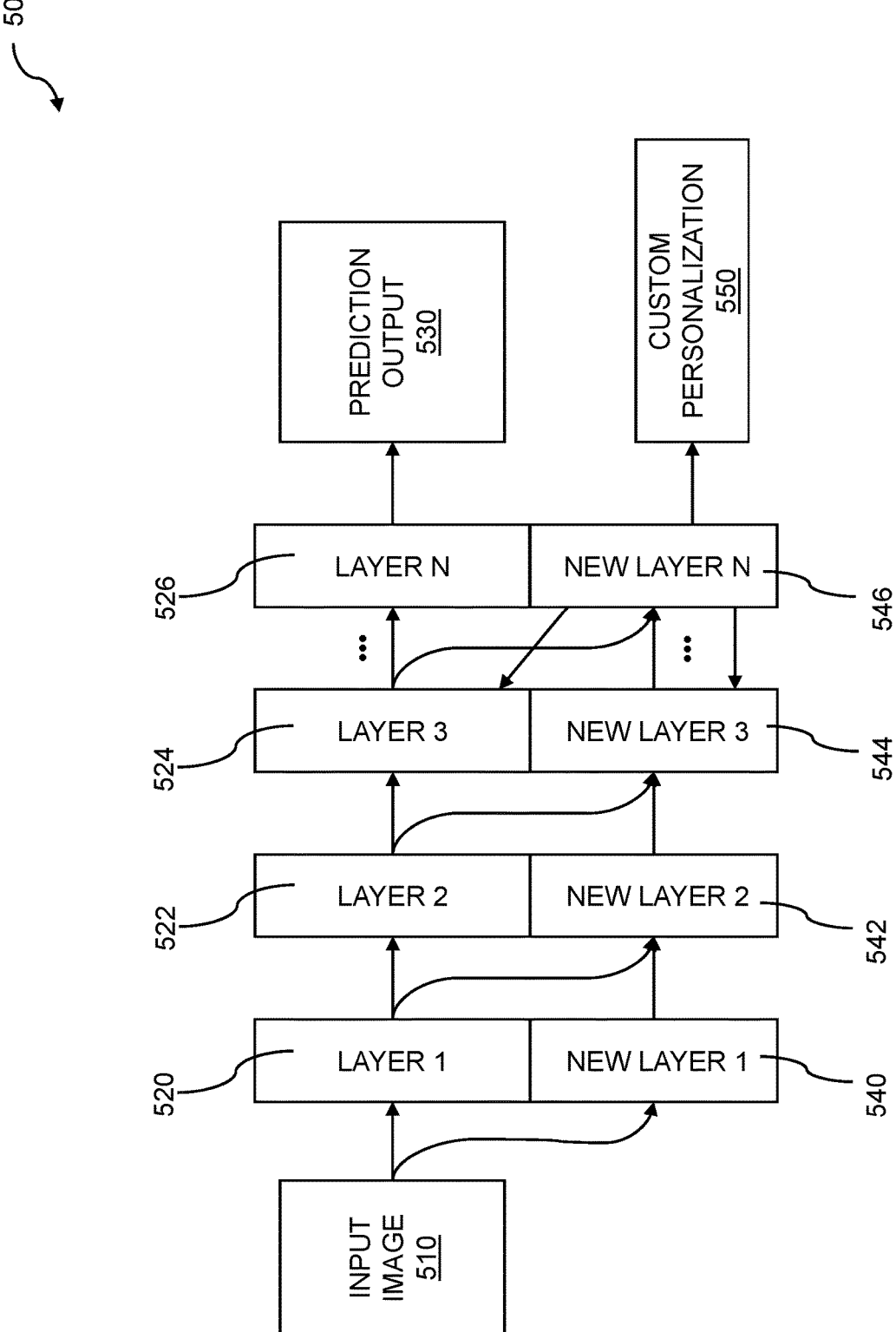
FIG. 5 shows device training by adding layers to an existing network.

FIG. 5 shows device training by adding layers to an existing network 500. A model can be used for processing an input image to produce a prediction output. Layers can be added to an existing model network in order to determine a custom personalization. Device training by adding layers to an existing network supports deep learning in situ training. An input image 510 can be processed by one or more layers of a model, such as layer 1 520, layer 2 522, layer 3 524, layer N 526, and so on. The results of processing the input image by the layers of the model can include a prediction output 530. New layers can be added to the existing model network. The new layers can include new layer 1 540, new layer 2 542, new layer 3 544, new layer N 546, and so on. The inputs to the added layers can include an input from an existing layer within the model network, an input from a new layer, and so on. The results of processing the input image by the added layers, a combination of model layers and new layers, etc., can include a custom personalization 550. Embodiments include backward propagation from the additional nodes, such as backward propagation from new layer N to layer 3. The backward propagation can enable adjustments of weights associated with layers of the model.

Figure 6:
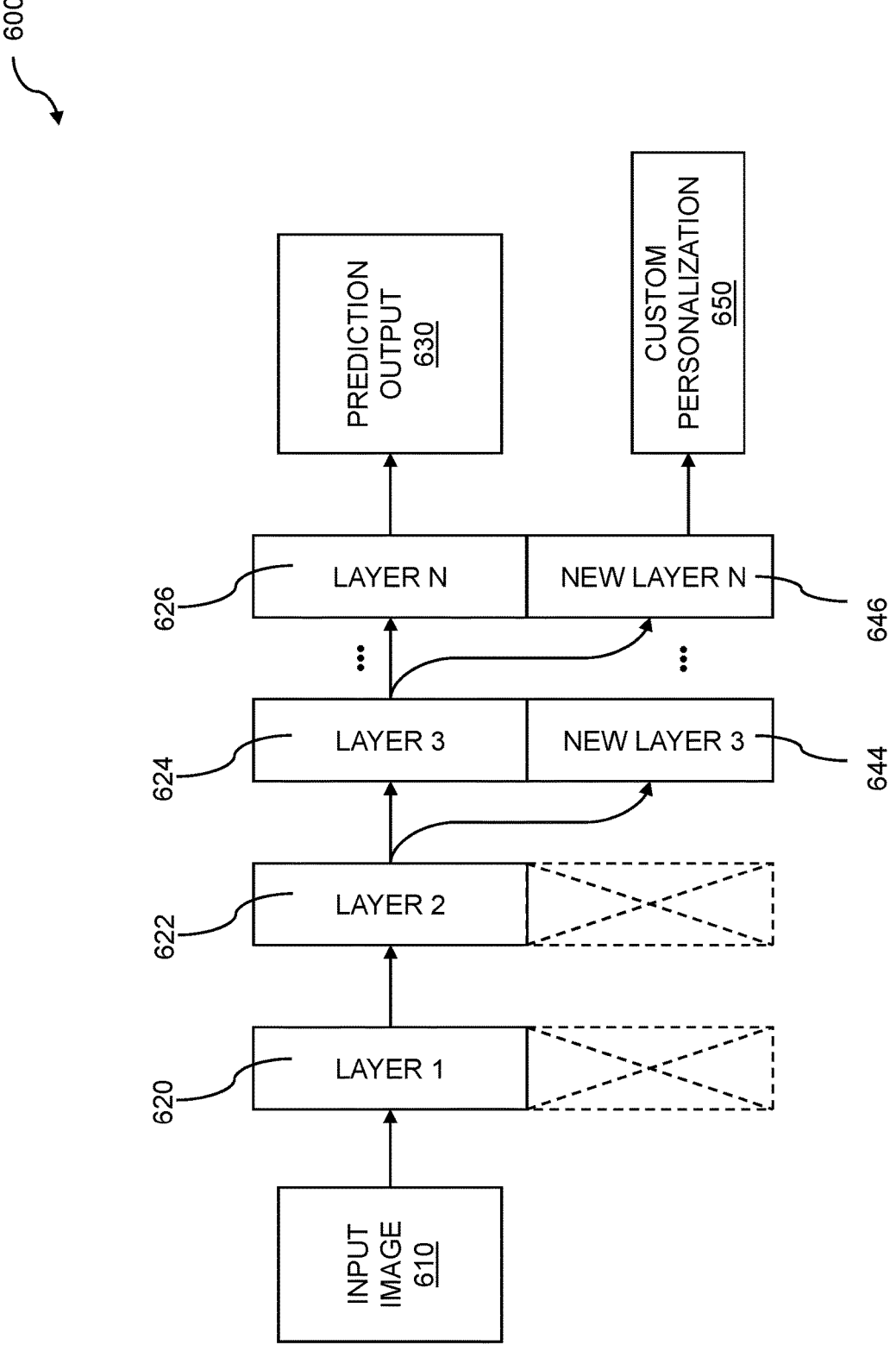
FIG. 6 illustrates pruning the model.

FIG. 6 illustrates pruning the model. Layers of the model, such as one or more new layers, can be pruned from the model 600. The pruning can be accomplished based on successful training of weights within one or more layers of the model, of layers added to the model, and so on. The pruning can be performed to reduce computational complexity, to improve convergence of the network, and so on. Pruning of the model can be accomplished based on backward propagation. Pruning of the model supports deep learning in situ retraining. An input image 610 can be processed by one or more layers of a model. The layers of the model can include layer 1 620, layer 2 622, layer 3 624, layer N 626, etc. The output resulting from the processing of the input image by the layers of the model can include a prediction output 630. New layers remaining after pruning the model can include new layer 3 644 and new layer N 646. The output resulting from the processing on the input image by one or more layers of the model and one or more new layers can include custom personalization 650.

Figure 7:
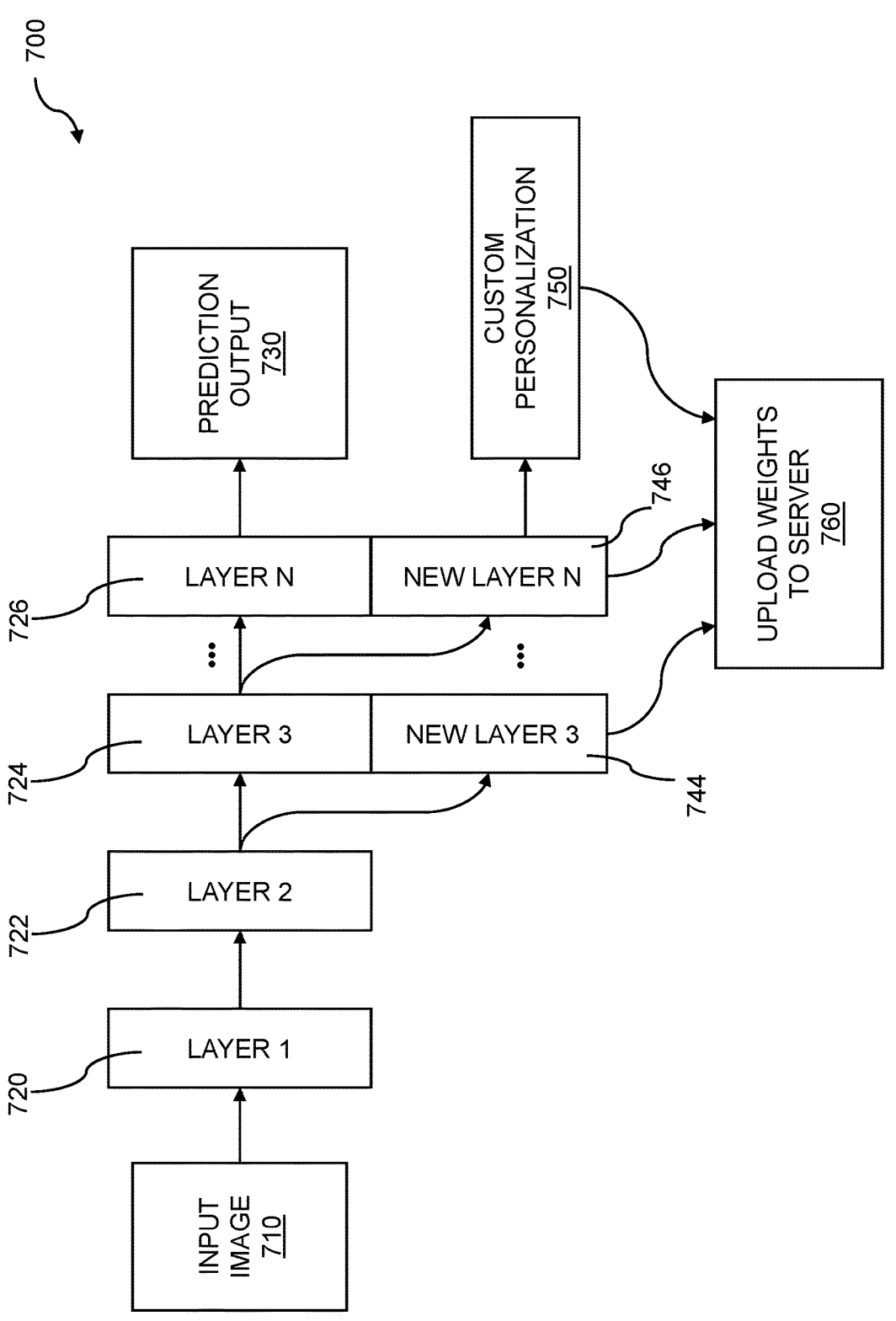
FIG. 7 shows sharing weights with a server device.

FIG. 7 shows sharing weights with server device 700. Discussed throughout, weights such as weights associated with layers for deep learning can be trained using a set of training data. An additional set of weights can be retrained using a second set of training data. The trained weights and the retrained weights can be deployed on deep learning nodes on a user device. The trained and the retrained weights can be reused by sharing the weights and the retrained weights with a server device. Sharing weights with a server device supports deep learning in situ retraining. Discussed previously, an input image such as input image 710 can be processed by one or more model layers such as layer 1 720, layer 2 722, layer 3 724, layer N 726, and so on. While four layers are shown, other numbers of layers can be present. The results of processing or analyzing the input image with the layers of the model can include a prediction output 730. The prediction output can include a human perception state. The prediction output can include an expected output from processing the input image with the model layers. The model can further include new layers such as new layer 3 744, new layer N 746, and so on. The new layers can represent new model layers that remain after pruning of the model. The results of the analyzing of the input image with the model layers and the remaining or unpruned new layers can include a custom personalization 750. The training and the retraining of the model comprise deep learning. The deep learning can include distributed deep learning, where the distributed deep learning can include deep learning on one or more computing devices. The computing devices can include a server device, a user device and so on. The results of the learning can be uploaded to a server device 760. The uploading of the trained weights, the retrained weights, the remaining or unpruned new layers, and so on, can be uploaded to a server such as server 760. In addition to the weights, the custom personalization results can also be uploaded to the server. The uploaded weights and the custom personalization can be reused. The reuse of the weights and the custom personalization can include sharing the weights or the custom personalization to a second or other user device. The uploaded weights can also be used to analyze or process other input images.

Figure 8:
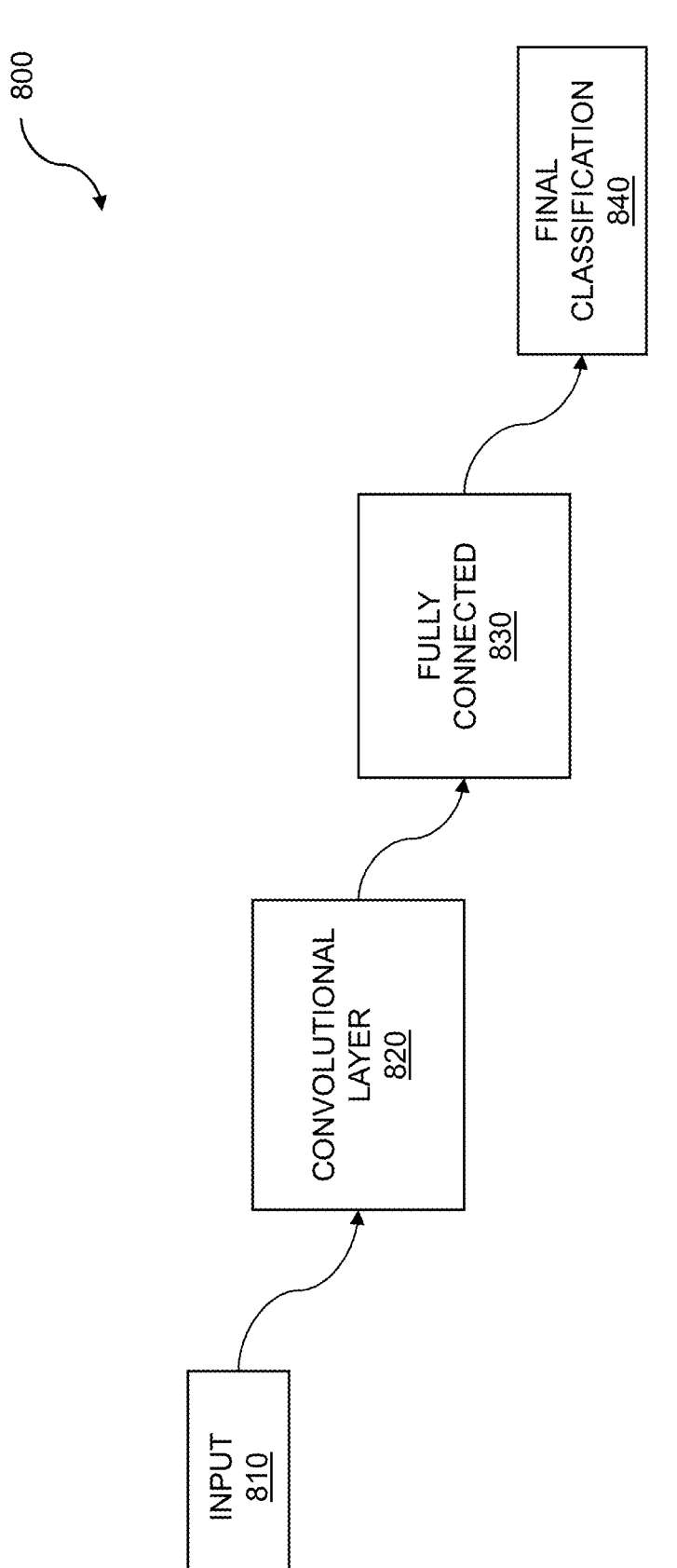
FIG. 8 illustrates a pipeline for facial analysis layers.

FIG. 8 illustrates a pipeline for facial analysis layers. A pipeline of facial analysis layers can be applied to deep learning in situ retraining. The deep learning in situ retraining can use a neural network trained for human perception state evaluation. Images that include facial data are obtained for human perception state analysis. A set of weights is trained on a set of layers for deep learning that implement the human perception state analysis. A subset of the weights is deployed on deep learning nodes of a user device. An additional set of weights is retrained on the user device. A human perception state is provided on the user device, based on the subset of the set of weights, the additional set of weights, and input images obtained by the user device.

The example 800 includes an input layer 810. The input layer 810 receives image data. The image data can be input in a variety of formats, such as JPEG, TIFF, BMP, and GIF. Compressed image formats can be decompressed into arrays of pixels, wherein each pixel can include an RGB tuple. The input layer 810 can then perform processing such as identifying boundaries of the face, identifying landmarks of the face, identifying regions of the face, extracting features of the face, and/or rotating a face within the plurality of images. The output of the input layer can then be input to a convolutional layer 820. The convolutional layer 820 can represent a convolutional neural network and can contain a plurality of hidden layers. A layer from the multiple layers can be fully connected. The convolutional layer 820 can reduce the amount of data feeding into a fully connected layer 830. The fully connected layer processes each pixel/data point from the convolutional layer 820. A last layer within the multiple layers can provide output indicative of a certain human perception state. In embodiments, the human perception state can include drowsiness, fatigue, distraction, impairment, sadness, stress, happiness, anger, frustration, confusion, disappointment, hesitation, human perception overload, focusing, engagement, attention, boredom, exploration, confidence, trust, delight, disgust, skepticism, doubt, satisfaction, excitement, laughter, calmness, curiosity, humor, depression, envy, sympathy, embarrassment, poignancy, or mirth. The last layer is the final classification layer 840. The output of the final classification layer 840 can be indicative of the one or more human perception states analyzed from faces within the images that are provided to input layer 810.

Figure 9:
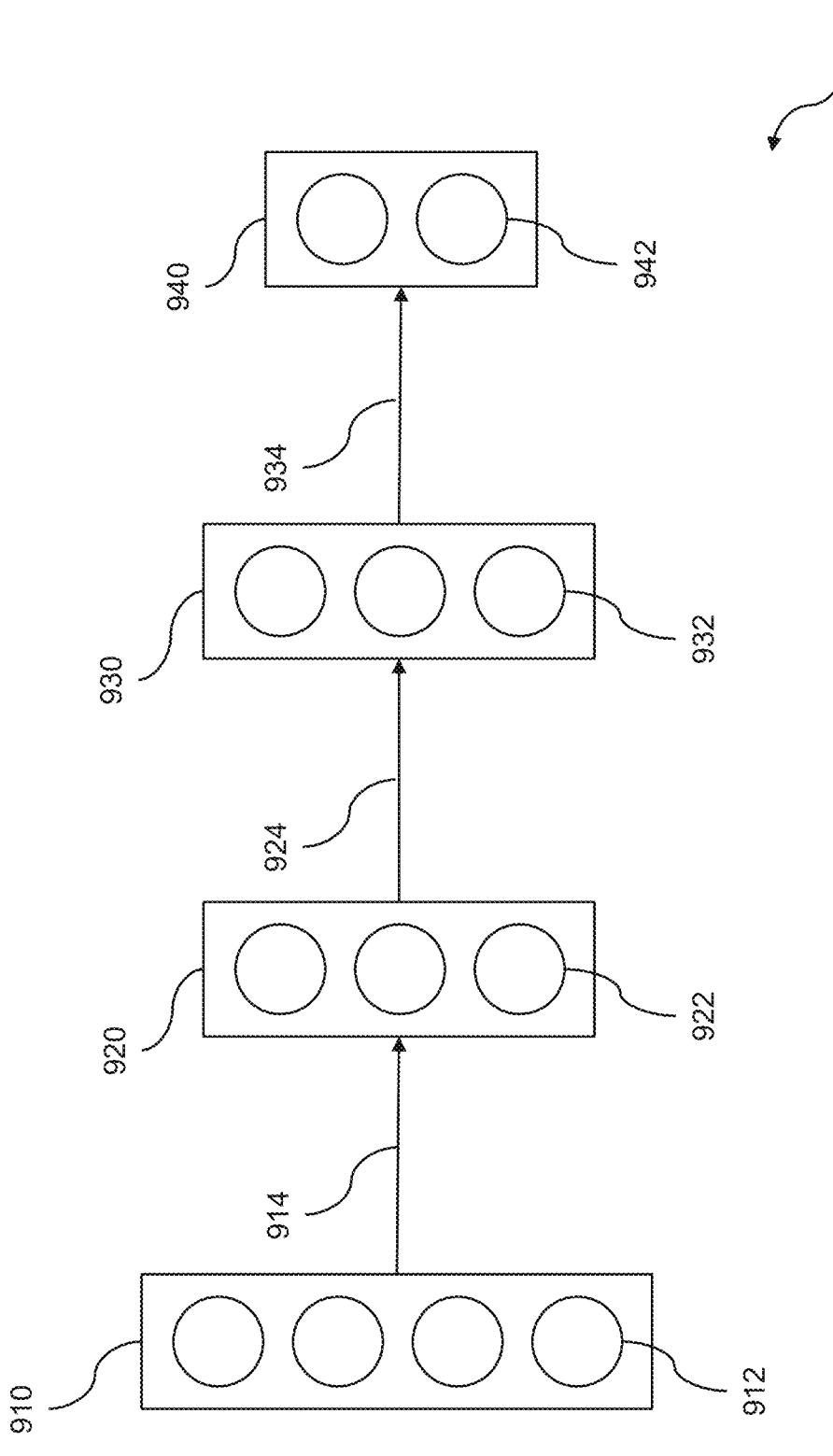
FIG. 9 shows a deep network for facial expression parsing.

FIG. 9 shows a deep network for facial expression parsing. Facial expression parsing can be applied to neural network training, where the neural network training supports deep learning in situ retraining. The deep learning is used to implement human perception state analysis. A plurality of images that include facial data is obtained for human perception state analysis. A set of weights that implement the human perception state analysis is trained on a set of layers for deep learning. The training is performed on a server device with a first set of training data. A subset of the set of weights is deployed on deep learning nodes of a user device. The deploying enables at least part of the human perception state analysis. An additional set of weights is retrained on the user device. The additional set of weights is trained using a second set of training data. A human perception state is provided on the user device. The providing is based on the subset of the set of weights, the additional set of weights, and input images obtained by the user device.

A deep network 900 is shown. The deep network can be used for a variety of purposes including machine learning, deep learning, and so on. Deep learning can be performed using a neural network technique. In embodiments, the deep learning can be performed using a convolutional neural network. One or more other neural network techniques can also be used. In other embodiments, the deep learning can be performed using a recurrent neural network. A first layer 910 of the deep network is comprised of a plurality of nodes 912. Each of the nodes 912 serves as a neuron within a neural network. The first layer can receive data from an input layer. The output of the first layer 910 feeds to the next layer 920. The layer 920 further comprises a plurality of nodes 922. A weight 914 adjusts the output of the first layer 910 which is being input to the layer 920. In embodiments, the layer 920 is a hidden layer. The output of the layer 920 feeds to a subsequent layer 930. That layer 930 further comprises a plurality of nodes 932. A weight 924 adjusts the output of the second layer 920 which is being input to the third layer 930. In embodiments, the third layer 930 is also a hidden layer. The output of the third layer 930 feeds to a fourth layer 940 which further comprises a plurality of nodes 942. A weight 934 adjusts the output of the third layer 930 which is being input to the fourth layer 940. The fourth layer 940 can be a final layer, providing a facial expression, a human perception state, cognitive state, mood, and/or emotion, etc., as its output. The facial expression can be identified using a hidden layer from the one or more hidden layers. The weights can be provided on inputs to the multiple layers to emphasize certain facial features within the face. The training can comprise assigning weights to inputs on one or more layers within the multilayered analysis engine. In embodiments, one or more of the weights (914, 924, and/or 934) can be adjusted or updated during training. The assigning weights can be accomplished during a feed-forward pass through the multilayered analysis engine. In a feed-forward arrangement, the information moves forward from the input nodes through the hidden nodes and on to the output nodes. Additionally, the weights can be updated during a back-propagation process through the multilayered analysis engine.

Figure 10:
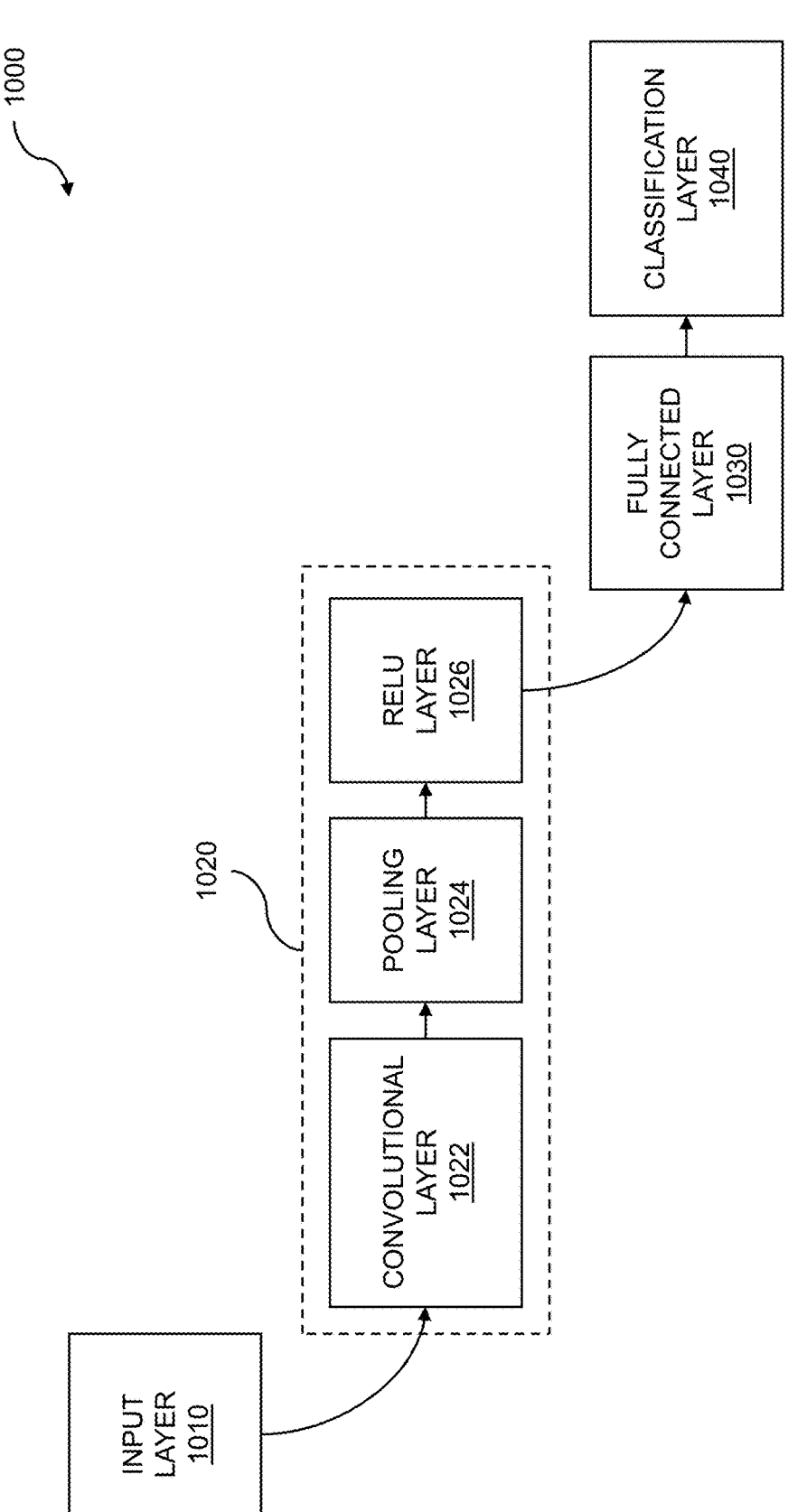
FIG. 10 is an example illustrating a convolutional neural network (CNN).

FIG. 10 is an example illustrating a convolutional neural network (CNN). A convolutional neural network 1000 can be used for deep learning, where the deep learning can be applied to deep learning in situ retraining. Images which include facial data are obtained for human perception state analysis. The images can include visible light-based images and near-infrared based images. A set of weights is trained on a set of layers for deep learning, where the training is performed with a first set of training data. A subset of the weights is deployed on deep learning nodes of a user device.

An additional set of weights is trained on the user device, where the additional weights are trained using a second set of training data. A human perception state is provided on the user device. The convolutional neural network can be applied to tasks such as the human perception state analysis, cognitive state analysis, mental state analysis, mood analysis, emotional state analysis, and so on. Human perception state data can include mental processes, where the mental processes can include attention, creativity, memory, perception, problem solving, thinking, use of language, or the like.

Perception analysis is a very complex task. Understanding and evaluating moods, emotions, mental states, or perception states, requires a nuanced evaluation of facial expressions or other cues generated by people. Perception state analysis is important in many areas such as research, psychology, business, intelligence, law enforcement, and so on. The understanding of perception states can be useful for a variety of business purposes, such as improving marketing analysis, assessing the effectiveness of customer service interactions and retail experiences, and evaluating the consumption of content such as movies and videos. Identifying points of frustration in a customer transaction can allow a company to take action to address the causes of the frustration. By streamlining processes, key performance areas such as customer satisfaction and customer transaction throughput can be improved, resulting in increased sales and revenues. In a content scenario, producing compelling content that achieves the desired effect (e.g., fear, shock, laughter, etc.) can result in increased ticket sales and/or increased advertising revenue. If a movie studio is producing a horror movie, it is desirable to know if the scary scenes in the movie are achieving the desired effect. By conducting tests in sample audiences, and analyzing faces in the audience, a computer-implemented method and system can process thousands of faces to assess the perception state at the time of the scary scenes. In many ways, such an analysis can be more effective than surveys that ask audience members questions, since audience members may consciously or subconsciously change answers based on peer pressure or other factors. However, spontaneous facial expressions can be more difficult to conceal. Thus, by analyzing facial expressions en masse in real time, important information regarding the general Perception state of the audience can be obtained.

Analysis of facial expressions is also a complex task. Image data, where the image data can include facial data, can be analyzed to identify a range of facial expressions. The facial expressions can include a smile, frown, smirk, and so on. The image data and facial data can be processed to identify the facial expressions. The processing can include analysis of expression data, action units, gestures, mental states, perception states, physiological data, and so on. Facial data as contained in the raw video data can include information on one or more of action units, head gestures, smiles, brow furrows, squints, lowered eyebrows, raised eyebrows, attention, and the like. The action units can be used to identify smiles, frowns, and other facial indicators of expressions. Gestures can also be identified, and can include a head tilt to the side, a forward lean, a smile, a frown, as well as many other gestures. Other types of data including physiological data can be collected, where the physiological data can be obtained using a camera or other image capture device, without contacting the person or persons. Respiration, heart rate, heart rate variability, perspiration, temperature, and other physiological indicators of perception state can be determined by analyzing the images and video data.

Deep learning is a branch of machine learning which seeks to imitate in software the activity which takes place in layers of neurons in the neocortex of the human brain. This imitative activity can enable software to "learn" to recognize and identify patterns in data, where the data can include digital forms of images, sounds, and so on. The deep learning software is used to simulate the large array of neurons of the neocortex. This simulated neocortex, or artificial neural network, can be implemented using mathematical formulas that are evaluated on processors. With the ever-increasing capabilities of the processors, increasing numbers of layers of the artificial neural network can be processed.

Deep learning applications include processing of image data, audio data, and so on. Image data applications include image recognition, facial recognition, etc. Image data applications can include differentiating dogs from cats, identifying different human faces, and the like. The image data applications can include identifying perception states, moods, mental states, emotional states, and so on, from the facial expressions of the faces that are identified. Audio data applications can include analyzing audio such as ambient room sounds, physiological sounds such as breathing or coughing, noises made by an individual such as tapping and drumming, voices, and so on. The voice data applications can include analyzing a voice for timbre, prosody, vocal register, vocal resonance, pitch, loudness, speech rate, or language content. The voice data analysis can be used to determine one or more perception states, moods, mental states, emotional states, etc.

The artificial neural network, such as a convolutional neural network which forms the basis for deep learning, is based on layers. The layers can include an input layer, a convolutional layer, a fully connected layer, a classification layer, and so on. The input layer can receive input data such as image data, where the image data can include a variety of formats including pixel formats. The input layer can then perform processing tasks such as identifying boundaries of the face, identifying landmarks of the face, extracting features of the face, and/or rotating a face within the plurality of images. The convolutional layer can represent an artificial neural network such as a convolutional neural network. A convolutional neural network can contain a plurality of hidden layers within it. A convolutional layer can reduce the amount of data feeding into a fully connected layer. The fully connected layer processes each pixel/data point from the convolutional layer. A last layer within the multiple layers can provide output indicative of a perception state. The last layer of the convolutional neural network can be the final classification layer. The output of the final classification layer can be indicative of the perception states of faces within the images that are provided to the input layer.

Deep networks including deep convolutional neural networks can be used for facial expression parsing. A first layer of the deep network includes multiple nodes, where each node represents a neuron within a neural network. The first layer can receive data from an input layer. The output of the first layer can feed to a second layer, where the latter layer also includes multiple nodes. A weight can be used to adjust the output of the first layer which is being input to the second layer. Some layers in the convolutional neural network can be hidden layers. The output of the second layer can feed to a third layer. The third layer can also include multiple nodes. A weight can adjust the output of the second layer which is being input to the third layer. The third layer may be a hidden layer. Outputs of a given layer can be fed to the next layer. Weights adjust the output of one layer as it is fed to the next layer. When the final layer is reached, the output of the final layer can be a facial expression, a perception state, a mental state, a characteristic of a voice, and so on. The facial expression can be identified using a hidden layer from the one or more hidden layers. The weights can be provided on inputs to the multiple layers to emphasize certain facial features within the face. The convolutional neural network can be trained to identify facial expressions, voice characteristics, etc. The training can include assigning weights to inputs on one or more layers within the multilayered analysis engine. One or more of the weights can be adjusted or updated during training. The assigning weights can be accomplished during a feed-forward pass through the multilayered neural network. In a feed-forward arrangement, the information moves forward from the input nodes, through the hidden nodes, and on to the output nodes. Additionally, the weights can be updated during a backpropagation process through the multilayered analysis engine.

Returning to the figure, FIG. 10 is an example showing a convolutional neural network 1000. The convolutional neural network can be used for deep learning, where the deep learning can be applied to perception state-based vehicle manipulation using near-infrared image processing. The deep learning system can be accomplished using a convolutional neural network or other techniques. The deep learning can accomplish facial recognition and analysis tasks. The network includes an input layer 1010. The input layer 1010 receives image data. The image data can be input in a variety of formats, such as JPEG, TIFF, BMP, and GIF. Compressed image formats can be decompressed into arrays of pixels, wherein each pixel can include an RGB tuple. The input layer 1010 can then perform processing such as identifying boundaries of the face, identifying landmarks of the face, extracting features of the face, and/or rotating a face within the plurality of images.

The network includes a collection of intermediate layers 1020. The multilayered analysis engine can include a convolutional neural network. Thus, the intermediate layers can include a convolutional layer 1022. The convolutional layer 1022 can include multiple sublayers, including hidden layers within it. The output of the convolutional layer 1022 feeds into a pooling layer 1024. The pooling layer 1024 performs a data reduction, which makes the overall computation more efficient. Thus, the pooling layer reduces the spatial size of the image representation to reduce the number of parameters and computations in the network. In some embodiments, the pooling layer is implemented using filters of size 2×2, applied with a stride of two samples for every depth slice along both width and height, resulting in a reduction of 75-percent of the downstream node activations. The multilayered analysis engine can further include a max pooling layer 1024. Thus, in embodiments, the pooling layer is a max pooling layer, in which the output of the filters is based on a maximum of the inputs. For example, with a 2×2 filter, the output is based on a maximum value from the four input values. In other embodiments, the pooling layer is an average pooling layer or L2-norm pooling layer. Various other pooling schemes are possible.

The intermediate layers can include a Rectified Linear Units (RELU) layer 1026. The output of the pooling layer 1024 can be input to the RELU layer 1026. In embodiments, the RELU layer implements an activation function such as $f(x) = \max(0, x)$, thus providing an activation with a threshold at zero. In some embodiments, the RELU layer 1026 is a leaky RELU layer. In this case, instead of the activation function providing zero when x<0, a small negative slope is used, resulting in an activation function such as $f(x) = 1(x<0)$ $(\alpha x)+1(x>=0)(x)$. This can reduce the risk of "dying RELU" syndrome, where portions of the network can be "dead" with nodes/neurons that do not activate across the training dataset. The image analysis can comprise training a multilayered analysis engine using the plurality of images, wherein the multilayered analysis engine can include multiple layers that include one or more convolutional layers 1022 and one or more hidden layers, and wherein the multilayered analysis engine can be used for emotional analysis.

The example 1000 includes a fully connected layer 1030. The fully connected layer 1030 processes each pixel/data point from the output of the collection of intermediate layers 1020. The fully connected layer 1030 takes all neurons in the previous layer and connects them to every single neuron it has. The output of the fully connected layer 1030 provides input to a classification layer 1040. The output of the classification layer 1040 provides a facial expression and/or perception state as its output. Thus, a multilayered analysis engine such as the one depicted in FIG. 10 processes image data using weights, models the way the human visual cortex performs object recognition and learning, and effectively analyzes image data to infer facial expressions and perception states.

Machine learning for generating parameters, analyzing data such as facial data and audio data, and so on, can be based on a variety of computational techniques. Generally, machine learning can be used for constructing algorithms and models. The constructed algorithms, when executed, can be used to make a range of predictions relating to data. The predictions can include whether an object in an image is a face, a box, or a puppy; whether a voice is female, male, or robotic; whether a message is legitimate email or a "spam" message; and so on. The data can include unstructured data and can be of large quantity. The algorithms that can be generated by machine learning techniques are particularly useful to data analysis because the instructions that comprise the data analysis technique do not need to be static. Instead, the machine learning algorithm or model, generated by the machine learning technique, can adapt. Adaptation of the learning algorithm can be based on a range of criteria such as success rate, failure rate, and so on. A successful algorithm is one that can adaptively learn as more data is presented to the algorithm. Initially, an algorithm can be "trained" by presenting it with a set of known data (supervised learning). Another approach, called unsupervised learning, can be used to identify trends and patterns within data. Unsupervised learning is not trained using known data prior to data analysis.

Reinforced learning is an approach to machine learning that is inspired by behaviorist psychology. The underlying premise of reinforced learning (also called reinforcement learning) is that software agents can take actions in an environment. The actions that are taken by the agents should maximize a goal such as a "cumulative reward". A software agent is a computer program that acts on behalf of a user or other program. The software agent is implied to have the authority to act on behalf of the user or program. The actions taken are decided by action selection to determine what to do next. In machine learning, the environment in which the agents act can be formulated as a Markov decision process (MDP). The MDPs provide a mathematical framework for modeling of decision making in environments where the outcomes can be partly random (stochastic) and partly under the control of the decision maker. Dynamic programming techniques can be used for reinforced learning algorithms. Reinforced learning is different from supervised learning in that correct input/output pairs are not presented, and suboptimal actions are not explicitly corrected. Rather, on-line or computational performance is the focus. On-line performance includes finding a balance between exploration of new (uncharted) territory or spaces, and exploitation of current knowledge. That is, there is a tradeoff between exploration and exploitation.

Machine learning based on reinforced learning adjusts or learns based on learning an action, a combination of actions, and so on. An outcome results from taking an action. Thus, the learning model, algorithm, etc., learns from the outcomes that result from taking the action or combination of actions. The reinforced learning can include identifying positive outcomes, where the positive outcomes are used to adjust the learning models, algorithms, and so on. A positive outcome can be dependent on a context. When the outcome is based on a mood, emotional state, mental state, perception state, etc., of an individual, then a positive mood, emotion, mental state, or perception state can be used to adjust the model and algorithm. Positive outcomes can include the person being more engaged, where engagement is based on affect, the person spending more time playing an online game or navigating a webpage, the person converting by buying a product or service, and so on. The reinforced learning can be based on exploring a solution space and adapting the model, algorithm, etc., which stem from outcomes of the exploration. When positive outcomes are encountered, the positive outcomes can be reinforced by changing weighting values within the model, algorithm, etc. Positive outcomes may result in increasing weighting values. Negative outcomes can also be considered, where weighting values may be reduced or otherwise adjusted.

Figure 11:
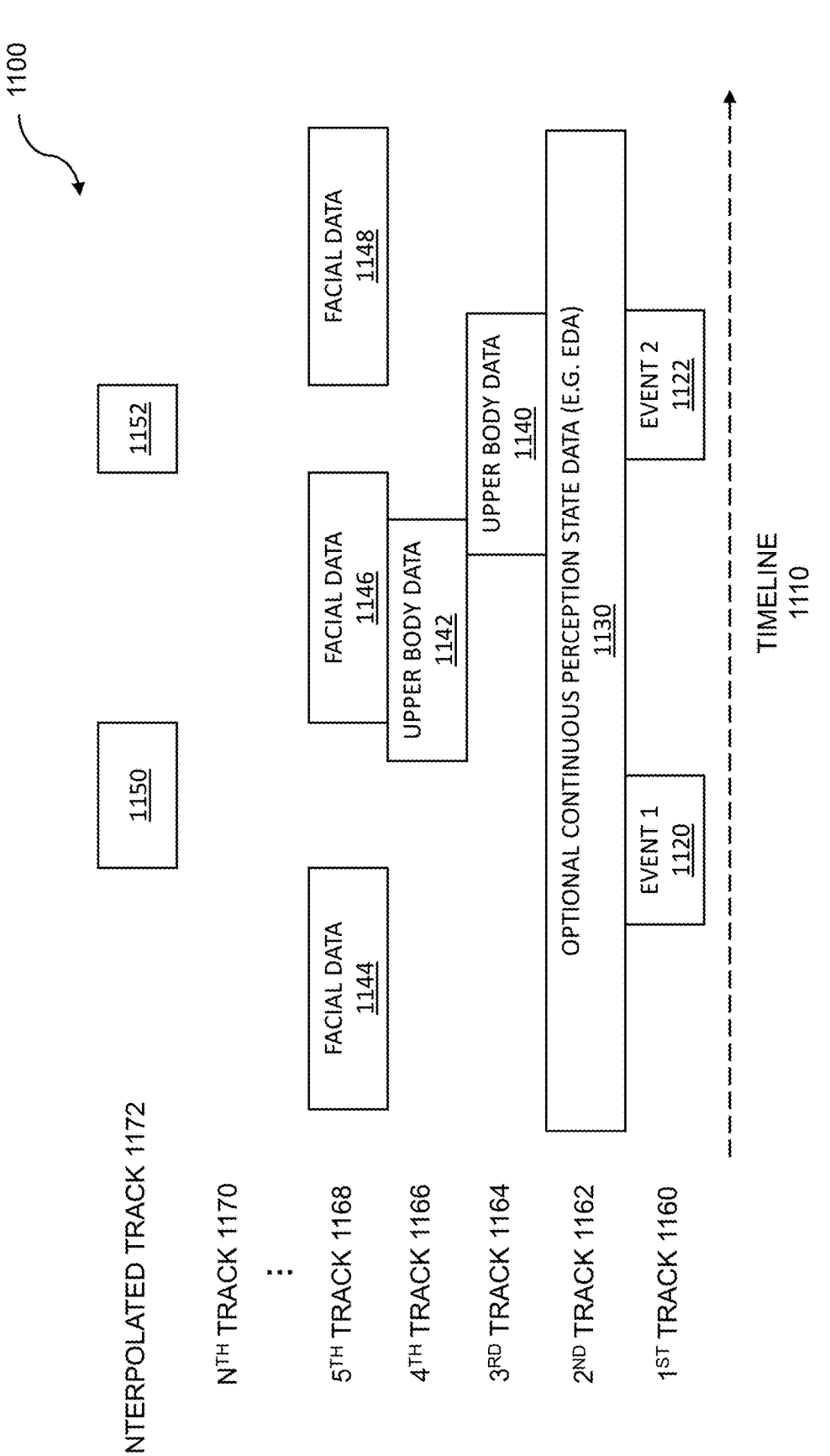
FIG. 11 is a timeline with information tracks relating to human perception states.

FIG. 11 is a timeline with information tracks 1100 relating to human perception states. A timeline can show one or more perception states that can be experienced by an individual. The timeline can be based on neural network training for deep learning. Images that include facial data are obtained, and a set of weights is trained on a set of layers for deep learning. A subset of the weights is deployed on deep learning nodes of a user device, and an additional set of weights is retrained on the user device. The retraining includes additional deep learning layers of the user device. A human perception state is provided on the user device. The timeline 1110 with information tracks 1100 relates to various perception states. A first track 1160 shows events that, in embodiments, are related to use of a computer by the individual. A first event 1120 can indicate an action that the individual took (such as launching an application); an action initiated by the computer (such as the presentation of a dialog box); an external event (such as a new global positioning system (GPS) coordinate); or another event such as receiving an email, a phone call, a text message, or any other type of event. In some embodiments, a photograph can be used to document an event or simply to save contextual information in the first track 1160. A second event 1122 can indicate another action or event in a similar manner. Such events can be used to provide contextual information and can also include information such as copies of emails, text messages, phone logs, file names, or other information that can prove useful in understanding the context of a user's actions. Thus, in embodiments, contextual information is based on one or more of a photograph, an email, a text message, a phone log, or GPS information.

A second track 1162 can include continuously collected perception state data such as electrodermal activity data 1130. A third track 1164 can include upper body data 1140. The upper body data, such as upper torso data, can be collected intermittently when the individual is looking toward a camera. The upper body data 1140 can include one or more still photographs, videos, or infrared images which can be collected when the user looks in the direction of the camera. A fourth track 1166 also can include upper body data that is collected either intermittently or continuously by a second imaging device. The upper body data 1142 can include one or more still photographs, videos, infrared images, or abstracted caricatures which can be collected when the user looks in the direction of that camera. A fifth track 1168 can include facial data that is collected from a third camera, such as the webcam. In the example shown, the fifth track 1168 includes first facial data 1144, second facial data 1146, and third facial data 1148, which can be any type of facial data including data that can be used for determining perception state information. Any number of samples of facial data can be collected in any track. The perception state data from the various tracks can be collected simultaneously, collected on one track exclusive of other tracks, collected where perception state data overlaps between the tracks, and so on. When perception state data from multiple tracks overlap, one track's data can take precedence over another track or the data from the multiple tracks can be combined.

Additional tracks, through the $n^{th}$ track 1170, of perception state data of any type can be collected. The additional tracks 1170 can be collected on a continuous or on an intermittent basis. The intermittent basis can be either occasional or periodic. Analysis can further comprise interpolating perception state data when the perception state data collected is intermittent, and/or imputing additional perception state data where the perception state data is missing. One or more interpolated tracks 1172 can be included and can be associated with perception state data that is collected on an intermittent basis, such as the facial data of the fifth track 1168. Interpolated data 1150 and further interpolated data 1152 can contain interpolations of the facial data of the fifth track 1168 for the time periods where no facial data was collected in that track. Other embodiments interpolate data for periods where no track includes facial data. In other embodiments, analysis includes interpolating perception state analysis when the perception state data collected is intermittent.

The perception state data, such as the continuous perception state data 1130 and/or any of the collected upper body data 1140 and 1142, and/or facial data 1144, 1146, and 1148, can be tagged. The tags can include metadata related to the perception state data, including, but not limited to, the device that collected the perception state data; the individual from whom the perception state data was collected; the task being performed by the individual; the media being viewed by the individual; and the location, environ-perception conditions, time, date, or any other contextual information. The tags can be used to locate pertinent perception state data; for example, the tags can be used to retrieve the perception state data from a database. The tags can be included with the perception state data that is sent over the internet to cloud or web-based storage and/or services. As such, the tags can be used locally on the machine where the perception state data was collected and/or remotely on a remote server or a cloud/web service.

Other tags can be related to the perception state data, which is data related to, attached to, indicative of, including, containing, etc., the perception state. Further embodiments can include tagging the perception state data with sensor data. The sensor data can be obtained from the vehicle occupant along with the video data or the audio data, instead of the video data or the audio data, etc. In embodiments, the sensor data can include one or more of vehicle temperature, outside temperature, time of day, level of daylight, weather conditions, headlight activation, windshield wiper activation, entertainment center selection, or entertainment center volume. Other sensor data can include physiological data related to one or more occupants of the vehicle. The physiological data can include heart rate, heart rate variability, electrodermal activity, acceleration, and the like. The tags can also be related to the perception state that can be determined by image-based analysis of the video, audio, or physiological data, or other techniques. In embodiments, the tags that can be applied can be based on one or more of drowsiness, fatigue, distraction, impairment, sadness, stress, happiness, anger, frustration, confusion, disappointment, hesitation, perception overload, focusing, engagement, attention, boredom, exploration, confidence, trust, delight, disgust, skepticism, doubt, satisfaction, excitement, laughter, calmness, curiosity, humor, depression, envy, sympathy, embarrassment, poignancy, or mirth.

Figure 12:
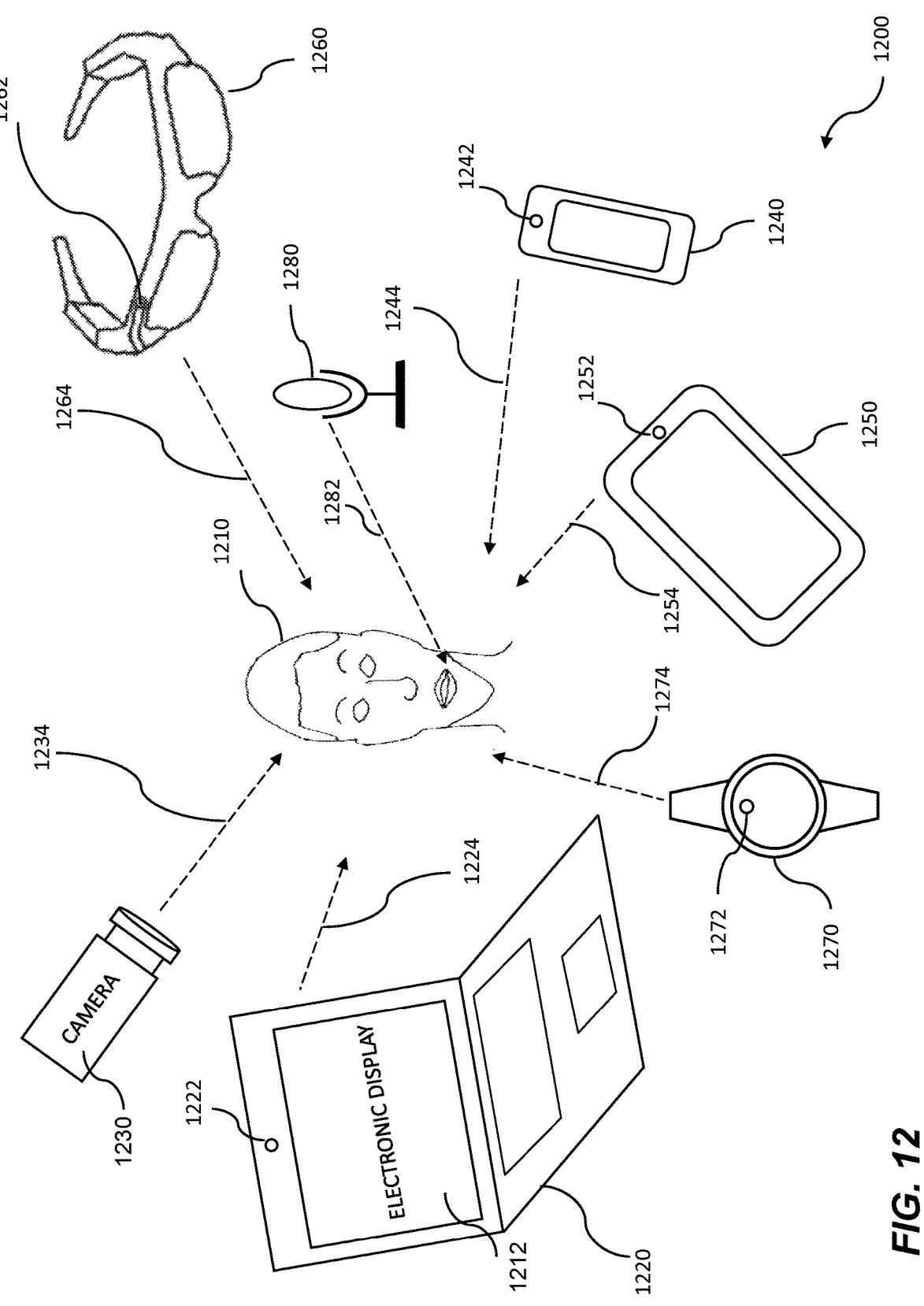
FIG. 12 illustrates example image and audio collection including multiple mobile devices.

FIG. 12 illustrates example image and audio collection including multiple mobile devices. Images, which can include facial or torso data, human perception state data, audio data, and physiological data, can be collected using multiple mobile devices. The image data can be applied to neural network training, where the neural network training can enable deep learning. The deep learning can include in situ retraining. Images that include facial data are obtained for human perception state analysis. A set of weights on a set of layers is trained for deep learning. A subset of the weights is deployed on deep learning nodes of a user device. An additional set of weights is retrained, and a human perception state is provided on the user device. A human perception state can include drowsiness, fatigue, distraction, impairment, sadness, stress, happiness, anger, frustration, confusion, disappointment, hesitation, human perception overload, focusing, engagement, attention, boredom, exploration, confidence, trust, delight, disgust, skepticism, doubt, satisfaction, excitement, laughter, calmness, curiosity, humor, depression, envy, sympathy, embarrassment, poignancy, or mirth.

In the diagram 1200, the multiple mobile devices can be used separately or in combination to collect video data, audio data, physiological data, or some or all of video data, audio data, and physiological data, on a user 1210. While one person is shown, the imaging, video data, audio data, or physiological data can be collected on multiple people. A user 1210 can be observed as she or he is performing a task, experiencing an event, viewing a media presentation, and so on. The user 1210 can be shown one or more media presentations, political presentations, social media, or another form of displayed media. The one or more media presentations can be shown to a plurality of people. The media presentations can be displayed on an electronic display 1212 or another display. The data collected on the user 1210 or on a plurality of users can be in the form of one or more videos, video frames, and still images; one or more audio channels, etc. The plurality of video data and audio data can be of people who are experiencing different situations. Some example situations can include the user or plurality of users being exposed to TV programs, movies, video clips, social media, and other such media. The situations could also include exposure to media such as advertisements, political messages, news programs, and so on.

As noted before, video data and audio data can be collected on one or more users in substantially identical or different situations while viewing either a single media presentation or a plurality of presentations. The data collected on the user 1210 can be analyzed and viewed for a variety of purposes including expression analysis, cognitive state analysis, mental state analysis, emotional state analysis, and so on. The electronic display 1212 can be on a laptop computer 1220 as shown, a tablet computer 1250, a cell phone 1240, a television, a mobile monitor, or any other type of electronic device. In one embodiment, video data including expression data is collected on a mobile device such as a cell phone 1240, a tablet computer 1250, a laptop computer 1220, or a watch 1270. Similarly, the audio data including speech data and non-speech vocalizations can be collected on one or more of the mobile devices. Thus, the multiple sources can include at least one mobile device, such as a phone 1240 or a tablet 1250, or a wearable device such as a watch 1270 or glasses 1260. A mobile device can include a front-side camera and/or a back-side camera that can be used to collect expression data. A mobile device can include a microphone, audio transducer, or other audio capture apparatus that can be used to capture the speech and non-speech vocalizations. Sources of expression data can include a webcam 1222, a phone camera 1242, a tablet camera 1252, a wearable camera 1262, and a mobile camera 1230. A wearable camera can comprise various camera devices, such as a watch camera 1272. Sources of audio data 1282 can include a microphone 1280.

As the user 1210 is monitored, the user might move due to the nature of the task, boredom, discomfort, distractions, or for another reason. As the user moves, the camera with a view of the user's face can be changed. Thus, as an example, if the user is looking in a first direction, the line of sight 1224 from the webcam 1222 is able to observe the user's face, but if the user is looking in a second direction, the line of sight 1234 from the mobile camera 1230 is able to observe the user's face. Furthermore, in other embodiments, if the user is looking in a third direction, the line of sight 1244 from the phone camera 1242 is able to observe the user's face, and if the user is looking in a fourth direction, the line of sight 1254 from the tablet camera 1252 is able to observe the user's face. If the user is looking in a fifth direction, the line of sight 1264 from the wearable camera 1262, which can be a device such as the glasses 1260 shown which can be worn by another user or an observer, is able to observe the user's face. If the user is looking in a sixth direction, the line of sight 1274 from the wearable watch-type device 1270, with a camera 1272 included on the device, is able to observe the user's face. In other embodiments, the wearable device is another device, such as an earpiece with a camera, a helmet or hat with a camera, a clip-on camera attached to clothing, or any other type of wearable device with a camera or other sensor for collecting expression data. The user 1210 can also use a wearable device including a camera for gathering contextual information and/or collecting expression data on other users. Because the user 1210 can move her or his head, the facial data can be collected intermittently when she or he is looking in a direction of a camera. In some cases, multiple people can be included in the view from one or more cameras, and some embodiments include filtering out faces of one or more other people to determine whether the user 1210 is looking toward a camera. All or some of the expression data can be continuously or sporadically available from the various devices and other devices.

The captured video data can include facial expressions and can be analyzed on a computing device such as the video capture device or on another separate device. The analysis can take place on one of the mobile devices discussed above, on a local server, on a remote server, and so on. In embodiments, some of the analysis takes place on the mobile device, while other analysis takes place on a server device. The analysis of the video data can include the use of a classifier. The video data can be captured using one of the mobile devices discussed above and sent to a server or another computing device for analysis. However, the captured video data including expressions can also be analyzed on the device which performed the capturing. The analysis can be performed on a mobile device where the videos were obtained with the mobile device and wherein the mobile device includes one or more of a laptop computer, a tablet, a PDA, a smartphone, a wearable device, and so on. In another embodiment, the analyzing comprises using a classifier on a server or another computing device other than the capturing device.

Figure 13:
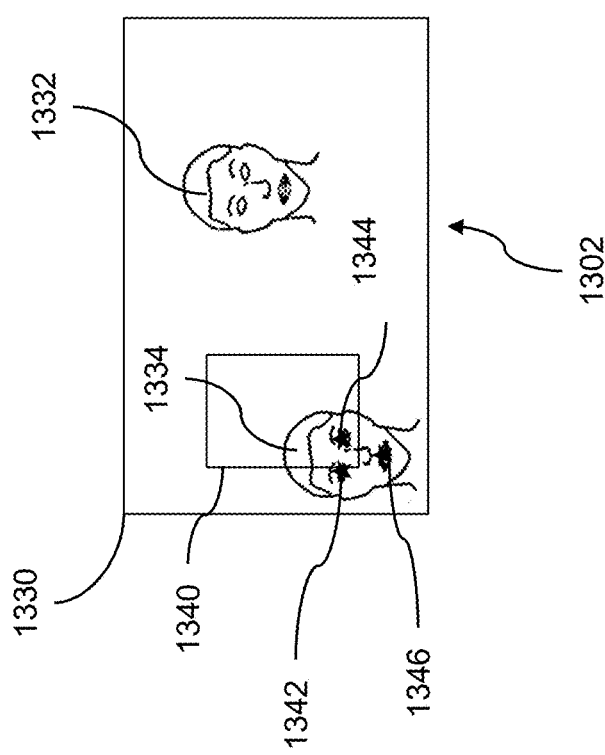
FIG. 13 shows feature extraction for multiple faces.
Figure 13:
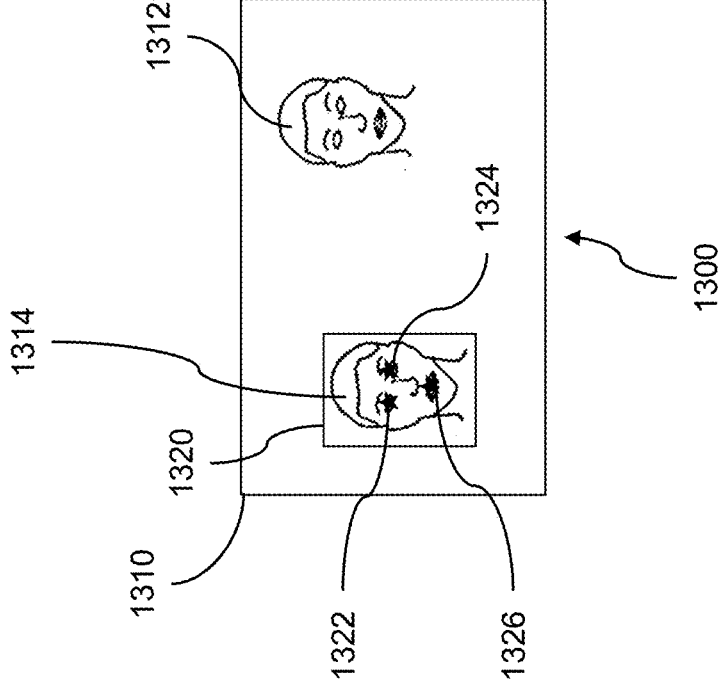

FIG. 13 shows feature extraction for multiple faces. Feature extraction for one or more faces can be applied to deep learning in situ retraining. Images such as visible light images and near-infrared images can include facial data. The images can be obtained using imaging devices that can detect light comprising various wavelengths. A set of weights on a set of layers for deep learning is trained on a server device. A subset of the weights is deployed on deep learning nodes of a user device. An additional set of weights is retrained, and a human perception state is provided on the user device.

The feature extraction for multiple faces can be performed for faces that can be detected in multiple images. In embodiments, the features of multiple faces are extracted for evaluating cognitive states. Features of a face or a plurality of faces can be extracted from collected video data. The feature extraction can be performed by analysis, by using one or more processors, by using one or more video collection devices, and by using a server. The analysis device can be used to perform face detection for a second face, as well as to perform facial tracking of the first face. One or more videos can be captured, where the videos contain one or more faces. The video or videos that contain the one or more faces can be partitioned into a plurality of frames, and the frames can be analyzed for the detection of the one or more faces. The analysis of the one or more video frames can be based on one or more classifiers. A classifier can be an algorithm, heuristic, function, or piece of code that can be used to identify into which of a set of categories a new or existing observation, sample, datum, etc. should be placed. The decision to place an observation into a category can be based on training the algorithm or piece of code by analyzing a known set of data, known as a training set. The training set can include data for which category memberships of the data can be known. The training set can be used as part of a supervised training technique. If a training set is not available, then a clustering technique can be used to group observations into categories. The latter approach, or unsupervised learning, can be based on a measure (i.e., distance) of one or more inherent similarities among the data that is being categorized. When a new observation is received, then the classifier can be used to categorize the new observation. Classifiers can be used for many analysis applications, including analysis of one or more faces. The use of classifiers can be the basis of analyzing the one or more faces for gender, ethnicity, and age; of detecting the one or more faces in one or more videos; of detecting facial features and landmarks; and so on. The observations can be analyzed based on one or more of a set of quantifiable properties. The properties can be described as features and explanatory variables involving various data types that can include numerical (integer-valued, real-valued), ordinal, categorical, and so on. Some classifiers can be based on a comparison between an observation and prior observations, as well as based on functions such as a similarity function, a distance function, and so on.

Classification can be based on various types of algorithms, heuristics, codes, procedures, statistics, and so on. Many techniques for performing classification exist. This classification of one or more observations into one or more groups can be based on distributions of the data values, probabilities, and so on. Classifiers can be binary, multiclass, linear, etc. Algorithms for classification can be implemented using a variety of techniques, including neural networks, kernel estimation, support vector machines, use of quadratic surfaces, and so on. Classification can be used in many application areas such as computer vision, and speech and handwriting recognition. Classification can be used for biometric identification of one or more people in a single frame or in multiple frames of one or more videos.

Returning to FIG. 13, the detection of the first face, the second face, and multiple faces can include identifying facial landmarks, generating a bounding box, and predicting a bounding box and landmarks for a next frame, where the next frame can be one of a plurality of frames of a video containing faces. A first video frame 1300 includes a frame boundary 1310, a first face 1312, and a second face 1314. The video frame 1300 also includes a bounding box 1320. Facial landmarks can be generated for the first face 1312. Face detection can be performed to initialize a second set of locations for a second set of facial landmarks for a second face within the video. Facial landmarks in the video frame 1300 can include the facial landmarks 1322, 1324, and 1326. The facial landmarks can include corners of a mouth, corners of eyes, eyebrow corners, the tip of the nose, nostrils, chin, the tips of ears, and so on. The performing of face detection on the second face can include performing facial landmark detection with the first frame from the video for the second face and can include estimating a second rough bounding box for the second face based on the facial landmark detection. The estimating of a second rough bounding box can include the bounding box 1320. Bounding boxes can also be estimated for one or more other faces within the boundary 1310. The bounding box can be refined, as can the one or more facial landmarks. The refining of the second set of locations for the second set of facial landmarks can be based on localized information around the second set of facial landmarks. The bounding box 1320 and the facial landmarks 1322, 1324, and 1326 can be used to estimate future locations for the second set of locations for the second set of facial landmarks in a future video frame from the first video frame.

A second video frame 1302 is also shown. The second video frame 1302 includes a frame boundary 1330, a first face 1332, and a second face 1334. The second video frame 1302 also includes a bounding box 1340 and the facial landmarks, or points, 1342, 1344, and 1346. In other embodiments, multiple facial landmarks are generated and used for facial tracking of the two or more faces of a video frame, such as the shown second video frame 1302. Facial points from the first face can be distinguished from other facial points. In embodiments, the other facial points include facial points of one or more other faces. The facial points can correspond to the facial points of the second face. The distinguishing of the facial points of the first face and the facial points of the second face can be used to differentiate between the first face and the second face; to track either the first face, the second face, or both faces; and so on. Other facial points can correspond to the second face. As mentioned above, multiple facial points can be determined within a frame. One or more of the other facial points that are determined can correspond to a third face. The location of the bounding box 1340 can be estimated, where the estimating can be based on the location of the generated bounding box 1320 shown in the first video frame 1300. The three facial points shown, facial points, or landmarks, 1342, 1344, and 1346, might lie within the bounding box 1340 or might not lie partially or completely within the bounding box 1340. For instance, the second face 1334 might have moved between the first video frame 1300 and the second video frame 1302. Based on the accuracy of the estimating of the bounding box 1340, a new estimation can be determined for a third, future frame from the video, and so on. The evaluation can be performed, all or in part, using semiconductor-based logic.

Figure 14:
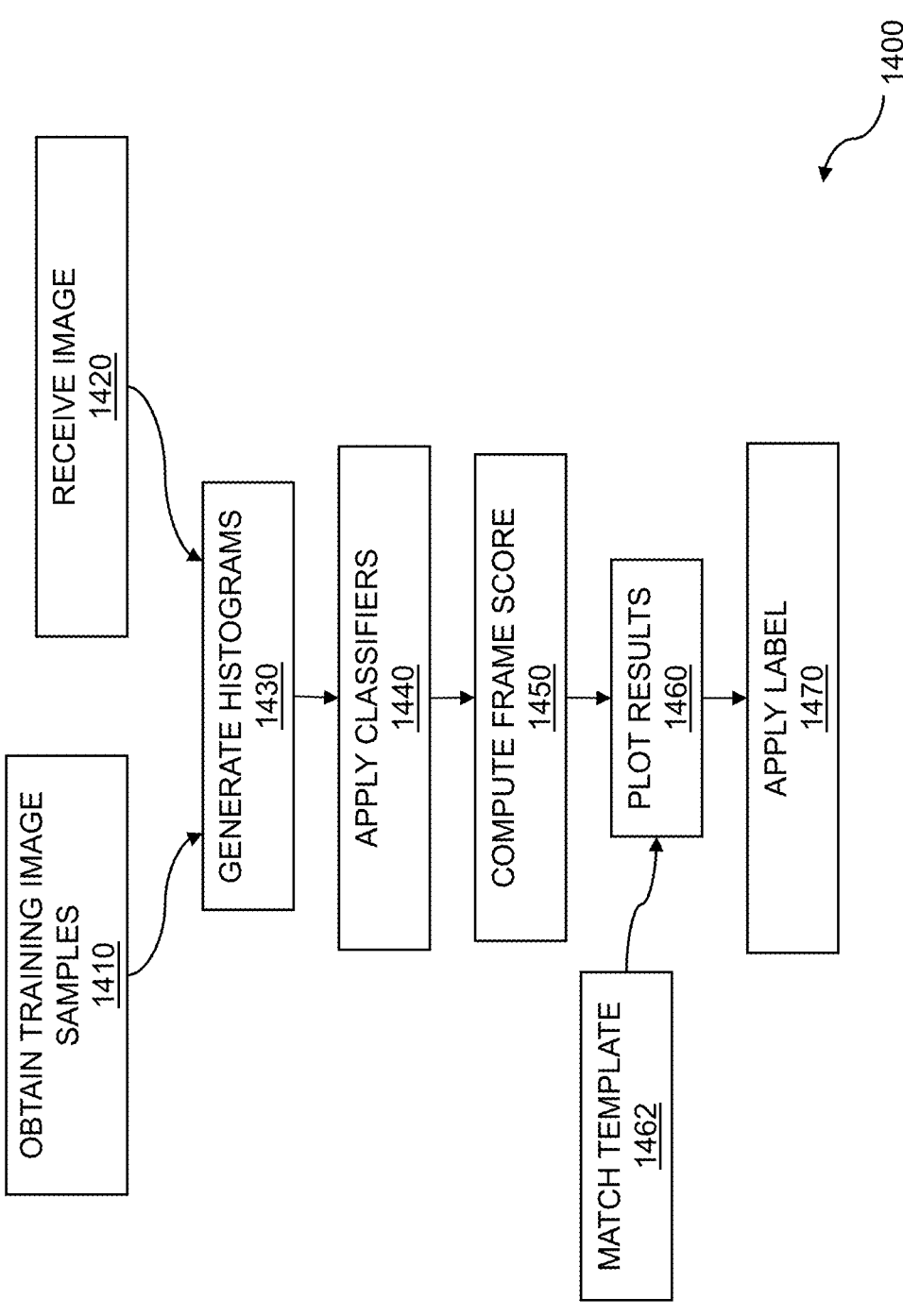
FIG. 14 is a flow diagram for detecting facial expressions.

FIG. 14 is a flow diagram for detecting facial expressions. Human perception state analysis can be based on detecting and analyzing facial expressions in images that include facial data. The images can include visible light images, near-infrared light images, etc. The human perception state analysis can be performed using trained weights on a set of layers for deep learning. The human perception states can be used for providing content, for vehicle manipulation, and so on. A plurality of images that include facial data for human perception state analysis is obtained. A server device is used to train a set of weights on a set of layers for deep learning that implements the human perception state analysis, where the training is performed with a first set of training data. A subset of the set of weights is deployed on deep learning nodes of a user device, where the deploying enables at least part of the human perception state analysis. An additional set of weights is retrained, where the additional set of weights is trained using a second set of training data. A human perception state is provided on the user device, based on the subset of the set of weights, the additional set of weights, and input images obtained by the user device.

The flow 1400, or portions thereof, can be implemented in semiconductor logic, can be accomplished using a mobile device, can be accomplished using a server device, and so on. The flow 1400 can be used to automatically detect a wide range of facial expressions. A facial expression can produce strong emotional signals that can indicate valence and discrete emotional states. The discrete emotional states can include contempt, doubt, defiance, happiness, fear, anxiety, and so on. The detection of facial expressions can be based on the location of facial landmarks. The detection of facial expressions can be based on the determination of action units (AUs), where the action units are determined using FACS coding. The AUs can be used separately or in combination to identify facial expressions. Based on the facial landmarks, one or more AUs can be identified by number and intensity. For example, AU12 can be used to code a lip corner puller and can be used to infer a smirk.

The flow 1400 begins by obtaining training image samples 1410. The image samples can include a plurality of images of one or more people. Human coders who are trained to correctly identify AU codes based on the FACS can code the images. The training or "known good" images can be used as a basis for training a machine learning technique. Once trained, the machine learning technique can be used to identify AUs in other images that can be collected using a camera, a sensor, and so on. The flow 1400 continues with receiving an image 1420. The image 1420 can be received from a camera, a sensor, and so on. As previously discussed, the camera or cameras can include a webcam, where a webcam can include a video camera, a still camera, a thermal imager, a CCD device, a phone camera, a three-dimensional camera, a depth camera, a light field camera, multiple webcams used to show different views of a person, or any other type of image capture apparatus that can allow captured data to be used in an electronic system. The image that is received can be manipulated in order to improve the processing of the image. For example, the image can be cropped, scaled, stretched, rotated, flipped, etc. in order to obtain a resulting image that can be analyzed more efficiently. Multiple versions of the same image can be analyzed. In some cases, the manipulated image and a flipped or mirrored version of the manipulated image can be analyzed alone and/or in combination to improve analysis. The flow 1400 continues with generating histograms 1430 for the training images and the one or more versions of the received image. The histograms can be based on a HoG or another histogram. As described in previous paragraphs, the HoG can include feature descriptors and can be computed for one or more regions of interest in the training images and the one or more received images. The regions of interest in the images can be located using facial landmark points, where the facial landmark points can include outer edges of nostrils, outer edges of the mouth, outer edges of eyes, etc. A HoG for a given region of interest can count occurrences of gradient orientation within a given section of a frame from a video.

The flow 1400 continues with applying classifiers 1440 to the histograms. The classifiers can be used to estimate probabilities, where the probabilities can correlate with an intensity of an AU or an expression. In some embodiments, the choice of classifiers used is based on the training of a supervised learning technique to identify facial expressions. The classifiers can be used to identify into which of a set of categories a given observation can be placed. The classifiers can be used to determine a probability that a given AU or expression is present in a given image or frame of a video. In various embodiments, the one or more AUs that are present include AU01 inner brow raiser, AU12 lip corner puller, AU38 nostril dilator, and so on. In practice, the presence or absence of multiple AUs can be determined. The flow 1400 continues with computing a frame score 1450. The score computed for an image, where the image can be a frame from a video, can be used to determine the presence of a facial expression in the image or video frame. The score can be based on one or more versions of the image 1420 or a manipulated image. The score can be based on a comparison of the manipulated image to a flipped or mirrored version of the manipulated image. The score can be used to predict a likelihood that one or more facial expressions are present in the image. The likelihood can be based on computing a difference between the outputs of a classifier used on the manipulated image and on the flipped or mirrored image, for example. The classifier can be used to identify symmetrical facial expressions (e.g., a smile), asymmetrical facial expressions (e.g., an outer brow raiser), and so on.

The flow 1400 continues with plotting results 1460. The results that are plotted can include one or more scores for one or more frames computed over a given time t. For example, the plotted results can include classifier probability results from analysis of HoGs for a sequence of images and video frames. The plotted results can be matched with a template 1462. The template can be temporal and can be represented by a centered box function or another function. A best fit with one or more templates can be found by computing a minimum error. Other best-fit techniques can include polynomial curve fitting, geometric curve fitting, and so on. The flow 1400 continues with applying a label 1470. The label can be used to indicate that a particular facial expression has been detected in the one or more images or video frames which constitute the image 1420 that was received. The label can be used to indicate that any of a range of facial expressions has been detected, including a smile, an asymmetric smile, a frown, and so on. Various steps in the flow 1400 may be changed in order, repeated, omitted, or the like without departing from the disclosed concepts. Various embodiments of the flow 1400 can be included in a computer program product embodied in a non-transitory computer readable medium that includes code executable by one or more processors. Various embodiments of the flow 1400, or portions thereof, can be included on a semiconductor chip and implemented in special purpose logic, programmable logic, and so on.

Figure 15:
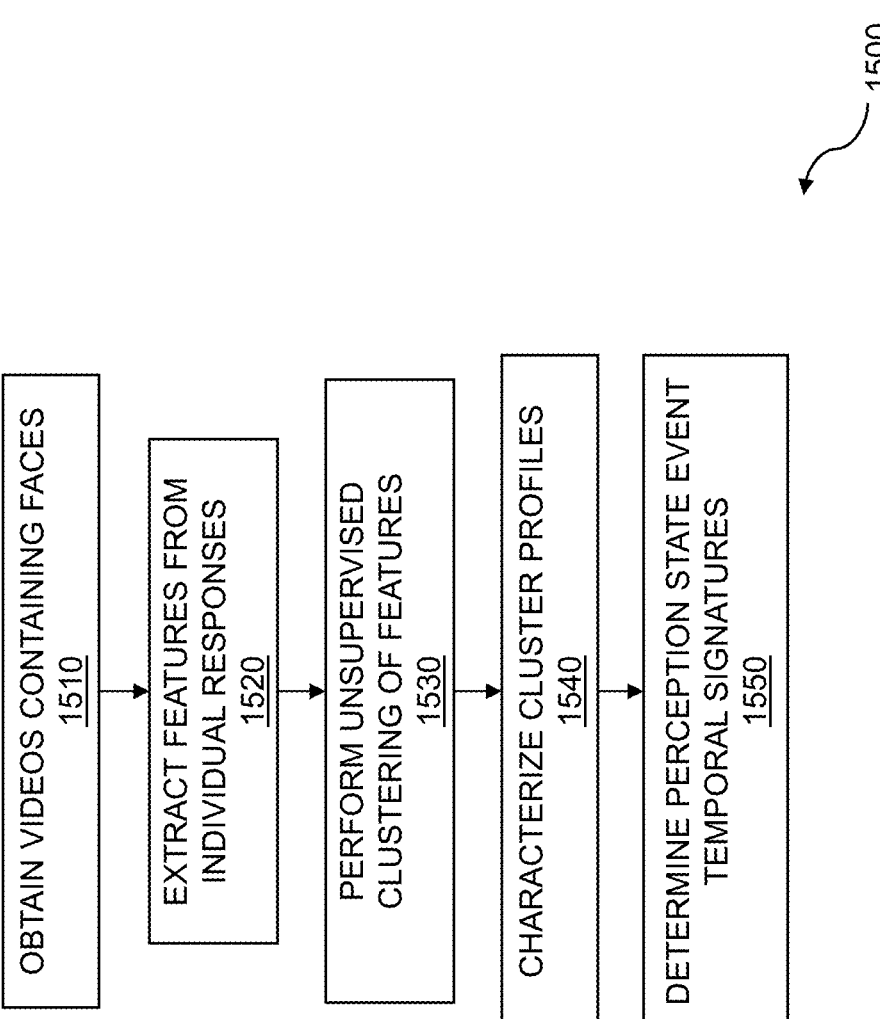
FIG. 15 is a flow diagram for the large-scale clustering of facial events.

FIG. 15 is a flow diagram for the large-scale clustering of facial events. Deep learning in situ retraining can be based on neural network training, where the neural network training can use results from large-scale clustering. Images that include facial data are obtained. A set of weights on a set of layers for deep learning is trained. A subset of the set of weights is deployed on deep learning nodes of a user device. An additional set of weights is retrained. A human perception state is provided on the user device. Human perception state events can include facial events, speech events, etc. The large-scale clustering of facial events can be performed for data collected from a remote computing device. The facial events can be collected from people as they interact with an electronic device, with media, or within a vehicle. The clustering and evaluation of facial events can be augmented using a mobile device, a server, semiconductor-based logic, and so on. As discussed above, collection of facial video data from one or more people can include a web-based framework. The web-based framework can be used to collect facial video data from large numbers of people located over a wide geographic area. The web-based framework can include an opt-in feature that allows people to agree to facial data collection. The web-based framework can be used to render and display data to one or more people and can collect data from the one or more people. For example, the facial data collection can be based on showing one or more viewers a video media presentation through a website. The web-based framework can be used to display the video media presentation or event and to collect videos from multiple viewers who are online. That is, the collection of videos can be crowdsourced from those viewers who elected to opt in to the video data collection. The video event can be a commercial, a political ad, an educational segment, and so on.

The flow 1500 includes obtaining videos containing faces 1510. The videos can be obtained using one or more cameras, where the cameras can include a webcam coupled to one or more devices employed by the one or more people using the web-based framework. The flow 1500 continues with extracting features from the individual responses 1520. The individual responses can include videos containing faces observed by the one or more webcams. The features that are extracted can include facial features such as an eyebrow, a nostril, an eye edge, a mouth edge, and so on. The feature extraction can be based on facial coding classifiers, where the facial coding classifiers output a probability that a specified facial action has been detected in a given video frame. The flow 1500 continues with performing unsupervised clustering of features 1530. The unsupervised clustering can be based on an event. The unsupervised clustering can be based on a K-Means, where the K of the K-Means can be computed using a Bayesian Information Criterion (BICk), for example, to determine the smallest value of K that meets system requirements. Any other criterion for K can be used. The K-Means clustering technique can be used to group one or more events into various respective categories.

The flow 1500 includes characterizing cluster profiles 1540. The profiles can include a variety of facial expressions such as smiles, asymmetric smiles, eyebrow raisers, eyebrow lowerers, etc. The profiles can be related to a given event. For example, a humorous video can be displayed in the web-based framework and the video data of people who have opted in can be collected. The characterization of the collected and analyzed video can depend in part on the number of smiles that occurred at various points throughout the humorous video. Similarly, the characterization can be performed on collected and analyzed videos of people viewing a news presentation. The characterized cluster profiles can be further analyzed based on demographic data. The number of smiles resulting from people viewing a humorous video can be compared across various demographic groups, where the groups can be formed based on geographic location, age, ethnicity, gender, and so on.

The flow 1500 can include determining perception state event temporal signatures 1550. The perception state event temporal signatures can include information on rise time to facial expression intensity, fall time from facial expression intensity, duration of a facial expression, and so on. In some embodiments, the perception state event temporal signatures are associated with certain demographics, ethnicities, cultures, etc. The perception state event temporal signatures can be used to identify one or more of drowsiness, fatigue, distraction, impairment, sadness, stress, happiness, anger, frustration, confusion, disappointment, hesitation, cognitive overload, focusing, engagement, attention, boredom, exploration, confidence, trust, delight, disgust, skepticism, doubt, satisfaction, excitement, laughter, calmness, curiosity, humor, depression, envy, sympathy, embarrassment, poignancy, or mirth. Various steps in the flow 1500 may be changed in order, repeated, omitted, or the like without departing from the disclosed concepts. Various embodiments of the flow 1500 can be included in a computer program product embodied in a non-transitory computer readable medium that includes code executable by one or more processors. Various embodiments of the flow 1500, or portions thereof, can be included on a semiconductor chip and implemented in special purpose logic, programmable logic, and so on.

Figure 16:
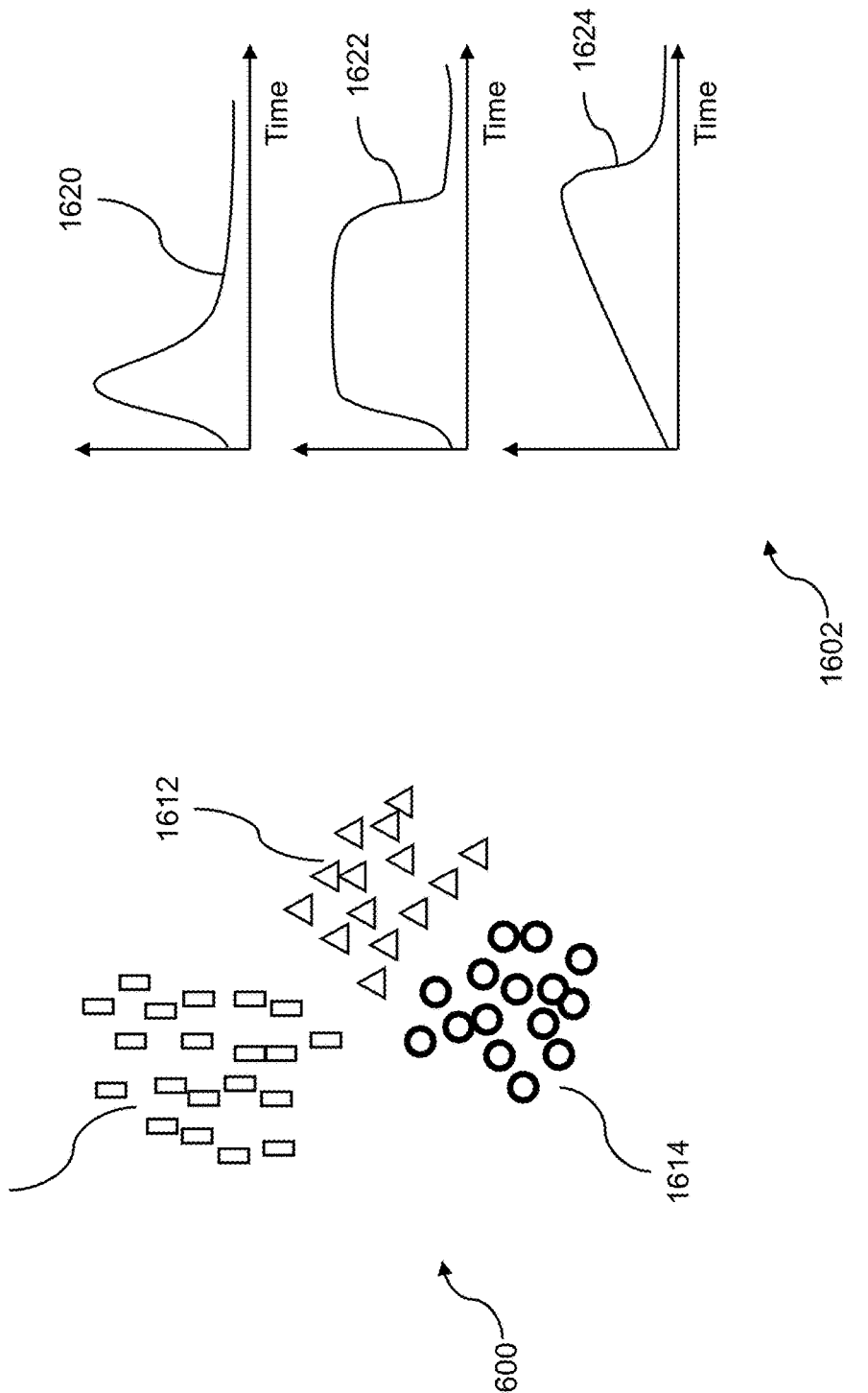
FIG. 16 illustrates unsupervised clustering of features and characterizations of cluster profiles.

FIG. 16 illustrates unsupervised clustering of features and characterizations of cluster profiles. The clustering of features and characterizations of cluster profiles can be performed for images obtained of an individual. The obtained images can be used for human perception state analysis, where the human perception state analysis can be based on deep learning. The human perception state analysis enables deep learning in situ retraining. A plurality of images that include facial data is obtained for human perception state analysis. A server device is used to train a set of weights on a set of layers for deep learning, where the training is performed with a first set of training data. A subset of the set of weights is deployed on deep learning nodes of a user device. An additional set of weights is retrained, where the additional set of weights is trained using a second set of training data. A human perception state is presented on the user device.

Features including samples of facial data can be clustered using unsupervised clustering. Various clusters can be formed which include similar groupings of facial data observations. The example 1600 shows three clusters, clusters 1610, 1612, and 1614. The clusters can be based on video collected from people who have opted in to video collection. When the collected data is captured using a web-based framework, the data collection can be performed on a grand scale, including hundreds, thousands, or even more participants who can be situated locally and/or across a wide geographic area. Unsupervised clustering is a technique that can be used to process the large amounts of captured facial data and to identify groupings of similar observations. The unsupervised clustering can also be used to characterize the groups of similar observations. The characterizations can include identifying behaviors of the participants. The characterizations can be based on identifying facial expressions and facial action units of the participants. Some behaviors and facial expressions can include faster or slower onsets, faster or slower offsets, longer or shorter durations, etc. The onsets, offsets, and durations can all correlate to time. The data clustering that results from the unsupervised clustering can support data labeling. The labeling can include FACS coding. The clusters can be partially or totally based on a facial expression resulting from participants viewing a video presentation, where the video presentation can be an advertisement, a political message, educational material, a public service announcement, and so on. The clusters can be correlated with demographic information, where the demographic information can include educational level, geographic location, age, gender, income level, and so on.

The cluster profiles 1602 can be generated based on the clusters that can be formed from unsupervised clustering, with time shown on the x-axis and intensity or frequency shown on the y-axis. The cluster profiles can be based on captured facial data including facial expressions. The cluster profile 1620 can be based on the cluster 1610, the cluster profile 1622 can be based on the cluster 1612, and the cluster profile 1624 can be based on the cluster 1614. The cluster profiles 1620, 1622, and 1624 can be based on smiles, smirks, frowns, or any other facial expression. The emotional states of the people who have opted in to video collection can be inferred by analyzing the clustered facial expression data. The cluster profiles can be plotted with respect to time and can show a rate of onset, a duration, and an offset (rate of decay). Other time-related factors can be included in the cluster profiles. The cluster profiles can be correlated with demographic information, as described above.

Figure 17:
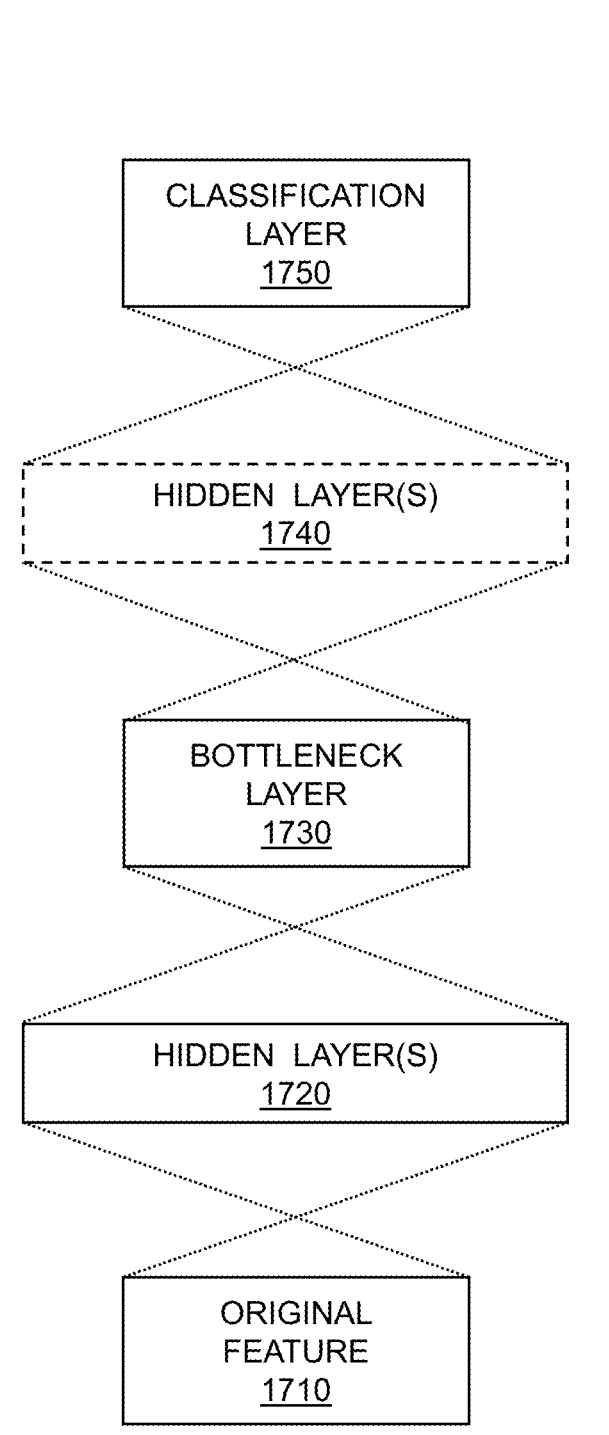
FIG. 17 illustrates a bottleneck layer within a deep learning environment.

FIG. 17 illustrates a bottleneck layer within a deep learning environment. A deep learning environment can be based on a neural network such as a deep neural network. The deep neural network comprises a plurality of layers such as input layers, output layers, convolutional layers, activation layers, and so on. The plurality of layers in a deep neural network (DNN) can include a bottleneck layer. The bottleneck layer can be used for neural network training, where the training includes deep learning in situ retraining. A deep neural network can apply classifiers such as object classifiers, image classifiers, facial classifiers, audio classifiers, speech classifiers, physiological classifiers, and so on. The classifiers can be learned by analyzing one or more of human perception states, cognitive load metrics, interaction metrics, etc. Images including facial data are collected. A set of weights on a set of layers for deep learning is trained, and a subset of weights is deployed on deep learning nodes of a user device. An additional set of weights is retrained using a second set of training data. A human perception state is provided on the user device.

Layers of a deep neural network can include a bottleneck layer 1700. A bottleneck layer can be used for a variety of applications such as identification of an upper torso, facial recognition, voice recognition, emotional state recognition, and so on. The deep neural network in which the bottleneck layer is located can include a plurality of layers. The plurality of layers can include an original feature layer 1710. A feature such as an image feature can include points, edges, objects, boundaries between and among regions, properties, and so on. The deep neural network can include one or more hidden layers 1720. The one or more hidden layers can include nodes, where the nodes can include nonlinear activation functions and other techniques. The bottleneck layer can be a layer that learns translation vectors to transform a neutral face to an emotional or expressive face. In some embodiments, the translation vectors can transform a neutral sounding voice to an emotional or expressive voice. Specifically, activations of the bottleneck layer determine how the transformation occurs. A single bottleneck layer can be trained to transform a neutral face or voice to a different emotional face or voice. In some cases, an individual bottleneck layer can be trained for a transformation pair. At runtime, once the user's emotion has been identified and an appropriate response to it can be determined (mirrored or complementary), the trained bottleneck layer can be used to perform the needed transformation.

The deep neural network can include a bottleneck layer 1730. The bottleneck layer can include a fewer number of nodes than the one or more preceding hidden layers. The bottleneck layer can create a constriction in the deep neural network or other network. The bottleneck layer can force information that is pertinent to a classification, for example, into a low dimensional representation. The bottleneck features can be extracted using an unsupervised technique. In other embodiments, the bottleneck features can be extracted using a supervised technique. The supervised technique can include training the deep neural network with a known dataset. The features can be extracted from an autoencoder such as a variational autoencoder, a generative autoencoder, and so on. The deep neural network can include hidden layers 1740. The number of the hidden layers can include zero hidden layers, one hidden layer, a plurality of hidden layers, and so on. The hidden layers following the bottleneck layer can include more nodes than the bottleneck layer. The deep neural network can include a classification layer 1750. The classification layer can be used to identify the points, edges, objects, boundaries, and so on, described above. The classification layer can be used to identify cognitive states, mental states, emotional states, moods, and the like. The output of the final classification layer can be indicative of the emotional states of faces within the images, where the images can be processed using the deep neural network.

Figure 18:
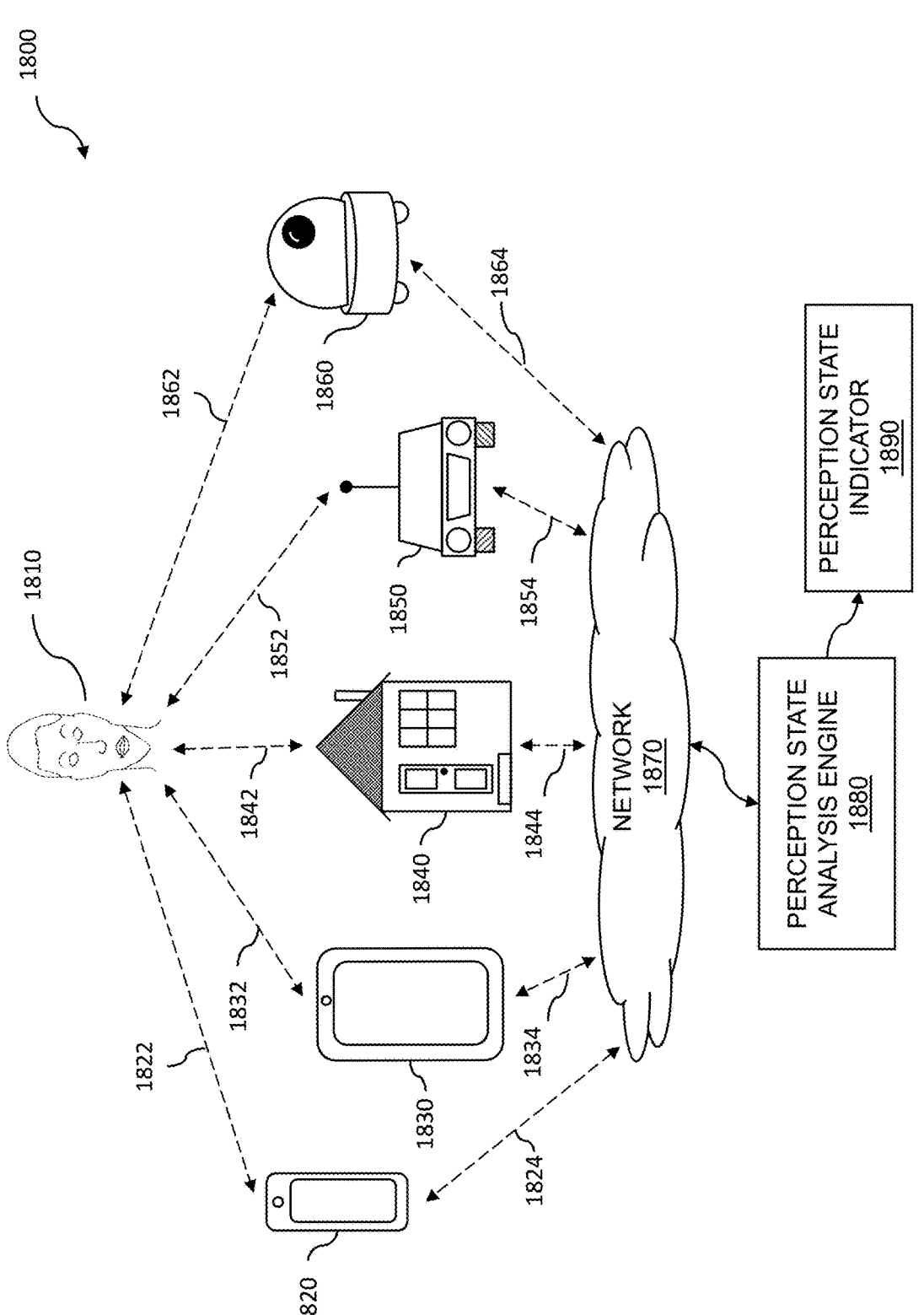
FIG. 18 illustrates data collection including devices and locations.

FIG. 18 illustrates data collection including devices and locations 1800. Data, including imaging, facial data, video data, audio data, and physio data can be obtained for neural network training for deep learning in situ retraining. The imaging, audio, physio, and other data can be obtained from multiple devices, vehicles, and locations. Images including facial data are obtained. The images can include visible light-based images and near-infrared based images. A set of weights on a set of layers of a neural network is trained on a server device. A subset of the set of weights is deployed on deep learning nodes of a user device. An additional set of weights is retrained on the user device. A human perception state is provided on the user device.

The multiple mobile devices, vehicles, and locations 1800 can be used separately or in combination to collect imaging, video data, audio data, physio data, etc., on a user 1810. The imaging can include video data, where the video data can include upper torso data. Other data such as audio data, physiological data, and so on, can be collected on the user. While one person is shown, the video data, or other data, can be collected on multiple people. A user 1810 can be observed as she or he is performing a task, experiencing an event, viewing a media presentation, and so on. The user 1810 can be shown one or more media presentations, political presentations, social media, or another form of displayed media. The one or more media presentations can be shown to a plurality of people. The media presentations can be displayed on an electronic display coupled to a client device. The data collected on the user 1810 or on a plurality of users can be in the form of one or more videos, video frames, still images, etc. The plurality of videos can be of people who are experiencing different situations. Some example situations can include the user or plurality of users being exposed to TV programs, movies, video clips, social media, social sharing, and other such media. The situations could also include exposure to media such as advertisements, political messages, news programs, and so on. As noted before, video data can be collected on one or more users in substantially identical or different situations and viewing either a single media presentation or a plurality of presentations. The data collected on the user 1810 can be analyzed and viewed for a variety of purposes including body position or body language analysis, expression analysis, mental state analysis, cognitive state analysis, and so on. The electronic display can be on a smartphone 1820 as shown, a tablet computer 1830, a personal digital assistant, a television, a mobile monitor, or any other type of electronic device. In one embodiment, expression data is collected on a mobile device such as a cell phone 1820, a tablet computer 1830, a laptop computer, or a watch. Thus, the multiple sources can include at least one mobile device, such as a phone 1820 or a tablet 1830, or a wearable device such as a watch or glasses (not shown). A mobile device can include a front-facing camera and/or a back-facing camera that can be used to collect expression data. Sources of expression data can include a webcam, a phone camera, a tablet camera, a wearable camera, and a mobile camera. A wearable camera can comprise various camera devices, such as a watch camera. In addition to using client devices for data collection from the user 1810, data can be collected in a house 1840 using a web camera or the like; in a vehicle 1850 using a web camera, client device, etc.; by a social robot 1860, and so on.

As the user 1810 is monitored, the user 1810 might move due to the nature of the task, boredom, discomfort, distractions, or for another reason. As the user moves, the camera with a view of the user's face can be changed. Thus, as an example, if the user 1810 is looking in a first direction, the line of sight 1822 from the smartphone 1820 is able to observe the user's face, but if the user is looking in a second direction, the line of sight 1832 from the tablet 1830 is able to observe the user's face. Furthermore, in other embodiments, if the user is looking in a third direction, the line of sight 1842 from a camera in the house 1840 is able to observe the user's face, and if the user is looking in a fourth direction, the line of sight 1852 from the camera in the vehicle 1850 is able to observe the user's face. If the user is looking in a fifth direction, the line of sight 1862 from the social robot 1860 is able to observe the user's face. If the user is looking in a sixth direction, a line of sight from a wearable watch-type device, with a camera included on the device, is able to observe the user's face. In other embodiments, the wearable device is another device, such as an earpiece with a camera, a helmet or hat with a camera, a clip-on camera attached to clothing, or any other type of wearable device with a camera or other sensor for collecting expression data. The user 1810 can also use a wearable device including a camera for gathering contextual information and/or collecting expression data on other users. Because the user 1810 can move her or his head, the facial data can be collected intermittently when she or he is looking in a direction of a camera. In some cases, multiple people can be included in the view from one or more cameras, and some embodiments include filtering out faces of one or more other people to determine whether the user 1810 is looking toward a camera. All or some of the expression data can be continuously or sporadically available from the various devices and other devices.

The captured video data can include cognitive content, such as facial expressions, etc., and can be transferred over a network 1870. The network can include the Internet or other computer network. The smartphone 1820 can share video using a link 1824, the tablet 1830 using a link 1834, the house 1840 using a link 1844, the vehicle 1850 using a link 1854, and the social robot 1860 using a link 1864. The links 1824, 1834, 1844, 1854, and 1864 can be wired, wireless, and hybrid links. The captured video data, including facial expressions, can be analyzed on a perception state analysis engine 1880, on a computing device such as the video capture device, or on another separate device. The analysis could take place on one of the mobile devices discussed above, on a local server, on a remote server, and so on. In embodiments, some of the analysis takes place on the mobile device, while other analysis takes place on a server device. The analysis of the video data can include the use of a classifier. The video data can be captured using one of the mobile devices discussed above and sent to a server or another computing device for analysis. However, the captured video data including expressions can also be analyzed on the device which performed the capturing. The analysis can be performed on a mobile device where the videos were obtained with the mobile device and wherein the mobile device includes one or more of a laptop computer, a tablet, a PDA, a smartphone, a wearable device, and so on. In another embodiment, the analyzing comprises using a classifier on a server or another computing device different from the capture device. The analysis data from the cognitive state analysis engine can be processed by a perception state indicator 1890. The cognitive state indicator 1890 can indicate cognitive states, mental states, moods, emotions, etc. In embodiments, the cognitive state can include drowsiness, fatigue, distraction, impairment, sadness, stress, happiness, anger, frustration, confusion, disappointment, hesitation, cognitive overload, focusing, engagement, attention, boredom, exploration, confidence, trust, delight, disgust, skepticism, doubt, satisfaction, excitement, laughter, calmness, curiosity, humor, depression, envy, sympathy, embarrassment, poignancy, or mirth.

Figure 19:
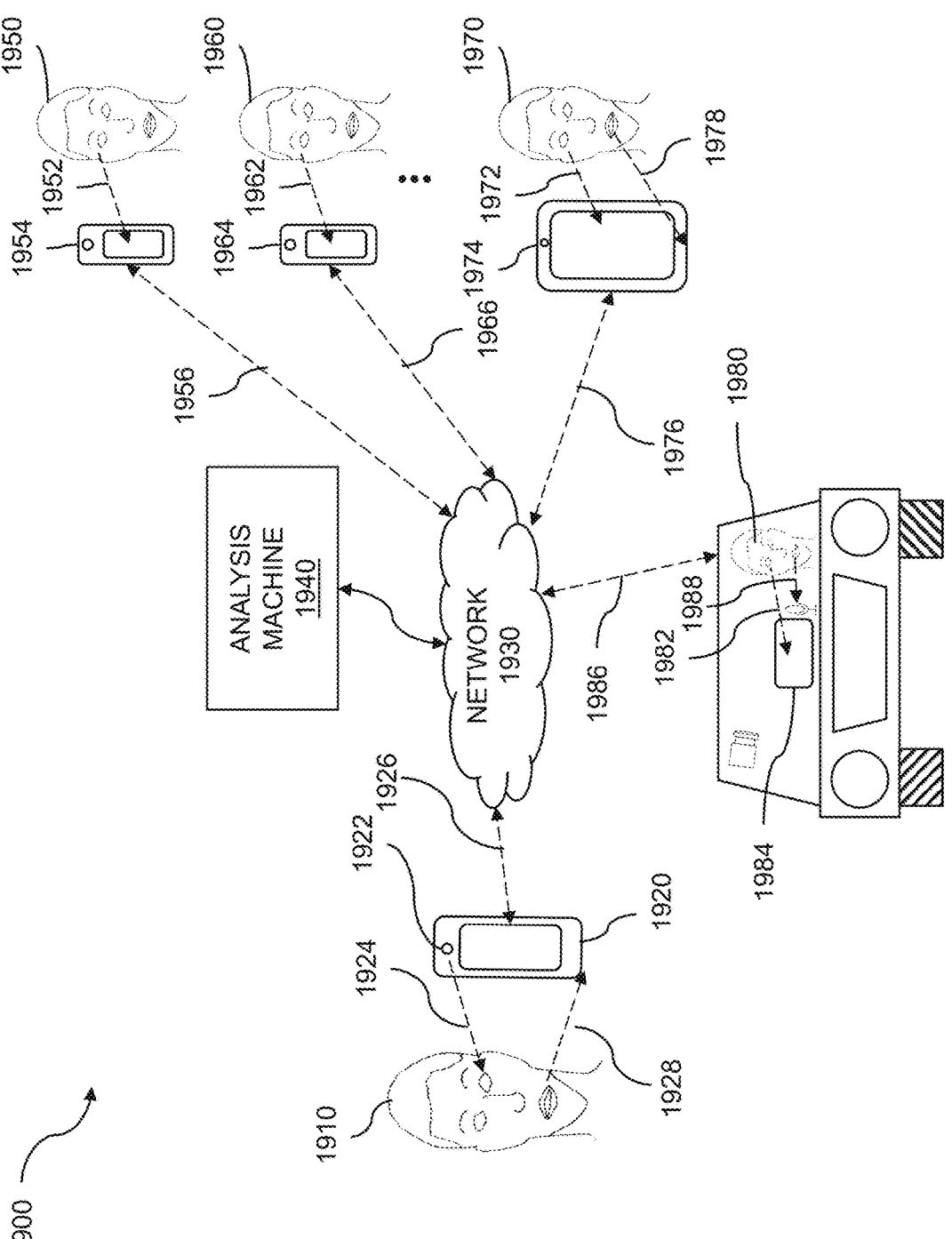
FIG. 19 shows an example of livestreaming of social video and audio.

FIG. 19 shows an example of livestreaming of social video and audio. The streaming of social video and social audio can be applied to neural network training for deep learning in situ retraining. The livestreaming can include human perception data, imaging data, upper torso data, speech data, audio data, physio data, etc. Images that include facial data for human perception state analysis are obtained. A server device is used to train a set of weights on a set of layers for deep learning that implement the human perception state analysis. The training is performed with a first set of training data. A subset of the set of weights is deployed on deep learning nodes of a user device, and an additional set of weights is retrained on the user device using a second set of training data. A human perception state is provided on the user device.

The livestreaming and image analysis 1900 can be facilitated by a video capture device, a local server, a remote server, semiconductor-based logic, and so on. The streaming can be livestreaming and can include cognitive state analysis, cognitive state event signature analysis, etc. Livestreaming video is an example of one-to-many social media, where video can be sent over the Internet from one person to a plurality of people using a social media app and/or platform. Livestreaming is one of numerous popular techniques used by people who want to disseminate ideas, send information, provide entertainment, share experiences, and so on. Some of the livestreams, such as webcasts, online classes, sporting events, news, computer gaming, or video conferences can be scheduled, while others can be impromptu streams that are broadcast as needed or when desired. Examples of impromptu livestream videos can range from individuals simply wanting to share experiences with their social media followers, to live coverage of breaking news, emergencies, or natural disasters. The latter coverage is known as mobile journalism, or "mojo", and is becoming increasingly common. With this type of coverage, news reporters can use networked, portable electronic devices to provide mobile journalism content to a plurality of social media followers. Such reporters can be quickly and inexpensively deployed as the need or desire arises.

Several livestreaming social media apps and platforms can be used for transmitting video. One such video social media app is Meerkat™ which can link with a user's Twitter™ account. Meerkat™ enables a user to stream video using a handheld, networked electronic device coupled to video capabilities. Viewers of the livestream can comment on the stream using tweets that can be seen and responded to by the broadcaster. Another popular app is Periscope™ which can transmit a live recording from one user to his or her Periscope™ account and to other followers. The Periscope™ app can be executed on a mobile device. The user's Periscope™ followers can receive an alert whenever that user begins a video transmission. Another live-stream video platform is Twitch™ which can be used for video streaming of video gaming and broadcasts of various competitions and events.

The example 1900 shows a user 1910 broadcasting a video livestream and an audio livestream to one or more people as shown by a first person 1950, a second person 1960, and a third person 1970. A portable, network-enabled, electronic device 1920 can be coupled to a front-facing camera 1922. The portable electronic device 1920 can be a smartphone, a PDA, a tablet, a laptop computer, and so on. The camera 1922 coupled to the device 1920 can have a line-of-sight view 1924 to the user 1910 and can capture video of the user 1910. The portable electronic device 1920 can be coupled to a microphone (not shown). The microphone can capture voice data 1928 such as speech and non-speech vocalizations. In embodiments, non-speech vocalizations can include grunts, yelps, squeals, snoring, sighs, laughter, filled pauses, unfilled pauses, yawns, or the like. The captured video and audio can be sent to an analysis or recommendation engine 1940 using a network link 1926 to the network 1930. The network link can be a wireless link, a wired link, and so on. The recommendation engine 1940 can recommend to the user 1910 an app and/or platform that can be supported by the server and can be used to provide a video livestream, an audio livestream, or both a video livestream and an audio livestream to one or more followers of the user 1910.

In the example 1900, the user 1910 has four followers: a first person 1950, a second person 1960, a third person 1970, and a fourth person 1980. Each follower has a line-of-sight view to a video screen on a portable, networked electronic device. In other embodiments, one or more followers follow the user 1910 using any other networked electronic device, including a computer. In the example 1900, a first person 1950 has a line-of-sight view 1952 to the video screen of a device 1954; a second person 1960 has a line-of-sight view 1962 to the video screen of a device 1964, a third person 1970 has a line-of-sight view 1972 to the video screen of a device 1974, and a fourth person 1980 has a line-of-sight view 1982 to the video screen of a device 1984. The device 1974 can also capture audio data 1978 from the third person 1970, and the device 1984 can further capture audio data 1988 from the fourth person 1980. The portable electronic devices 1954, 1964, 1974, and 1984 can each be a smartphone, a PDA, a tablet, and so on. Each portable device can receive the video stream and the audio stream being broadcast by the user 1910 through the network 1930 using the app and/or platform that can be recommended by the recommendation engine 1940. The network can include the Internet, a computer network, a cellular network, and the like. The device 1954 can receive a video stream and the audio stream using the network link 1956, the device 1964 can receive a video stream and the audio stream using the network link 1966, the device 1974 can receive a video stream and the audio stream using the network link 1976, the device 1984 can receive a video stream and the audio stream using the network link 1986, and so on. The network link can be a wireless link, a wired link, a hybrid link, and the like. Depending on the app and/or platform that can be recommended by the analysis engine 1940, one or more followers, such as the followers shown 1950, 1960, 1970, and 1980, can reply to, comment on, or otherwise provide feedback to the user 1910 using their respective devices 1954, 1964, 1974, and 1984.

The human face provides a powerful communications medium through its ability to exhibit numerous expressions that can be captured and analyzed for a variety of purposes. In some cases, media producers are acutely interested in evaluating the effectiveness of message delivery by video media. Such video media includes advertisements, political messages, educational materials, television programs, movies, government service announcements, etc. Automated facial analysis can be performed on one or more video frames containing a face in order to detect facial action. Based on the facial action detected, a variety of parameters including affect valence, spontaneous reactions, facial action units, and so on can be determined. The parameters that are determined can be used to infer or predict emotional, mental, and cognitive states. For example, determined valence can be used to describe the emotional reaction of a viewer to a video media presentation or another type of presentation. Positive valence provides evidence that a viewer is experiencing a favorable emotional response to the video media presentation, while negative valence provides evidence that a viewer is experiencing an unfavorable emotional response to the video media presentation. Other facial data analysis can include the determination of discrete emotional states of the viewer or viewers.

Facial data can be collected from a plurality of people using any of a variety of cameras. A camera can include a webcam, a video camera, a still camera, a thermal imager, a CCD device, a phone camera, a three-dimensional camera, a depth camera, a light field camera, multiple webcams used to show different views of a person, or any other type of image capture apparatus that can allow captured data to be used in an electronic system. In some embodiments, the person is permitted to "opt in" to the facial data collection. For example, the person can agree to the capture of facial data using a personal device such as a mobile device or another electronic device by selecting an opt-in choice. Opting-in can then turn on the person's webcam-enabled device and can begin the capture of the person's facial data via a video feed from the webcam or other camera. The video data that is collected can include one or more persons experiencing an event. The one or more persons can be sharing a personal electronic device or can each be using one or more devices for video capture. The videos that are collected can be collected using a web-based framework. The web-based framework can be used to display the video media presentation or event as well as to collect videos from multiple viewers who are online. That is, the collection of videos can be crowdsourced from those viewers who elected to opt in to the video data collection.

The videos captured from the various viewers who chose to opt in can be substantially different in terms of video quality, frame rate, etc. As a result, the facial video data can be scaled, rotated, and otherwise adjusted to improve consistency. Human factors further contribute to the capture of the facial video data. The facial data that is captured might or might not be relevant to the video media presentation being displayed. For example, the viewer might not be paying attention, might be fidgeting, might be distracted by an object or event near the viewer, or might be otherwise inattentive to the video media presentation. The behavior exhibited by the viewer can prove challenging to analyze due to viewer actions including eating, speaking to another person or persons, speaking on the phone, etc. The videos collected from the viewers might also include other artifacts that pose challenges during the analysis of the video data. The artifacts can include items such as eyeglasses (because of reflections), eye patches, jewelry, and clothing that occlude or obscure the viewer's face. Similarly, a viewer's hair or hair covering can present artifacts by obscuring the viewer's eyes and/or face.

The captured facial data can be analyzed using the facial action coding system (FACS). The FACS seeks to define groups or taxonomies of facial movements of the human face. The FACS encodes movements of individual muscles of the face, where the muscle movements often include slight, instantaneous changes in facial appearance. The FACS encoding is commonly performed by trained observers, but can also be performed on automated, computer-based systems. Analysis of the FACS encoding can be used to determine emotions of the persons whose facial data is captured in the videos. The FACS is used to encode a wide range of facial expressions that are anatomically possible for the human face. The FACS encodings include action units (AUs) and related temporal segments that are based on the captured facial expression. The AUs are open to higher order interpretation and decision-making. These AUs can be used to recognize emotions experienced by the person who is being observed. Emotion-related facial actions can be identified using the emotional facial action coding system (EMFACS) and the facial action coding system affect interpretation dictionary (FACSAID). For a given emotion, specific action units can be related to the emotion. For example, the emotion of anger can be related to AUs 4, 5, 7, and 23, while happiness can be related to AUs 6 and 12. Other mappings of emotions to AUs have also been previously associated. The coding of the AUs can include an intensity scoring that ranges from A (trace) to E (maximum). The AUs can be used for analyzing images to identify patterns indicative of a particular cognitive and/or emotional state. The AUs range in number from 0 (neutral face) to 98 (fast up-down look). The AUs include so-called main codes (inner brow raiser, lid tightener, etc.), head movement codes (head turn left, head up, etc.), eye movement codes (eyes turned left, eyes up, etc.), visibility codes (eyes not visible, entire face not visible, etc.), and gross behavior codes (sniff, swallow, etc.). Emotion scoring can be included where intensity is evaluated, and specific emotions, moods, mental states, or cognitive states can be identified.

The coding of faces identified in videos captured of people observing an event can be automated. The automated systems can detect facial AUs or discrete emotional states. The emotional states can include amusement, fear, anger, disgust, surprise, and sadness. The automated systems can be based on a probability estimate from one or more classifiers, where the probabilities can correlate with an intensity of an AU or an expression. The classifiers can be used to identify into which of a set of categories a given observation can be placed. In some cases, the classifiers can be used to determine a probability that a given AU or expression is present in a given frame of a video. The classifiers can be used as part of a supervised machine learning technique, where the machine learning technique can be trained using "known good" data. Once trained, the machine learning technique can proceed to classify new data that is captured.

The supervised machine learning models can be based on support vector machines (SVMs). An SVM can have an associated learning model that is used for data analysis and pattern analysis. For example, an SVM can be used to classify data that can be obtained from collected videos of people experiencing a media presentation. An SVM can be trained using "known good" data that is labeled as belonging to one of two categories (e.g., smile and no-smile). The SVM can build a model that assigns new data into one of the two categories. The SVM can construct one or more hyperplanes that can be used for classification. The hyperplane that has the largest distance from the nearest training point can be determined to have the best separation. The largest separation can improve the classification technique by increasing the probability that a given data point can be properly classified.

In another example, a histogram of oriented gradients (HoG) can be computed. The HoG can include feature descriptors and can be computed for one or more facial regions of interest. The regions of interest of the face can be located using facial landmark points, where the facial landmark points can include outer edges of nostrils, outer edges of the mouth, outer edges of eyes, etc. A HoG for a given region of interest can count occurrences of gradient orientation within a given section of a frame from a video, for example. The gradients can be intensity gradients and can be used to describe an appearance and a shape of a local object. The HoG descriptors can be determined by dividing an image into small, connected regions, also called cells. A histogram of gradient directions or edge orientations can be computed for pixels in the cell. Histograms can be contrast-normalized based on intensity across a portion of the image or the entire image, thus reducing any influence from differences in illumination or shadowing changes between and among video frames. The HoG can be computed on the image or on an adjusted version of the image, where the adjustment of the image can include scaling, rotation, etc. The image can be adjusted by flipping the image around a vertical line through the middle of a face in the image. The symmetry plane of the image can be determined from the tracker points and landmarks of the image.

In embodiments, an automated facial analysis system identifies five facial actions or action combinations in order to detect spontaneous facial expressions for media research purposes. Based on the facial expressions that are detected, a determination can be made with regard to the effectiveness of a given video media presentation, for example. The system can detect the presence of the AUs or the combination of AUs in videos collected from a plurality of people. The facial analysis technique can be trained using a web-based framework to crowdsource videos of people as they watch online video content. The video can be streamed at a fixed frame rate to a server. Human labelers can code for the presence or absence of facial actions including a symmetric smile, unilateral smile, asymmetric smile, and so on. The trained system can then be used to automatically code the facial data collected from a plurality of viewers experiencing video presentations (e.g., television programs).

Spontaneous asymmetric smiles can be detected in order to understand viewer experiences. Related literature indicates that as many asymmetric smiles occur on the right hemi face as do on the left hemi face, for spontaneous expressions. Detection can be treated as a binary classification problem, where images that contain a right asymmetric expression are used as positive (target class) samples and all other images as negative (non-target class) samples. Classifiers perform the classification, including classifiers such as support vector machines (SVMs) and random forests. Random forests can include ensemble-learning methods that use multiple learning algorithms to obtain better predictive performance. Frame-by-frame detection can be performed to recognize the presence of an asymmetric expression in each frame of a video. Facial points can be detected, including the top of the mouth and the two outer eye corners. The face can be extracted, cropped, and warped into a pixel image of specific dimension (e.g., 96×96 pixels). In embodiments, the interocular distance and vertical scale in the pixel image are fixed. Feature extraction can be performed using computer vision software such as OpenCV™. Feature extraction can be based on the use of HoGs. HoGs can include feature descriptors and can be used to count occurrences of gradient orientation in localized portions or regions of the image. Other techniques can be used for counting occurrences of gradient orientation, including edge orientation histograms, scale-invariant feature transformation descriptors, etc. The AU recognition tasks can also be performed using Local Binary Patterns (LBPs) and Local Gabor Binary Patterns (LGBPs). The HoG descriptor represents the face as a distribution of intensity gradients and edge directions and is robust in its ability to translate and scale. Differing patterns, including groupings of cells of various sizes and arranged in variously sized cell blocks, can be used. For example, 4×4 cell blocks of 8×8-pixel cells with an overlap of half of the block can be used. Histograms of channels can be used, including nine channels or bins evenly spread over 0-180 degrees. In this example, the HoG descriptor on a 96×96 image is 25 blocks×16 cells×9 bins=3600, the latter quantity representing the dimension. AU occurrences can be rendered. The videos can be grouped into demographic datasets based on nationality and/or other demographic parameters for further detailed analysis. This grouping and other analyses can be facilitated via semiconductor-based logic.

Figure 20:
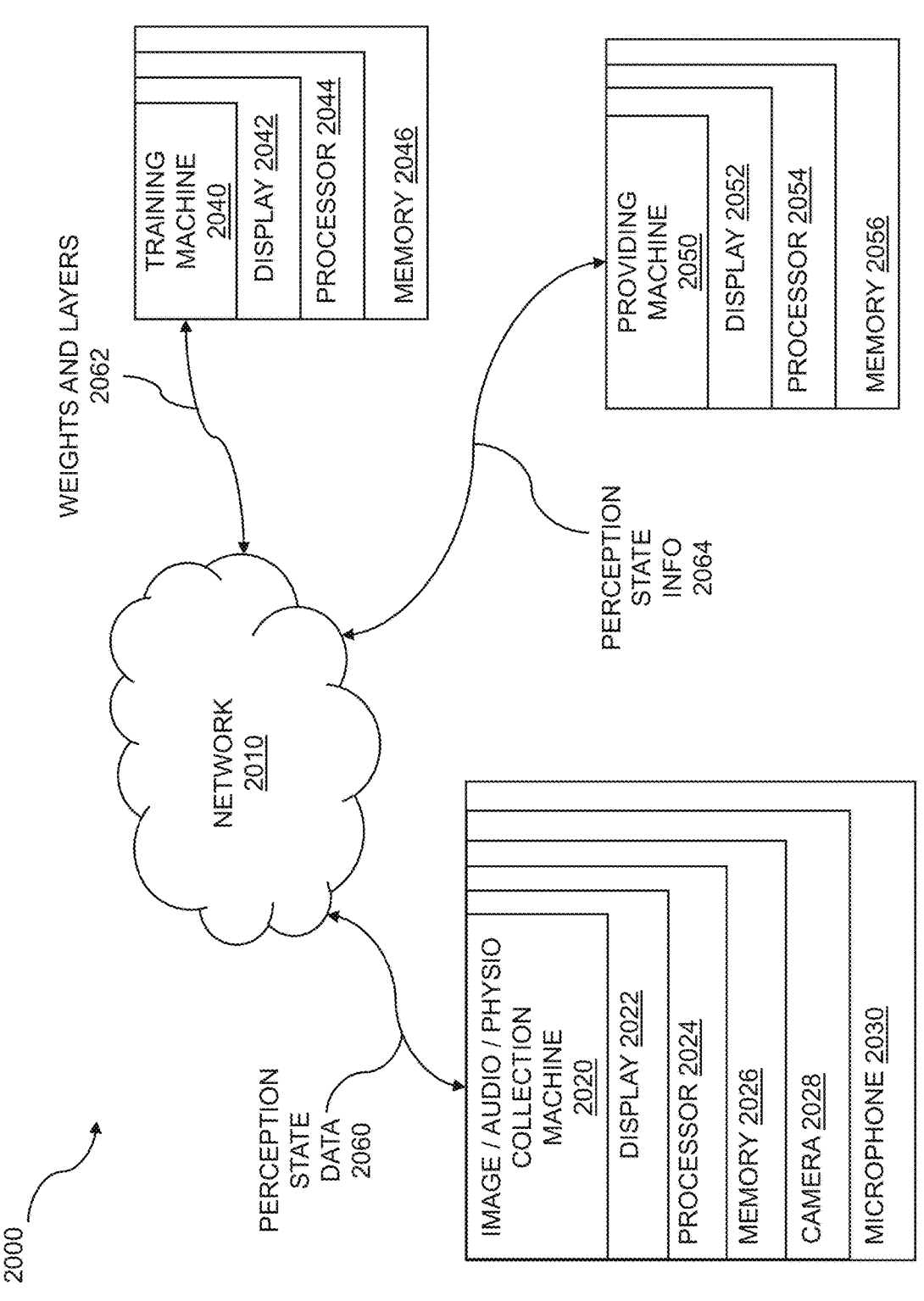
FIG. 20 is a diagram of a system for neural network training for deep learning in situ retraining.

FIG. 20 is a diagram of a system for neural network training for deep learning in situ retraining. An individual can experience a variety of human perception states while that individual is interacting with a personal electronic device, consuming content such as digital media, traveling in or operating a vehicle, and so on. The human perception states can include drowsiness, fatigue, distraction, or impairment; sadness, frustration, or hesitation; human perception overload; among many other states. A neural network can be used to determine one or more human perception states experienced by the individual. The neural network can perform deep learning, where the neural network for deep learning can include a convolutional neural network, a recurrent neural network, and so on. The neural network for deep learning can be trained using known good data, and the neural network can be retrained in situ. Deep learning in situ retraining is based on obtaining images that include facial data. A set of weights used by layers within a deep learning neural network is trained on a server. Some or all of the weights can be deployed on learning nodes of a device such as a user device. An additional set of weights can be retrained on the user device, and a human perception state can be provided. The retraining can include additional deep learning layers of the user device.

The system 2000 can include a network 2010 such as the Internet, an intranet, or another computer network, where the network can be used for communication among various machines. An imaging, audio, or physio collection machine 2020 has a memory 2026 which stores instructions and one or more processors 2024 coupled to the memory 2026, wherein the one or more processors 2024 can execute instructions. The imaging, audio, or physio collection machine 2020 can also have a network connection to carry perception state data 2060, and a display 2022 that can present perception state data; obtained images including images containing facial data; visual representations of audio data such as a voice data or ambient sound data; cognitive state or mental state data; profiles such as perception state profiles, cognitive state profiles, emotional state profiles, and so on. The imaging, audio, or physio collection machine 2020 can collect images of an individual while they are interacting with an electronic device, traveling within a vehicle, and so on. The imaging can include imaging of a vehicle interior, and can also comprise human perception state data including image data, facial data, torso data, voice data, audio data, physiological data, etc., from an individual. The imaging can include infrared imaging, near-infrared imaging, etc. In some embodiments, there are multiple imaging, audio, or physio collection machines 2020 that each collect imaging. This type of collection machine can have a camera 2028, a microphone 2030, or other sensors. In many embodiments, a camera, a microphone, or physiological sensors will be present. Other embodiments include obtaining audio information and augmenting the analysis (discussed below) with the audio information. The audio data can include speech, non-speech vocalizations, etc. Further embodiments may include obtaining physiological information from the individual and augmenting the deep learning in situ retraining based on the physiological information. The physiological data can include heart rate, heart rate variability, respiration rate, skin conductivity, and so on. Once the perception state data 2060 has been collected, the imaging, audio, or physio collection machine 2020 can upload information to a training machine 2040, based on the perception state data from the individual. The imaging, audio, or physio collection machine 2020 can communicate with the training machine 2040 over the network 2010, the Internet, some other computer network, or by another method suitable for communication between two machines. In some embodiments, the training machine 2040 functionality is embodied in the imaging, audio, and physio collection machine 2020.

The training machine 2040 can have a network connection for weights and layers information 2062, a memory 2046 which stores instructions, and one or more processors 2044 coupled to the memory 2046, wherein the one or more processors 2044 can execute instructions. The training machine 2040 can receive perception state data, collected from an individual, from the imaging, audio, or physio collection machine 2020, and can train a set of weights on a series of layers that can implement the human perception state analysis. The training machine can deploy a subset of a set of weights that can be used on deep learning nodes, where the deep learning nodes can include deep learning nodes of a user device. The training machine can further retrain an additional set of weights on the user device. The additional set of weights can be trained using a second set of training data. The first set of training data and the second set of training data can include known good data including human perception states. The known good data can be used for training classifiers, where the classifiers can be used to identify one or more human perception states. In some embodiments, the training machine 2040 also allows a user to view and evaluate the plurality of images that include facial data, or other data for the individual, on a display 2042. The training machine 2040 can then provide the weights and layers 2062, perception state information 2064, or other information or data to the providing machine 2050. In some embodiments, the imaging, audio, or physio capture machine 2020 can also function as the providing machine 2050. In further embodiments, the weights and layers information that was collected or used for training can be based on intermittent obtaining of imaging that includes facial data.

The providing machine 2050 can have a memory 2056 which stores instructions, and one or more processors 2054 coupled to the memory 2056, wherein the one or more processors 2054 can execute instructions. The providing machine can provide a human perception state on a user device, where the human perception state can be based on a subset of the set of weights, the additional set of weights, and the input images. The providing machine can use a network 2010 such as a computer network, the Internet, or another computer communication method, to request the weights and layers data 2062 from the training machine. The providing machine 2050 can receive perception state information 2064, based on the perception state data 2060, from an individual. Classification data, the perception state data, and the weights and layers information can be presented on a display 2052. In some embodiments, the providing machine is set up to receive perception state data collected from an individual, in real-time or near real-time. In other embodiments, the providing machine is set up to receive the perception state data on an intermittent basis. In at least one embodiment, a single computer incorporates the imaging, audio, or physio collection machine, the training machine, and the providing machine functionalities.

The system 2000 can comprise a computer system for neural network training comprising: a memory which stores instructions; one or more processors coupled to the memory wherein the one or more processors, when executing the instructions which are stored, are configured to: obtain a plurality of images that include facial data for human perception state analysis; train, on a server device, a set of weights on a set of layers for deep learning that implements the human perception state analysis, wherein the training is performed with a first set of training data; deploy, on deep learning nodes of a user device, a subset of the set of weights, wherein the deploying enables at least part of the human perception state analysis; retrain, on the user device, an additional set of weights, wherein the additional set of weights is trained using a second set of training data; and provide, on the user device, a human perception state, based on the subset of the set of weights, the additional set of weights, and input images obtained by the user device.

In embodiments, a computer program product embodied in a non-transitory computer readable medium for neural network training, the computer program product comprising code which causes one or more processors to perform operations of: obtaining a plurality of images that include facial data for human perception state analysis; training, on a server device, a set of weights on a set of layers for deep learning that implements the human perception state analysis, wherein the training is performed with a first set of training data; deploying, on deep learning nodes of a user device, a subset of the set of weights, wherein the deploying enables at least part of the human perception state analysis; retraining, on the user device, an additional set of weights, wherein the additional set of weights is trained using a second set of training data; and providing, on the user device, a human perception state, based on the subset of the set of weights, the additional set of weights, and input images obtained by the user device.

Each of the above methods may be executed on one or more processors on one or more computer systems. Embodiments may include various forms of distributed computing, client/server computing, and cloud-based computing. Further, it will be understood that for each flow chart in this disclosure, the depicted steps or boxes are provided for purposes of illustration and explanation only. The steps may be modified, omitted, or re-ordered and other steps may be added without departing from the scope of this disclosure. Further, each step may contain one or more sub-steps. While the foregoing drawings and description set forth functional aspects of the disclosed systems, no particular arrangement of software and/or hardware for implementing these functional aspects should be inferred from these descriptions unless explicitly stated or otherwise clear from the context. All such arrangements of software and/or hardware are intended to fall within the scope of this disclosure.

The block diagrams and flowchart illustrations depict methods, apparatus, systems, and computer program products. Each element of the block diagrams and flowchart illustrations, as well as each respective combination of elements in the block diagrams and flowchart illustrations, illustrates a function, step or group of steps of the methods, apparatus, systems, computer program products and/or computer-implemented methods. Any and all such functions may be implemented by computer program instructions, by special-purpose hardware-based computer systems, by combinations of special purpose hardware and computer instructions, by combinations of general-purpose hardware and computer instructions, and so on. Any and all of which may be generally referred to herein as a "circuit," "module," or "system."

A programmable apparatus which executes any of the above-mentioned computer program products or computer implemented methods may include one or more microprocessors, microcontrollers, embedded microcontrollers, programmable digital signal processors, programmable devices, programmable gate arrays, programmable array logic, memory devices, application specific integrated circuits, or the like. Each may be suitably employed or configured to process computer program instructions, execute computer logic, store computer data, and so on.

It will be understood that a computer may include a computer program product from a computer-readable storage medium and that this medium may be internal or external, removable and replaceable, or fixed. In addition, a computer may include a Basic Input/Output System (BIOS), firmware, an operating system, a database, or the like that may include, interface with, or support the software and hardware described herein.

Embodiments of the present invention are not limited to applications involving conventional computer programs or programmable apparatus that run them. It is contemplated, for example, that embodiments of the presently claimed invention could include an optical computer, quantum computer, analog computer, or the like. A computer program may be loaded onto a computer to produce a particular machine that may perform any and all of the depicted functions. This particular machine provides a means for carrying out any and all of the depicted functions.

Any combination of one or more computer readable media may be utilized. The computer readable medium may be a non-transitory computer readable medium for storage. A computer readable storage medium may be electronic, magnetic, optical, electromagnetic, infrared, semiconductor, or any suitable combination of the foregoing. Further computer readable storage medium examples may include an electrical connection having one or more wires, a portable computer diskette, a hard disk, a random-access memory (RAM), a read-only memory (ROM), an erasable programmable read-only memory (EPROM, Flash, MRAM, FeRAM, or phase change memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

It will be appreciated that computer program instructions may include computer executable code. A variety of languages for expressing computer program instructions may include without limitation C, C++, Java, JavaScript™, ActionScript™, assembly language, Lisp, Perl, Tcl, Python, Ruby, hardware description languages, database programming languages, functional programming languages, imperative programming languages, and so on. In embodiments, computer program instructions may be stored, compiled, or interpreted to run on a computer, a programmable data processing apparatus, a heterogeneous combination of processors or processor architectures, and so on. Without limitation, embodiments of the present invention may take the form of web-based computer software, which includes client/server software, software-as-a-service, peer-to-peer software, or the like.

In embodiments, a computer may enable execution of computer program instructions including multiple programs or threads. The multiple programs or threads may be processed more or less simultaneously to enhance utilization of the processor and to facilitate substantially simultaneous functions. By way of implementation, any and all methods, program codes, program instructions, and the like described herein may be implemented in one or more thread. Each thread may spawn other threads, which may themselves have priorities associated with them. In some embodiments, a computer may process these threads based on priority or other order.

Unless explicitly stated or otherwise clear from the context, the verbs "execute" and "process" may be used interchangeably to indicate execute, process, interpret, compile, assemble, link, load, or a combination of the foregoing. Therefore, embodiments that execute or process computer program instructions, computer-executable code, or the like may act upon the instructions or code in any and all of the ways described. Further, the method steps shown are intended to include any suitable method of causing one or more parties or entities to perform the steps. The parties performing a step, or portion of a step, need not be located within a particular geographic location or country boundary. For instance, if an entity located within the United States causes a method step, or portion thereof, to be performed outside of the United States then the method is considered to be performed in the United States by virtue of the entity causing the step to be performed.

While the invention has been disclosed in connection with preferred embodiments shown and described in detail, various modifications and improvements thereon will become apparent to those skilled in the art. Accordingly, the spirit and scope of the present invention is not to be limited by the foregoing examples but is to be understood in the broadest sense allowable by law.

What is claimed is:

1. A computer-implemented method for neural network training comprising:

obtaining a plurality of images that include facial data for human perception state analysis;

training, on a server device, a model including a set of weights on a set of layers for deep learning that implements the human perception state analysis, wherein the training includes using a first set of training data;

obtaining a prediction output based on the training;

deploying, on deep learning nodes of a user device, a subset of the set of weights, wherein the deploying enables at least part of the human perception state analysis;

retraining, on the user device, an additional set of weights, wherein the additional set of weights is trained using a second set of training data, wherein the retraining includes additional nodes on one or more deep learning layers of the user device, and wherein the retraining includes creating a new branch for the model;

providing, on the user device, a human perception state, based on the subset of the set of weights, the additional set of weights, input images obtained by the user device, and a temporal signature based on the input images, wherein the temporal signature includes a rise time to facial expression intensity;

obtaining, as an output of the new branch, a custom personalization;

selecting, one of the prediction output or the custom personalization, based on a selection process;

computing a node importance for one or more of the additional nodes, wherein the node importance is based on at least one of a number of connections to or from the node and a likelihood of accomplishing convergence on weight values; and pruning one or more of the additional nodes, wherein the pruning is based on at least one of the node importance and backward propagation, and wherein the node importance is further based on at least one of an entropy of weights and node activity.

2. The method of claim 1 wherein the retraining includes additional deep learning layers of the user device.

3. The method of claim 2 further comprising selecting results from the subset of weights and the additional set of weights.

4. The method of claim 3 wherein the selecting is based on a softmax function.

5. The method of claim 1 further comprising providing the additional set of weights and a topology back to the server device, wherein the topology includes one or more layers, arcs, and the additional nodes.

6. The method of claim 5 further comprising modifying the set of weights that were trained based on the additional set of weights and the topology.

7. The method of claim 6 wherein the training, the deploying, the retraining, and the modifying comprise distributed machine learning.

8. The method of claim 1 wherein the second set of training data comprises less data than the first set of training data.

9. The method of claim 1 wherein the human perception state analysis includes evaluating, wherein the evaluating includes: analyzing pixels within further images to identify a facial portion; and identifying a facial expression based on the facial portion.

10. The method of claim 1 wherein an end layer within the set of layers provides output indicative of human perception state.

11. The method of claim 10 further comprising tuning the end layer within the set of layers for a particular human perception state.

12. The method of claim 1 wherein the providing is performed without eye region input from one or more of the input images obtained by the user device.

13. The method of claim 1 wherein the human perception state includes a mood.

14. The method of claim 1 wherein the human perception state includes an emotional state, a mental state, or a cognitive state.

15. The method of claim 1 wherein the human perception state analysis is based on intermittent obtaining of images that include facial data.

16. The method of claim 1 further comprising obtaining audio information and augmenting the analysis based on the audio information.

17. A computer program product embodied in a non-transitory computer readable medium for neural network training, the computer program product comprising code which causes one or more processors to perform operations of:

obtaining a plurality of images that include facial data for human perception state analysis;

training, on a server device, a model including a set of weights on a set of layers for deep learning that implements the human perception state analysis, wherein the training includes using a first set of training data;

obtaining a prediction output based on the training;

deploying, on deep learning nodes of a user device, a subset of the set of weights, wherein the deploying enables at least part of the human perception state analysis;

retraining, on the user device, an additional set of weights, wherein the additional set of weights is trained using a second set of training data, wherein the retraining includes additional nodes on one or more deep learning layers of the user device, and wherein the retraining includes creating a new branch for the model;

providing, on the user device, a human perception state, based on the subset of the set of weights, the additional set of weights, input images obtained by the user device, and a temporal signature based on the input images, wherein the temporal signature includes a rise time to facial expression intensity;

obtaining, as an output of the new branch, a custom personalization;

selecting, one of the prediction output or the custom personalization, based on a selection process;

computing a node importance for one or more of the additional nodes, wherein the node importance is based on at least one of a number of connections to or from the node and a likelihood of accomplishing convergence on weight values; and pruning one or more of the additional nodes, wherein the pruning is based on at least one of the node importance and backward propagation, and wherein the node importance is further based on at least one of an entropy of weights and node activity.

18. A computer system for neural network training comprising:

a memory which stores instructions;

one or more processors coupled to the memory wherein the one or more processors, when executing the instructions which are stored, are configured to:

obtain a plurality of images that include facial data for human perception state analysis;

train, on a server device, a model including a set of weights on a set of layers for deep learning that implements the human perception state analysis, wherein the training includes using a first set of training data;

obtain a prediction output based on the training;

deploy, on deep learning nodes of a user device, a subset of the set of weights, wherein the deploying enables at least part of the human perception state analysis;

retrain, on the user device, an additional set of weights, wherein the additional set of weights is trained using a second set of training data, wherein the retraining includes additional nodes on one or more deep learning layers of the user device, and wherein the retraining includes creating a new branch for the model;

provide, on the user device, a human perception state, based on the subset of the set of weights, the additional set of weights, input images obtained by the user device, and a temporal signature based on the input images, wherein the temporal signature includes a rise time to facial expression intensity;

obtain, as an output of the new branch, a custom personalization;

select, one of the prediction output or the custom personalization, based on a selection process;

compute a node importance for one or more of the additional nodes, wherein the node importance is based on at least one of a number of connections to or from the node and a likelihood of accomplishing convergence on weight values; and prune one or more of the additional nodes, wherein the pruning is based on at least one of the node importance and backward propagation, and wherein the node importance is further based on at least one of an entropy of weights and node activity.

19. The method of claim 1 further comprising obtaining, as an output of the new branch, a custom personalization.

20. The method of claim 19 further comprising choosing a prediction solution from the model and the new branch for the model using an edge-based deep learning process.

21. The method of claim 1 wherein the new branch includes an arc to one or more new layers, wherein the arc originates from an intermediate layer to the one or more new layers, and wherein the custom personalization is used as part of the human perception state analysis.

22. The method of claim 1, further comprising sharing the custom personalization to a second user device.

23. The method of claim 1 wherein the obtaining a plurality of images comprises obtaining a plurality of images from a plenoptic camera.

24. The method of claim 16 wherein the audio information includes speech rate and loudness.

25. The method of claim 11 wherein the tuning is performed automatically, based on training data.

26. The method of claim 2 wherein the retraining is further based on physiological information.

27. The method of claim 26 wherein the physiological information includes heart rate, heart rate variability, respiration rate, and skin conductivity.

28. The method of claim 26 wherein the human perception state analysis is based on intermittent obtaining of images that include facial data, and wherein the facial data includes spontaneous asymmetric smiles.

29. The method of claim 28 further comprising performing a binary classification process on the spontaneous asymmetric smiles, wherein the spontaneous asymmetric smiles are categorized into target class samples and non-target class samples, and wherein the binary classification process is performed using one or more classifiers that include random forests, wherein the random forests include ensemble-learning methods that use multiple learning algorithms to improve predictive performance, and further wherein feature extraction includes action unit recognition that is performed using Local Gabor Binary Patterns (LGBPs).

30. The method of claim 1 further comprising sharing the set of weights with a server device, wherein the set of weights and the additional set of weights are deployed on deep learning nodes on the user device, and wherein the set of weights and additional set of weights are shared with the server device to support deep learning in situ retraining, wherein input images are processed by one or more layers of the model to produce a prediction output and a custom personalization, and wherein the set of weights, the additional set of weights, and results of the custom personalization are uploaded to the server device and used for processing additional input images.

* * * * *